US011069005B2

(12) United States Patent
Ethington et al.

(10) Patent No.: US 11,069,005 B2
(45) Date of Patent: Jul. 20, 2021

(54) METHODS AND SYSTEMS FOR DETERMINING AGRICULTURAL REVENUE

(71) Applicant: THE CLIMATE CORPORATION, San Francisco, CA (US)

(72) Inventors: James Ethington, San Francisco, CA (US); Alex Wimbush, San Francisco, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 445 days.

(21) Appl. No.: 14/846,454

(22) Filed: Sep. 4, 2015

(65) Prior Publication Data

US 2016/0078569 A1 Mar. 17, 2016

Related U.S. Application Data

(60) Provisional application No. 62/049,909, filed on Sep. 12, 2014.

(51) Int. Cl.
*G06Q 50/02* (2012.01)
*G06Q 10/04* (2012.01)
(Continued)

(52) U.S. Cl.
CPC ............ *G06Q 50/02* (2013.01); *G06Q 10/04* (2013.01); *G06Q 10/06* (2013.01); *G06Q 10/06375* (2013.01); *A01B 79/005* (2013.01)

(58) Field of Classification Search
None
See application file for complete search history.

(56) References Cited

U.S. PATENT DOCUMENTS

| 2,840,292 A | 6/1958 | Stoddard |
| 4,492,111 A | 1/1985 | Kirkland |

(Continued)

FOREIGN PATENT DOCUMENTS

| CN | 103 941 254 A | 7/2014 |
| CN | 103941254 A | 7/2014 |

(Continued)

OTHER PUBLICATIONS

Liebig, M. et al. Greenhouse gas contributions and mitigation potential of agricultural practices in northwestern USA and western Canada. Soil and Tillage Research, vol. 83, Issue 1, Aug. 2005, pp. 25-52. (Year: 2005).*

(Continued)

*Primary Examiner* — Patricia H Munson
*Assistant Examiner* — Nancy N Prasad
(74) *Attorney, Agent, or Firm* — Hickman Becker Bingham Ledesma LLP; Malgorzata A. Kulczycka

(57) ABSTRACT

A computer-implemented method for determining agricultural revenue is provided. The method uses an agricultural intelligence computer system in communication with a memory. The method includes receiving a plurality of field definition data, retrieving a plurality of input data from a plurality of data networks, determining a field region based on the field definition data, identifying a subset of the plurality of input data associated with the field region, calculating at least one yield projection for the field region based on the field definition data and the subset of the plurality of input data, and providing the at least one yield projection to a user device.

21 Claims, 36 Drawing Sheets

(51) Int. Cl.
   G06Q 10/06       (2012.01)
   A01B 79/00       (2006.01)

(56)              References Cited

U.S. PATENT DOCUMENTS 5,796,932  A  *  8/1998  Fox ..................... G06Q 10/06
                                                             715/700
    6,422,508  B1     7/2002  Barnes
    6,535,817  B1     3/2003  Krishnamurti
    6,608,672  B1     8/2003  Shibusawa
    6,853,937  B2     2/2005  Shibusawa et al.
    6,937,939  B1     8/2005  Shibusawa et al.
    8,426,211  B1     4/2013  Sridhar
    8,655,601  B1     2/2014  Sridhar et al.
    8,737,694  B2     5/2014  Bredehoft et al.
    9,087,312  B1     7/2015  Mewes
 2002/0133505  A1     9/2002  Kuji
 2002/0183867  A1  *  12/2002  Gupta .................. G06Q 20/203
                                                             700/28
 2003/0061075  A1     3/2003  Heckman
 2004/0064255  A1     4/2004  Egi
 2005/0027572  A1     2/2005  Goshert
 2005/0234691  A1    10/2005  Singh et al.
 2006/0004907  A1  *  1/2006  Pape .................... G06Q 10/10
                                                             709/201
 2006/0167926  A1     7/2006  Verhey et al.
 2007/0174095  A1     7/2007  McComb
 2008/0287662  A1  * 11/2008  Wiesman ............... C07J 71/00
                                                             536/4.1
 2011/0106451  A1     5/2011  Christy
 2012/0016517  A1     1/2012  Holland
 2012/0101861  A1     4/2012  Lindores
 2013/0144827  A1     6/2013  Trevino
 2013/0173321  A1     7/2013  Johnson
 2013/0174040  A1     7/2013  Johnson
 2013/0332205  A1    12/2013  Friedberg
 2014/0012504  A1     1/2014  Ben-Dor
 2014/0012732  A1     1/2014  Lindores
 2014/0067745  A1     3/2014  Avey et al.
 2014/0089045  A1  *  3/2014  Johnson ............... G06Q 50/02
                                                             705/7.31
 2014/0321714  A1    10/2014  Masten
 2015/0026023  A1     1/2015  Sirota et al.
 2015/0321714  A1     1/2015  Sirota
 2015/0095001  A1     4/2015  Massonnat
 2015/0237796  A1     8/2015  Celli
 2016/0169855  A1     6/2016  Baity
 2016/0171680  A1     6/2016  Lobell
 2017/0061052  A1     3/2017  Gates
 2017/0122889  A1     5/2017  Weindorf
 2017/0213141  A1     7/2017  Xu
 2019/0317243  A1    10/2019  Xiang
 2020/0151376  A1     5/2020  Gates
 2020/0183048  A1     6/2020  Xu
 2020/0337212  A1    10/2020  Xiang
 2020/0380153  A1    12/2020  Mi

FOREIGN PATENT DOCUMENTS

CN           103941254  A          7/2014
 EP          2 244 108   A2        10/2010
 WO      WO 2009/048341  A1         4/2009
 WO      WO-2010128864   A1  *     11/2010  ............. H02N 2/186
 WO      WO 2011/064445  A1         6/2011
 WO      WO 2014/036281  A2         3/2014
 WO      WO 2014/146719  A1         9/2014

OTHER PUBLICATIONS

Iftikhar Ali, Fiona Cawkwell, Edward Dwyer, Stuart Green, "Modeling Managed Grassland Biomass Estimation by Using Multitemporal Remote Sensing Data—A Machine Learning Approach", IEEE Journal of Selected Topics in Applied Earth Observations and Remote Sensing, vol. 10, No. 7, pp. 3254-3264, 2016. (Year: 2016).*

E-agriculture. Can Artificial Intelligence help improve agricultural productivity. Dec. 19, 2017 (Year: 2017).*

European Patent Office, "Search Report" in application No. PCT/US2015/049464, dated Nov. 9, 2015, 11 pages.

European Claims in application No. PCT/US2015/049464, dated Nov. 2015, 7 pages.

European Patent Office, "Search Report" in application No. PCT/US2016/023348, dated May 30, 2016, 13 pages.

European Patent Office, "Search Report" in application No. PCT/US2016/022503, dated May 2, 2016, 12 pages.

European Claims in application No. PCT/US2016/023348, dated May 2016, 6 pages.

European Claims in application No. PCT/US2016/022503, dated May 2016, 7 pages.

Johnson et al., "Medium-range multimodel ensemble combination and calibration", Quarterly Journal of the Royal Meteorological Society, Published online Mar. 9, 2009 in Wiley InterScience, 18 pages.

Berrocal et al., "Combining Spatial Statistical and Ensemble Information in Probabilistic Weather Forecasts", Monthly Weather Review, vol. 135, dated 2007 American Meteorological Society, 17 pages.

Clark et al., "The Schaake Shuffle: A Method for Reconstructing Space-Time Variability in Forecasted Precipitation and Temperature Fields", dated Feb. 2004, American Meteorological Society 20 pgs.

Dutton et al., "Calibration and combination of dynamical seasonal forecasts to enhance the value of predicted probabilities for managing risk", Springer-Verlag Berlin Heidelberg, dated 2013, 17 pages.

European Claims in application No. PCT/US2015/049486, dated Nov. 2015, 6 pages.

European Patent Office, "Search Report" in application No. PCT/US2016/049486, dated Nov. 12, 2015, 9 pages.

Gneiting et al., "Probabilistic Forecasting", Annual Reviews Further, The Annual Review of Statistics and Its Application is online at statistics.annualreviews.org, dated 2014, 30 pages.

Gneiting et al.,., "Strictly Proper Scoring Rules, Prediction, and Estimation", 2007 Journal of the American Statistical Asociation, dated Mar. 2007, vol. 102, No. 477, Review Article, 20 pages.

American Meterological Society, "Bulletin of the American Meteorological Society", Early Online Release, dated 2013 American Meteorological Society, 47 pages.

Gneiting et al., "Comparing Density Forecasts Using Threshold- and Quantile-Weighted Scoring Rules", Taylor & Francis Ltd, dated Aug. 19, 2015, 13 pages.

Vrugt et al., "Ensemble Bayesian model averaging using Markov Chain Monte Carlo sampling", Springer Science+Business Media B.V. 2008, Accepted: Sep. 25, 2008, 17 pages.

Raf Tery et al ., "Using Bayesian Model Averaging to Calibrate Forecast Ensembles", dated May 2005 American Meteorological Society, 20 pages.

Schefzik et al., "Uncertainty Quantification in Complex Simulation Models Using Ensemble Copula Coupling", Statistical Science, dated 2013, vol. 28, No. 4, 25 pages.

Scheuerer et al., "Spatially adaptive post-processing of ensemble forecasts for temperature", dated Feb. 6, 2013, 17 pages.

Scheuerer, M., "Probabilistic quantitative precipitation forecasting using Ensemble Model Output Statistics", Quarterly Journal of the RoyalMeteorological Society, dated Apr. 17, 2013, 11 pages.

Sloughter et al., "Probabilistic Quantitative Precipitation Forecasting Using Bayesian Model Averaging", dated Sep. 2007 American Meteorological Society, 12 pages.

Thorarinsdottir et al., "Probabilistic forecasts of wind speed: ensemble model output statistics by using heteroscedastic censored regression", Universität Heidelberg, Germany, dated Jun. 2009, 18 pages.

Veenhuis, Bruce, "Spread Calibration of Ensemble MOS Forecasts", dated Jul. 2013, 16 pages.

Gneiting et al., "Assessing probabilistic forecasts of multivariate quantities, with an application to ensemble predictions of surface winds", dated Jun. 2008, 26 pages.

(56) References Cited

OTHER PUBLICATIONS

International Searching Authority, "Search Report" in application No. PCT/US2016/052622, dated Dec. 6, 2016, 25 pages.
Current Claims in application No. PCT/US2016/052622, dated Dec. 2016, 6 pages.
The International Bureau of WIPO, "International Preliminary Report on Patentability", in application No. PCT/US2015/049486, dated Mar. 23, 2017, 7 pages.
The International Bureau of WIPO, "International Preliminary Report on Patentability", in application No. PCT/US2015/049466, dated Mar. 14, 2017, 9 pages.
The International Bureau of WIPO, "International Preliminary Report on Patentability", in application No. PCT/US2015/049464, dated Mar. 14, 2017, 8 pages.
The International Bureau of WIPO, "International Preliminary Report on Patentability", in application No. PCT/US2015/049456, dated Mar. 14, 2017, 9 pages.
Current Claims in application on. PCT/US2015/049456, dated Mar. 2017, 7 pages.
Current Claims in application No. PCT/US2015/049486, dated Mar. 2017, 6 pages.
Current Claims in application No. PCT/US2015/049466, dated Mar. 2017, 5 pages.
Current Claims in application No. PCT/US2015/049464, dated Mar. 2017, 7 pages.
Xu, U.S. Appl. No. 14/675,992, filed Apr. 1, 2015, Final Office Action dated Dec. 7, 2017.
Xiang, U.S. Appl. No. 14/866,160, filed Sep. 25, 2015, Notice of Allowance dated Jan. 26, 2018.
Dail, U.S. Appl. No. 14/681,886, filed Apr. 8, 2015, Adviosry Action dated Dec. 29, 2017.
The International Bureau of WIPO, "International Preliminary Report on Patentability", in application No. PCT/US2016/022503, dated Oct. 10, 2017, 8.
International Bureau of WIPO, "Search Report" in application No. PCT/US2016/023348, dated Oct. 3, 2017, 9 pages.
Current Claims in application No. PCT/US2016/023348, dated Oct. 2017, 6 pages.
Current Claims in application No. PCT/US2016/022503, dated Oct. 2017, 6 pages.
Xu, U.S. Appl. No. 14/675,992, filed Apr. 1, 2015, Office Action, dated Jun. 13, 2017.
Dail, U.S. Appl. No. 14/681,886, filed Apr. 8, 2015, Office Action, dated Jun. 8, 2017.
Xu, U.S. Appl. No. 14/675,992, filed Apr. 1, 2015, Interview Summary, dated Sep. 25, 2017.
Xiang, U.S. Appl. No. 14/866,160, filed Sep. 25, 2015, Office Action, dated Sep. 22, 2017.
Dail, U.S. Appl. No. 14/681,886, filed Apr. 8, 2015, Final Office Action, dated Oct. 5, 2017.
The International Bureau of WIPO, "International Preliminary Report on Patentability", Search Report in application No. PCT/US2016/052622, dated Mar. 27, 2018, 12 pages.
Current Claims in application No. PCT/US2016/052622, dated Mar. 2018, 6 pages.
Australian Patent Office, "Search Report" in application No. 2016328634, dated Jun. 6, 2018, 3 pages.
Australian Claims in application No. 2016328634, dated Jun. 2018, 3 pages.
U.S. Appl. No. 14/866,160, filed Sep. 25, 2015, Office Action, dated Jul. 27, 2018.
European Patent Office, "Search Report" in application No. 16 713 218.2-1222, dated Aug. 6, 2018, 7 pages.
European Claims in application No. 16 713 218.2-1222, dated Aug. 2018, 7 pages.
Xu, U.S. Appl. No. 14/675,992, filed Apr. 1, 2015, Office Action, dated Apr. 19, 2019.
Xiang, U.S. Appl. No. 14/866,160, filed Sep. 25, 2015, Notice of Allowance, dated Mar. 1, 2019.
Australian Patent Office, "Search Report" in application No. 2016294138, dated Jan. 28, 2020, 4 pages.
Australian Claims in application No. 2016294138, dated Jan. 2020, 11 pages.
Xiang, U.S. Appl. No. 16/456,883, filed Jun. 28, 2019, Office Action, dated Dec. 12, 2019.
Shi T. et al., "Visible and Near-Infrared Reflectance Spectroscopy, an Alternative for Monitoring Soil Contamination by Heavy Me", Journal of Hazardous Materials, vol. 265, Dec. 7, 2013, 12 pgs.
Ge Y. et al., "Remote Sensing of Soil Properties in Precision Agriculture: A Review", Frontiers of Earth Science; selected Publications from Chinese Universities, vol. 5 No. 3, Jun. 21, 2011, 10 pages.
Fox G. A. et al: "Soil Property Analysis Using Principal Components Analysis, Soil Line, and Regression Models", Soil Science Society of America, vol. 69, dated Nov. 1, 2005, pp. 1782-1788.
European Patent Office, "Search Report" in application No. 16849415.1-111, dated Oct. 17, 2019, 10 pages.
European Claims in application No. 16849415.1-1111, dated Oct. 2019, 4 pages.
Brown C. D. et al., "Derivative Preprocessing and Optimal Corrections for Baseline Drift in Multivariate Calibration", Applied Spectroscopy, vol. 54, No. 7, dated Jul. 1, 2000, 14 pages.
Ben-Dor E. et al., "Mapping of Several Soil Properties Using DAIS-7915 Hyperspectral Scanner Data—A Case Study Over Clayey Soils in Israel", vol. 23 No. 6, dated Jan. 25, 2002, 25 pages.
Anderson K. et al., "Remote Sensing of Soil Surface Properties", Process in Physical Geography: An International Review of Geographical Work in the Natural and Env. Sciences vol. 33, Aug. 6, 2009, 18 pgs.
Xiang, U.S. Appl. No. 14/866,160, filed Sep. 25, 2015, Corrected Notice of Allowability, dated Jun. 10, 2019.
Current Claims in application No. 20160100949, dated Aug. 2019, 8 pages.
Buenos Aires Office Action in application No. 20160100949, dated Aug. 6, 2019, 1 page.
Xu, U.S. Appl. No. 14/675,992, filed Apr. 1, 2015, Notice of Allowance, dated Oct. 8, 2019.
Gates, U.S. Appl. No. 15/351,344, filed Nov. 14, 2019, Notice of Allowance, dated Sep. 4, 2019.
Gates, U.S. Appl. No. 15/351,344, filed Nov. 17, 2016, Office Action, dated May 13, 2020.
Henderson, Gary, "Verification of Long-Term Pavement Performance Virtual Weather Stations Phase I Report-Accuracy and Reliability of Virtual Weather Stations", dated May 2006, 93 pages.
Brazilian Patent Office, "Office Action" in Application No. 1120170047500, dated May 19, 2020, 2 pages.
Brazilian Claims in Patent Application No. 1120170210436, dated Jun. 2020, 3 pages.
Brazilian Claims in Application No. 1120170216647, dated Jun. 2020, 10 pages.
Brazilian Claims in Application No. 1120170047500, dated May 2020, 4 pages.
Brazilian Patent Office, "Office Action" in Patent Application No. 1120170210436, dated Jun. 23, 2020, 2 pages.
Brazil Patent Office, "Office Action " in Brazilian Patent Application No. 1120170216647, dated Jun. 23, 2020, 2 pages.
Australian Patent Office, "Office Action" in application No. 2015315001, dated May 29, 2020, 5 pages.
Australian Claims in application No. 2015315001, dated May 2020, 7 pages.
Australian Patent Office, "Search Report" in application No. 2015315001, dated Mar. 24, 2020, 6 pages.
Australian Claims in application No. 2015315001, dated Mar. 2020, 5 pages.
Argentina Patent Office, "Search Report" in application No. 20150102912, dated Aug. 11, 2020, 3 pages.
Argentina claims in application No. 20150102912, dated Aug. 2020, 5 pages.
Intellectual Property Office of India, "Examination Report" in application No. 201717012614, dated Nov. 19, 2020, 8 pages.
India Claims in application No. 201717012614, dated Nov. 2020, 5 pages.

(56) References Cited

OTHER PUBLICATIONS

Australian Patent Office, "Search Report" in application No. 2016246391 dated Dec. 3, 2020, 4 pages.
Australian Claims in application No. 2016246391 dated Dec. 2020, 6 pages.
Argentina Patent Office, "Office Action" in application No. 20160100949, dated Dec. 18, 2020, 7 pages.
Argentina Claims in application No. 20160100949, dated Dec. 2020, 8 pages.
Xiang, U.S. Appl. No. 16/921,489, filed Jul. 6, 2020, Notice of Allowance, dated Jan. 13, 2021.
Ukrainian Institute of Intellectual Property Office, "Preliminary conclusion of the substantial examination", in application No. a 2017 10918, dated Feb. 3, 2021, 4 pages.
Ukrainian Claims in Application No. a 2017 10918, dated Feb. 2021, 7 pages.
Australian Patent Office, "Office Action" in application No. 2016294138, dated Feb. 25, 2021, 6 pages.
Australian Claims in application No. 2016294138, dated Feb. 2021, 12 pages.
Xu, U.S. Appl. No. 14/675,992, filed Apr. 1, 2015, Office Action, dated May 25, 2018.
Xiang, U.S. Appl. No. 14/866,160, filed Sep. 25, 2015, Advisory Action, dated May 14, 2018.
Dail, U.S. Appl. No. 14/681,886, filed Apr. 8, 2015, Examiners Answers, dated Jun. 21, 2018.
Xiang, U.S. Appl. No. 16/921,489, filed Jul. 6, 2020, Office Action, dated Sep. 18, 2020.
Gates, U.S. Appl. No. 15/351,344, filed Nov. 14, 2016, Final Office Action, dated Sep. 28, 2020.
Xu, U.S. Appl. No. 14/675,992, filed Apr. 1, 2015, Advisory Action, dated Mar. 1, 2018.

* cited by examiner

METHODS AND SYSTEMS FOR DETERMINING AGRICULTURAL REVENUE

BENEFIT CLAIM

This application claims the benefit under 35 U.S.C. § 119(e) of provisional application 62/049,909, filed Sep. 12, 2014, the entire contents of which are hereby incorporated by reference as if fully set forth herein.

BACKGROUND

The embodiments described herein relate generally to agricultural activities and, more particularly, systems and methods for determining potential agricultural revenue at the field level based on crop-related data and field-condition data.

Agricultural production requires significant strategy and analysis. In many cases, agricultural growers (e.g., farmers or others involved in agricultural cultivation) are required to analyze a variety of data to make strategic decisions months in advance of the period of crop cultivation (i.e., growing season). In making such strategic decisions, growers must consider at least some of the following decision constraints: fuel and resource costs, historical and projected weather trends, soil conditions, projected risks posed by pests, disease and weather events, and projected market values of agricultural commodities (i.e., crops). Analyzing these decision constraints may help a grower to predict key agricultural outcomes including crop yield, energy usage, cost and resource utilization, and farm profitability. Such analysis may inform a grower's strategic decisions of determining crop cultivation types, methods, and timing.

Despite its importance, such analysis and strategy is difficult to accomplish for a variety of reasons. First, obtaining reliable information for the various considerations of the grower is often difficult. Second, aggregating such information into a usable manner is a time consuming task. Third, where data is available, it may not be precise enough to be useful to determine strategy. For example, weather data (historical or projected) is often generalized for a large region such as a county or a state. In reality, weather may vary significantly at a much more granular level, such as an individual field. In addition, terrain features may cause weather data to vary significantly in even small regions.

Additionally, growers often must regularly make decisions during growing season. Such decisions may include adjusting when to harvest, providing supplemental fertilizer, and how to mitigate risks posed by pests, disease and weather. Additionally, decisions related to revenue may include how much grain to sell forward in the current year, what is the profitability of a particular field based on rent and inputs, when to make capital expenditures, and what are yields trending across the country. As a result, growers must continually monitor various aspects of their crops during the growing season including weather, soil, and crop conditions. Accurately monitoring all such aspects at a granular level is difficult and time consuming. Currently grower revenue decisions are usually driven by field scouting, intuition, and simple weather metrics. Accordingly, methods and systems for analyzing crop-related data, for providing field condition data, for providing strategic recommendations for maximizing crop yield, and for providing crop yield and revenue projections are desirable.

BRIEF DESCRIPTION OF THE DISCLOSURE

In one aspect, a computer-implemented method for determining agricultural revenue is provided. The method uses an agricultural intelligence computer system in communication with a memory. The method includes receiving a plurality of field definition data, retrieving a plurality of input data from a plurality of data networks, determining a field region based on the field definition data, identifying a subset of the plurality of input data associated with the field region, calculating at least one yield projection for the field region based on the field definition data and the subset of the plurality of input data, and providing the at least one yield projection to a user device.

In another aspect, a networked agricultural intelligence system for determining agricultural revenue is provided. The networked agricultural intelligence system includes a plurality of data network computer systems and an agricultural intelligence computer system. The agricultural intelligence computer system includes a processor and a memory in communication with the processor. The processor is configured to receive a plurality of field definition data from a user device, retrieve a plurality of input data from the plurality of data networks, determine a field region based on the field definition data, identify a subset of the plurality of input data associated with the field region, calculate at least one yield projection for the field region based on the field definition data and the subset of the plurality of input data, and provide the at least one yield projection to the user device.

In a further aspect, a non-transitory computer-readable storage media for managing agricultural activities having computer-executable instructions embodied thereon is provided. When executed by at least one processor, the computer-executable instructions cause the processor to receive a plurality of field definition data from a user device, retrieve a plurality of input data from a plurality of data networks, determine a field region based on the field definition data, identify a subset of the plurality of input data associated with the field region, calculate at least one yield projection for the field region based on the field definition data and the subset of the plurality of input data, and provide the at least one yield projection to the user device.

In an additional aspect, an agricultural intelligence computer system including a processor and a memory in communication with the processor is provided. The processor is configured to receive a plurality of field definition data from a user device, retrieve a plurality of input data from a plurality of data networks, determine a field region based on the field definition data, identify a subset of the plurality of input data associated with the field region, calculate at least one yield projection for the field region based on the field definition data and the subset of the plurality of input data, and provide the at least one yield projection to the user device.

Figure 1:
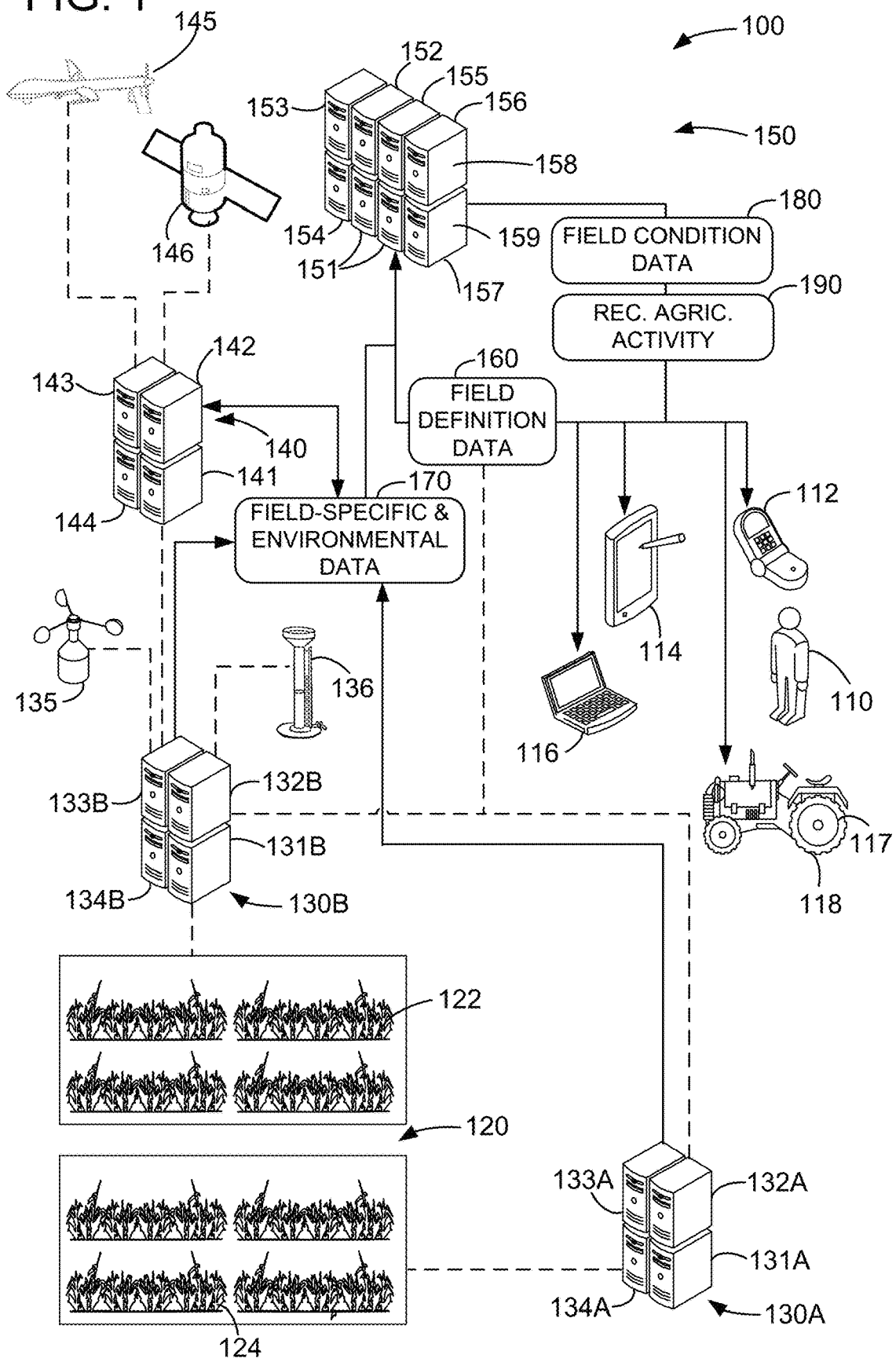
FIG. 1 is a diagram depicting an example agricultural environment including a plurality of fields that are monitored and managed with an agricultural intelligence computer system that is used to manage and recommend agricultural activities.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of the embodiments of the disclosure refers to the accompanying drawings. The same reference numbers in different drawings may identify the same or similar elements. Also, the following detailed description does not limit the claims.

The subject matter described herein relates generally to managing and recommending agricultural activities for a user such as a grower or a farmer. Specifically, a first embodiment of the methods and systems described herein includes (i) receiving a plurality of field definition data, (ii) retrieving a plurality of input data from a plurality of data networks, (iii) determining a field region based on the field definition data, (iv) identifying a subset of the plurality of input data associated with the field region, (v) determining a plurality of field condition data based on the subset of the plurality of input data, and (vi) providing the plurality of field condition data to the user device.

A second embodiment of the methods and systems described herein includes (i) receiving a plurality of field definition data, (ii) retrieving a plurality of input data from a plurality of data networks, (iii) determining a field region based on the field definition data, (iv) identifying a subset of the plurality of input data associated with the field region, (v) determining a plurality of field condition data based on the subset of the plurality of input data, (vi) identifying a plurality of field activity options, (vii) determining a recommendation score for each of the plurality of field activity options based at least in part on the plurality of field condition data, and (viii) providing a recommended field activity option from the plurality of field activity options based on the plurality of recommendation scores.

In at least some agricultural environments (e.g., farms, groups of farms, and other agricultural cultivation environments), agricultural growers employ significant strategy and analysis to make decisions on agricultural cultivation. In many cases, growers analyze a variety of data to make strategic decisions months in advance of the period of crop cultivation (i.e., growing season). In making such strategic decisions, growers must consider at least some of the following decision constraints: fuel and resource costs, historical and projected weather trends, soil conditions, projected risks posed by pests, disease and weather events, and projected market values of agricultural commodities (i.e., crops). Analyzing these decision constraints may help a grower to predict key agricultural outcomes including crop yield, energy usage, cost and resource utilization, and farm profitability. Such analysis may inform a grower's strategic decisions of determining crop cultivation types, methods, and timing. Despite its importance, such analysis and strategy is difficult to accomplish for a variety of reasons. First, obtaining reliable information for the various considerations of the grower is often difficult. Second, aggregating such information into a usable manner is a time consuming task. Third, where data is available, it may not be precise enough to be useful to determine strategy. For example, weather data (historical or projected) is often generalized for a large region such as a county or a state. In reality, weather may vary significantly at a much more granular level, such as an individual field. Terrain features may cause weather data to vary significantly in even small regions.

Additionally, growers often must regularly make decisions during growing season. Such decisions may include adjusting when to harvest, providing supplemental fertilizer, and how to mitigate risks posed by pests, disease and weather. As a result, growers must continually monitor various aspects of their crops during the growing season including weather, soil, and crop conditions. Accurately monitoring all such aspects at a granular level is difficult and time consuming. Accordingly, methods and systems for analyzing crop-related data, and providing field condition data and strategic recommendations for maximizing crop yield are desirable. Accordingly, the systems and methods described herein facilitate the management and recommendation of agricultural activities to growers.

As used herein, the term "agricultural intelligence services" refers to a plurality of data providers used to aid a user (e.g., a farmer, agronomist or consultant) in managing agricultural services and to provide the user with recommendations of agricultural services. As used herein, the terms "agricultural intelligence service", "data network", "data service", "data provider", and "data source" are used interchangeably herein unless otherwise specified. In some embodiments, the agricultural intelligence service may be an external data network (e.g., a third-party system). As used herein, data provided by any such "agricultural intelligence services" or "data networks" may be referred to as "input data", or "source data."

As used herein, the term "agricultural intelligence computer system" refers to a computer system configured to carry out the methods described herein. The agricultural intelligence computer system is in networked connectivity with a "user device" (e.g., desktop computer, laptop computer, smartphone, personal digital assistant, tablet or other computing device) and a plurality of data sources. In the example embodiment, the agricultural intelligence computer system provides the agricultural intelligence services using a cloud-based software as a service (SaaS) model. Therefore, the agricultural intelligence computer system may be implemented using a variety of distinct computing devices. The user device may interact with the agricultural intelligence computer system using any suitable network.

In an example embodiment, an agricultural machine (e.g., combine, tractor, cultivator, plow, subsoiler, sprayer or other machinery used on a farm to help with farming) may be coupled to a computing device ("agricultural machine computing device") that interacts with the agricultural intelligence computer system in a similar manner as the user device. In some examples, the agricultural machine computing device could be a planter monitor, planter controller or a yield monitor. The agricultural machine and agricultural machine computing device may provide the agricultural intelligence computer system with field definition data and field-specific data.

The term "field definition data" refers to field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range. According to the United States Department of Agriculture (USDA) Farm Service Agency, a CLU is the smallest unit of land that has a permanent, contiguous boundary, a common land cover and land management, a common owner and a common producer in agricultural land associated with USDA farm programs. CLU boundaries are delineated from relatively permanent features such as fence lines, roads, and/or waterways. The USDA Farm Service Agency maintains a Geographic Information Systems (GIS) database containing CLUs for farms in the United States.

When field definition and field-specific data is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may identify field definition data by accessing a map on the user device (served by the agricultural intelligence computer system) and selecting specific CLUs that have been graphically shown on the map. In an alternative embodiment, the user may identify field definition data by accessing a map on the user device (served by the agricultural intelligence computer system) and drawing boundaries of the field over the map. Such CLU selection or map drawings represent geographic identifiers. In alternative embodiments, the user may identify field definition data by accessing field definition data (provided as shape files or in a similar format) from the U.S. Department of Agriculture Farm Service Agency or other source via the user device and providing such field definition data to the agricultural intelligence computer system. The land identified by "field definition data" may be referred to as a "field" or "land tract." As used herein, the land farmed, or "land tract", is contained in a region that may be referred to as a "field region." Such a "field region" may be coextensive with, for example, temperature grids or precipitation grids, as used and defined below.

The term "field-specific data" refers to (a) field data (e.g., field name, soil type, acreage, tilling status, irrigation status), (b) harvest data (e.g., crop type, crop variety, crop rotation, whether the crop is grown organically, harvest date, Actual Production History (APH), expected yield, yield, crop price, crop revenue, grain moisture, tillage practice, weather information (e.g., temperature, rainfall) to the extent maintained or accessible by the user, previous growing season information), (c) soil composition (e.g., pH, organic matter (OM), cation exchange capacity (CEC)), (d) planting data (e.g., planting date, seed(s) type, relative maturity (RM) of planted seed(s), seed population), (e) nitrogen data (e.g., application date, amount, source), (f) pesticide data (e.g., pesticide, herbicide, fungicide, other substance or mixture of substances intended for use as a plant regulator, defoliant, or desiccant), (g) irrigation data (e.g., application date, amount, source), and (h) scouting observations (photos, videos, free form notes, voice recordings, voice transcriptions, weather conditions (temperature, precipitation (current and over time), soil moisture, crop growth stage, wind velocity, relative humidity, dew point, black layer)). If field-specific data is not provided via one or more agricultural machines or agricultural machine devices that interacts with the agricultural intelligence computer system in a similar manner as the user device, a user may provide such data via the user device to the agricultural intelligence computer system. In other words, the user accesses the agricultural intelligence computer system via the user device and provides the field-specific data.

The agricultural intelligence computer system also utilizes environmental data to provide agricultural intelligence services. The term "environmental data" refers to environmental information related to farming activities such as weather information, vegetation and crop growth information, seed information, pest and disease information and soil information. Environmental data may be obtained from external data sources accessible by the agricultural intelligence computer system. Environmental data may also be obtained from internal data sources integrated within the agricultural intelligence computer system. Data sources for environmental data may include weather radar sources, satellite-based precipitation sources, meteorological data sources (e.g., weather stations), satellite imagery sources, aerial imagery sources (e.g., airplanes, unmanned aerial vehicles), terrestrial imagery sources (e.g., agricultural machine, unmanned terrestrial vehicle), soil sources and databases, seed databases, crop phenology sources and databases, and pest and disease reporting and prediction sources and databases. For example, a soil database may relate soil types and soil locations to soil data including pH levels, organic matter makeups, and cation exchange capacities. Although in many examples, the user may access data from data sources indirectly via the agricultural intelligence computer system, in other examples, the user may directly access the data sources via any suitable network connection.

The agricultural intelligence computer system processes the plurality of field definition data, field-specific data and environmental data from a plurality of data sources to provide a user with the plurality of field condition data for the field or field region identified by the field definition data. The term "field condition data" refers to characteristics and conditions of a field that may be used by the agricultural intelligence computer system to manage and recommend agricultural activities. Field condition data may include, for example, and without limitation, field weather conditions, field workability conditions, growth stage conditions, soil moisture, and precipitation conditions. Field condition data is presented to the user using the user device.

The agricultural intelligence computer system also provides a user with a plurality of agricultural intelligence services for the land tract or field region identified by the field definition data. Such agricultural intelligence services may be used to recommend courses of action for the user to undertake. In an example embodiment, the recommendation services include a planting advisor, a nitrogen application advisor, a pest advisor, a field health advisor, a harvest advisor, and a revenue advisor. Each is discussed herein.

System Architecture

As noted above, the agricultural intelligence computer system may be implemented using a variety of distinct computing devices using any suitable network. In an example embodiment, the agricultural intelligence computer system uses a client-server architecture configured for exchanging data over a network (e.g., the Internet). One or more user devices may communicate via a network with a user application or an application platform. The application platform represents an application available on user devices that may be used to communicate with agricultural intelligence computer system. Other example embodiments may include other network architectures, such as peer-to-peer or distributed network environment.

The application platform may provide server-side functionality, via the network to one or more user devices. Accordingly, the application platform may include client side software stored locally at the user device as well as server side software stored at the agricultural intelligence computer system. In an example embodiment, the user device may access the application platform via a web client or a programmatic client. The user device may transmit data to, and receive data from one or more front-end servers. In an example embodiment, the data may take the form of requests and user information input, such as field-specific data, into the user device. One or more front-end servers may process the user device requests and user information and determine whether the requests are service requests or content requests, among other things. Content requests may be transmitted to one or more content management servers for processing. Application requests may be transmitted to one or more application servers. In an example embodiment, application requests may take the form of a request to provide field condition data and/or agricultural intelligence services for one or more fields.

In an example embodiment, the application platform may include one or more servers in communication with each other. For example, the agricultural intelligence computer system may include front-end servers, application servers, content management servers, account servers, modeling servers, environmental data servers, and corresponding databases. As noted above, environmental data may be obtained from external data sources accessible by the agricultural intelligence computer system or it may be obtained from internal data sources integrated within the agricultural intelligence computer system.

In an example embodiment, external data sources may include third-party hosted servers that provide services to the agricultural intelligence computer system via Application Program Interface (API) requests and responses. The frequency at which the agricultural intelligence computer system may consume data published or made available by these third-party hosted servers may vary based on the type of data. In an example embodiment, a notification may be sent to the agricultural intelligence computer system when new data is available by a data source. The agricultural intelligence computer system may transmit an API call via the network to the agricultural intelligence computer system hosting the data and receive the new data in response to the call. To the extent needed, the agricultural intelligence computer system may process the data to enable components of the application platform to handle the data. For example, processing data may involve extracting data from a stream or a data feed and mapping the data to a data structure, such as an XML data structure. Data received and/or processed by the agricultural intelligence computer system may be transmitted to the application platform and stored in an appropriate database.

When an application request is made, the one or more application servers communicate with the content management servers, account servers, modeling servers, environmental data servers, and corresponding databases. In one example, modeling servers may generate a predetermined number of simulations (e.g., 10,000 simulations) using, in part, field-specific data and environmental data for one or more fields identified based on field definition data and user information. Depending on the type of application request, the field-specific data and environmental data for one or more fields may be located in the content management servers, account servers, environmental data servers, the corresponding databases, and, in some instances, archived in the modeling servers and/or application servers. Based on the simulations generated by the modeling servers, field condition data and/or agricultural intelligence services for one or more fields is provided to the application servers for transmission to the requesting user device via the network. More specifically, the user may use the user device to access a plurality of windows or displays showing field condition data and/or agricultural intelligence services, as described below.

Although the aforementioned application platform has been configured with various example embodiments above, one skilled in the art will appreciate that any configuration of servers may be possible and that example embodiments of the present disclosure need not be limited to the configurations disclosed herein.

Field Condition Data

Field Weather and Temperature Conditions

As part of the field condition data provided, the agricultural intelligence computer system tracks field weather conditions for each field identified by the user. The agricultural intelligence computer system determines current weather conditions including field temperature, wind, humidity, and dew point. The agricultural intelligence computer system also determines forecasted weather conditions including field temperature, wind, humidity, and dew point for hourly projected intervals, daily projected intervals, or any interval specified by the user. The forecasted weather conditions are also used to forecast field precipitation, field workability, and field growth stage. Near-term forecasts are determined using a meteorological model (e.g., the Microcast model) while long-term projections are determined using historical analog simulations.

The agricultural intelligence computer system uses grid temperatures to determine temperature values. Known research shows that using grid techniques provides more accurate temperature measurements than point-based temperature reporting. Temperature grids are typically square physical regions, typically 2.5 miles by 2.5 miles. The agricultural intelligence computer system associates the field with a temperature grid that contains the field. The agricultural intelligence computer system identifies a plurality of weather stations that are proximate to the temperature grid. The agricultural intelligence computer system receives temperature data from the plurality of weather stations. The temperatures reported by the plurality of weather stations are weighted based on their relative proximity to the grid such that more proximate weather stations have higher weights than less proximate weather stations. Further, the relative elevation of the temperature grid is compared to the elevation of the plurality of weather stations. Temperature values reported by the plurality of weather stations are adjusted in response to the relative difference in elevation. In some examples, the temperature grid includes or is adjacent to a body of water. Bodies of water are known to cause a reduction in the temperature of an area. Accordingly, when a particular field is proximate to a body of water as compared to the weather station providing the temperature reading, the reported temperature for the field is adjusted downwards to account for the closer proximity to the body of water.

Precipitation values are similarly determined using precipitation grids that utilize meteorological radar data. Precipitation grids have similar purposes and characteristics as temperature grids. Specifically, the agricultural intelligence computer system uses available data sources such as the National Weather Service's NEXRAD Doppler radar data, rain gauge networks, and weather stations across the U.S. The agricultural intelligence computer system further validates and calibrates reported data with ground station and satellite data. In the example embodiment, the Doppler radar data is obtained for the precipitation grid. The Doppler radar data is used to determine an estimate of precipitation for the precipitation grid. The estimated precipitation is adjusted based on other data sources such as other weather radar sources, ground weather stations (e.g., rain gauges), satellite precipitation sources (e.g., the National Oceanic and Atmospheric Administration's Satellite Applications and Research), and meteorological sources. By utilizing multiple distinct data sources, more accurate precipitation tracking may be accomplished.

Current weather conditions and forecasted weather conditions (hourly, daily, or as specified by the user) are displayed on the user device graphically along with applicable information regarding the specific field, such as field name, crop, acreage, field precipitation, field workability, field growth stage, soil moisture, and any other field definition data or field-specific data that the user may specify. Such information may be displayed on the user device in one or more combinations and level of detail as specified by the user.

In an example embodiment, temperature can be displayed as high temperatures, average temperatures and low temperatures over time. Temperature can be shown during a specific time and/or date range and/or harvest year and compared against prior times, years, including a 5 year average, a 15 year average, a 30 year average or as specified by the user.

In an example embodiment, precipitation can be displayed as the amount of precipitation and/or accumulated precipitation over time. Precipitation can be shown during a specific time period and/or date range and/or harvest year and compared against prior times, years, including a 5 year average, a 15 year average, a 30 year average or as specified by the user. Precipitation can also be displayed as past and future radar data. In an example embodiment, past radar may be displayed over the last 1.5 hours or as specified by the user. Future radar may be displayed over the next 6 hours or as specified by the user. Radar may be displayed as an overlay of an aerial image map showing the user's one or more fields where the user has the ability to zoom in and out of the map. Radar can be displayed as static at intervals selected by the user or continuously over intervals selected by the user. The underlying radar data received and/or processed by the agricultural intelligence computer system may be in the form of Gridded Binary (GRIB) files that includes forecast reflectivity files, precipitation type, and precipitation-typed reflectivity values.

Field Workability Conditions Data

As part of the field condition data, the agricultural intelligence computer system provides field workability conditions, which indicate the degree to which a field or section of a field (associated with the field definition data) may be worked for a given time of year using machinery or other implements. In an example embodiment, the agricultural intelligence computer system retrieves field historical precipitation data over a predetermined period of time, field predicted precipitation over a predetermined period of time, and field temperatures over a predetermined period of time. The retrieved data is used to determine one or more workability index.

In an example embodiment, the workability index may be used to derive three values of workability for particular farm activities. The value of "Good" workability indicates high likelihood that field conditions are acceptable for use of machinery or a specified activity during an upcoming time interval. The value of "Check" workability indicates that field conditions may not be ideal for the use of machinery or a specified activity during an upcoming time interval. The value of "Stop" workability indicates that field conditions are not suitable for work or a specified activity during an upcoming time interval.

Determined values of workability may vary depending upon the farm activity. For example, planting and tilling typically require a low level of muddiness and may require a higher workability index to achieve a value of "Good" than activities that allow for a higher level of muddiness. In some embodiments, workability indices are distinctly calculated for each activity based on a distinct set of factors. For example, a workability index for planting may correlate to predicted temperature over the next 60 hours while a workability index for harvesting may be correlated to precipitation alone. In some examples, user may be prompted at the user device to answer questions regarding field activities if such information has not already been provided to the agricultural intelligence computer system. For example, a user may be asked what field activities are currently in use. Depending upon the response, the agricultural intelligence computer system may adjust its calculations of the workability index because of the user's activities, thereby incorporating the feedback of the user into the calculation of the workability index. Alternately, the agricultural intelligence computer system may adjust the recommendations made to the user for activities. In a further example, the agricultural intelligence computer system may recommend that the user stop such activities based on the responses.

Field Growth Stage Conditions

As part of the field condition data provided, the agricultural intelligence computer system provides field growth stage conditions (e.g., for corn, vegetative (VE-VT) and reproductive (R1-R6) growth stages) for the crops being grown in each listed field. Vegetative growth stages for corn typically are described as follows. The "VE" stage indicates emergence, the "V1" stage indicates a first fully expanded leaf with a leaf collar; the "V2" stage indicates a second fully expanded leaf with the leaf collar; the "V3" stage indicates a third fully expanded leaf with the leaf collar; any "V(n)" stage indicates an nth fully expanded leaf with the leaf collar; and the "VT" stage indicates that the tassel of the corn is fully emerged. In the reproductive growth stage model described, "R1" indicates a silking period in which pollination and fertilization processes take place; the "R2" or blister stage (occurring 10-14 days after R1) indicates that the kernel of corn is visible and resembles a blister; the "R3" or milk stage (occurring 18-22 days after R1) indicates that the kernel is yellow outside and contains milky white fluid; the "R4" or dough stage (occurring 24-28 days after R1) indicates that the interior of the kernel has thickened to a dough-like consistency; the "R5" or dent stage (occurring 35-42 days after R1) indicates that the kernels are indented at the top and beginning drydown; and the "R6" or physiological maturity stage (occurring 55-65 days after R1) indicates that kernels have reached maximum dry matter accumulation. Field growth stage conditions may be used to determine timing of key farming decisions. The agricultural intelligence computer system computes crop progression for each crop through stages of growth (agronomic stages) by tracking the impact of weather (both historic and forecasted) on the phenomenological development of the crop from planting through harvest.

In the example embodiment, the agricultural intelligence computer system uses the planting date entered by the user device to determine field growth stage conditions. In other words, the user may enter the planting date into the user device, which communicates the planting date to the agricultural intelligence computer system. Alternately, the agricultural intelligence computer system may estimate the planting date using a system algorithm. Specifically, the planting date may be estimated based on agronomic stage data and planting practices in the region associated with the field definition data. The planting practices may be received from a data service such as a university data network that monitors typical planting techniques for a region. The agricultural intelligence computer system further uses data regarding the user's farming practices within the current season and for historical seasons, thereby facilitating historical analysis. In other words, the agricultural intelligence computer system is configured to use historical practices of each particular grower on a subject field or to alternately use historical practices for the corresponding region to predict the planting date of a crop when the actual planting date is not provided by the grower. The agricultural intelligence computer system determines a relative maturity value of the crops based on expected heat units over the growing season in light of the planting date, the user's farming practices, and field-specific data. As heat is a proxy for energy received by crops, the agricultural intelligence computer system calculates expected heat units for crops and determines a development of maturity of the crops. In the example embodiment, maximum temperatures and low temperatures are used to estimate heat units.

Soil Moisture

As part of the field condition data, the agricultural intelligence computer system determines and provides soil moisture data via a display showing a client application on the user device. Soil moisture indicates the percent of total water capacity available to the crop that is present in the soil of the field. Soil moisture values are initialized at the beginning of the growing season based on environmental data in the agricultural intelligence computer system at that time, such as data from the North American Land Data Assimilation System, and field-specific data. In another embodiment, a soil analysis computing device may analyze soil samples from a plurality of fields for a grower wherein the plurality of fields includes a selected field. Once analyzed, the results may be directly provided from the soil analysis computing device to the agricultural intelligence computer system so that the soil analysis results may be provided to the grower. Further, data from the soil analysis may be inputted into the agricultural intelligence computer system for use in determining field condition data and agricultural intelligence services.

Soil moisture values are then adjusted, at least daily, during the growing season by tracking moisture entering the soil via precipitation and moisture leaving the soil via evapotranspiration (ET).

In some examples, water that is received in an area as precipitation does not enter the soil because it is lost as run off. Accordingly, in one example, a gross and net precipitation value is calculated. Gross precipitation indicates a total precipitation value. Net precipitation excludes a calculated amount of water that never enters the soil because it is lost as runoff. A runoff value is determined based on the precipitation amount over time and a curve determined by the USDA classification of soil type. The systems account for a user's specific field-specific data related to soil to determine runoff and the runoff curve for the specific field. Soil input data, described above, may alternately be provided via the soil analysis computing device. Lighter, sandier soils allow greater precipitation water infiltration and experience less runoff during heavy precipitation events than heavier, more compact soils. Heavier or denser soil types have lower precipitation infiltration rates and lose more precipitation to runoff on days with large precipitation events.

Daily evapotranspiration associated with a user's specific field is calculated based on a version of the standard Penman-Monteith ET model. The total amount of water that is calculated as leaving the soil through evapotranspiration on a given day is based on the following:

1. Maximum and minimum temperatures for the day: Warmer temperatures result in greater evapotranspiration values than cooler temperatures.
2. Latitude: During much of the corn growing season, fields at more northern latitudes experience greater solar radiation than fields at more southern latitudes due to longer days. But fields at more northern latitudes also get reduced radiation due to earth tilting. Areas with greater net solar radiation values will have relatively higher evapotranspiration values than areas with lower net solar radiation values.
3. Estimated crop growth stage: Growth stages around pollination provide the highest potential daily evapotranspiration values while growth stages around planting and late in grain fill result in relatively lower daily evapotranspiration values, because the crop uses less water in these stages of growth.
4. Current soil moisture: The agricultural intelligence computer system's model accounts for the fact that crops conserve and use less water when less water is available in the soil. The reported soil moisture values reported that are above a certain percentage, determined by crop type, provide the highest potential evapotranspiration values and potential evapotranspiration values decrease as soil moisture values approach 0%. As soil moisture values fall below this percentage, corn will start conserving water and using soil moisture at less than optimal rates. This water conservation by the plant increases as soil moisture values decrease, leading to lower and lower daily evapotranspiration values.
5. Wind: Evapotranspiration takes into account wind; however, evapotranspiration is not as sensitive to wind as to the other conditions. In an example embodiment, a set wind speed of 2 meters per second is used for all evapotranspiration calculations.

Alerts and Reporting

The agricultural intelligence computer system is additionally configured to provide alerts based on weather and field-related information. Specifically, the user may define a plurality of thresholds for each of a plurality of alert categories. When field condition data indicates that the thresholds have been exceeded, the user device will receive alerts. Alerts may be provided via the application (e.g., notification upon login, push notification), email, text messages, or any other suitable method. Alerts may be defined for crop cultivation monitoring, for example, hail size, rainfall, overall precipitation, soil moisture, crop scouting, wind conditions, field image, pest reports or disease reports. Alternately, alerts may be provided for crop growth strategy. For example, alerts may be provided based on commodity prices, grain prices, workability indexes, growth stages, and crop moisture content. In some examples, an alert may indicate a recommended course of action. For example, the alert may recommend that field activities (e.g., planting, nitrogen application, pest and disease treatment, irrigation application, scouting, or harvesting) occur within a particular period of time. The agricultural intelligence computer system is also configured to receive information on farming activities from, for example, the user device, an agricultural machine and/or agricultural machine computing device, or any other source. Accordingly, alerts may also be provided based on logged farm activity such as planting, nitrogen application, spraying, irrigation, scouting, or harvesting. In some examples, alerts may be provided regardless of thresholds to indicate certain field conditions. In one example, a daily precipitation, growth stage, field image or temperature alert may be provided to the user device.

The agricultural intelligence computer system is further configured to generate a plurality of reports based on field condition data. Such reports may be used by the user to improve strategy and decision-making in farming. The reports may include reports on crop growth stage, temperature, humidity, soil moisture, precipitation, workability, pest risk, and disease risk. The reports may also include one or more field definition data, environmental data, field-specific data, scouting and logging events, field condition data, summary of agricultural intelligence services or FSA Form 578.

Scouting and Notes

The agricultural intelligence computer system is also configured to receive supplemental information from the user device. For example, a user may provide logging or scouting events regarding the fields associated with the field definition data. The user may access a logging application at the user device and update the agricultural intelligence computer system. In one embodiment, the user accesses the agricultural intelligence computer system via a user device while being physically located in a field to enter field-specific data. The agricultural intelligence computer system might automatically display and transmit the date and time and field definition data associated with the field-specific data, such as geographic coordinates and boundaries. The user may provide general data for activities including field, location, date, time, crop, images, and notes. The user may also provide data specific to particular activities such as planting, nitrogen application, pesticide application, harvesting, scouting, and current weather observations. Such supplemental information may be associated with the other data networks and used by the user for analysis.

The agricultural intelligence computer system is additionally configured to display scouting and logging events related to the receipt of field-specific data from the user via one or more agricultural machines or agricultural machine devices that interacts with the agricultural intelligence computer system or via the user device. Such information can be displayed as specified by the user. In one example, the information is displayed on a calendar on the user device, wherein the user can obtain further details regarding the information as necessary. In another example, the information is displayed in a table on the user device, wherein the user can select the specific categories of information that the user would like displayed.

The agricultural intelligence computer system also includes (or is in data communication with) a plurality of modules configured to analyze field condition data and other data available to the agricultural intelligence computer system and to recommend certain agricultural actions (or activities) to be performed relative to the fields being analyzed in order to maximize yield and/or revenue for the particular fields. In other words, such modules review field condition data and other data to recommend how to effectively enhance output and performance of the particular fields. The modules may be variously referred to as agricultural intelligence modules or, alternately as recommendation advisor components or agricultural intelligence services. As used herein, such agricultural intelligence modules may include, but are not limited to a) planting advisor module, b) nitrogen application advisor module, c) pest advisor module, d) field health advisor module, e) harvest advisor module, and f) revenue advisor module.

Agricultural Intelligence Services

Planting Advisor Module

The agricultural intelligence computer system is additionally configured to provide agricultural intelligence services related to planting. In one example embodiment, a planting advisor module provides planting date recommendations. The recommendations are specific to the location of the field and adapt to the current field condition data, along with weather predicted to be experienced by the specific fields.

In one embodiment, the planting advisor module receives one or more of the following data points for each field identified by the user (as determined from field definition data) in order to determine and provide such planting date recommendations:

1. A first set of data points is seed characteristic data. Seed characteristic data may include any relevant information related to seeds that are planted or will be planted. Seed characteristic data may include, for example, seed company data, seed cost data, seed population data, seed hybrid data, seed maturity level data, seed disease resistance data, and any other suitable seed data. Seed company data may refer to the manufacturer or provider of seeds. Seed cost data may refer to the price of seeds for a given quantity, weight, or volume of seeds. Seed population data may include the amount of seeds planted (or intended to be planted) or the density of seeds planted (or intended to be planted). Seed hybrid data may include any information related to the biological makeup of the seeds (i.e., which plants have been hybridized to form a given seed.) Seed maturity level data may include, for example, a relative maturity level of a given seed (e.g., a comparative relative maturity ("CRM") value or a silk comparative relative maturity ("silk CRM")), growing degree units ("GDUs") until a given stage such as silking, mid-pollination, black layer, or flowering, and a relative maturity level of a given seed at physiological maturity ("Phy. CRM"). Disease resistance data may include any information related to the resistance of seeds to particular diseases. In the example embodiment, disease resistance data includes data related to the resistance to Gray Leaf Spot, Northern Leaf Blight, Anthracnose Stalk Rot, Goss's Wilt, Southern Corn Leaf Blight, Eyespot, Common Rust, Anthracnose Leaf Blight, Southern Rust, Southern Virus Complex, Stewart's Leaf Blight, Corn Lethal Necrosis, Headsmut, *Diplodia* Ear Rot, and *Fusarium* Crown Rot. Other suitable seed data may include, for example, data related to, grain drydown, stalk strength, root strength, stress emergence, staygreen, drought tolerance, ear flex, test eight, plant height, ear height, mid-season brittle stalk, plant vigor, fungicide response, growth regulators sensitivity, pigment inhibitors, sensitivity, sulfonylureas sensitivity, harvest timing, kernel texture, emergence, harvest appearance, harvest population, seedling growth, cob color, and husk cover.
2. A second set of data points is field-specific data related to soil composition. Such field-specific data may include measurements of the acidity or basicity of soil (e.g., pH levels), soil organic matter levels ("OM" levels), and cation exchange capacity levels ("CEC" levels).
3. A third set of data points is field-specific data related to field data. Such field-specific data may include field names and identifiers, soil types or classifications, tilling status, irrigation status.
4. A fourth set of data points is field-specific data related to historical harvest data. Such field-specific data may include crop type or classification, harvest date, actual production history ("APH"), yield, grain moisture, and tillage practice.
5. In some examples, users may be prompted at the user device to provide a fifth set of data points by answering questions regarding desired planting population (e.g., total crop volume and total crop density for a particular field) and/or seed cost, expected yield, and indication of risk preference (e.g., general or specific: user is willing to risk a specific number of bushels per acre to increase the chance of producing a specific larger number of bushels per acre) if such information has not already been provided to the agricultural intelligence computer system.

The planting advisor module receives and processes the sets of data points to simulate possible yield potentials. Possible yield potentials are calculated for various planting dates. The planting advisor module additionally utilizes additional data to generate such simulations. The additional data may include simulated weather between the planting data and harvesting date, field workability, seasonal freeze risk, drought risk, heat risk, excess moisture risk, estimated soil temperature, and/or risk tolerance. The likely harvesting date may be estimated based upon the provided relative maturity (e.g., to generate an earliest recommended harvesting date) and may further be adjusted based upon predicted weather and workability. Risk tolerance may be calculated based for a high profit/high risk scenario, a low risk scenario, a balanced risk/profit scenario, and a user defined scenario. The planting advisor module generates such simulations for each planting date and displays a planting date recommendation for the user on the user device. The recommendation includes the recommended planting date, projected yield, relative maturity, and graphs the projected yield against planting date. In some examples, the planting advisor module also graphs planting dates against the projected yield loss resulting from spring freeze risk, fall freeze risk, drought risk, heat risk, excess moisture risk, and estimated soil temperature. In some examples, such graphs are generated based on the predicted temperatures and/or precipitation between each planting date and a likely or earliest recommended harvest date for the selected relative maturity. The planting advisor module provides the option of modeling and displaying alternative yield scenarios for planting data and projected yield by modifying one or more data points associated with seed characteristic data, field-specific data, desired planting population and/or seed cost, expected yield, and/or indication of risk preference. The alternative yield scenarios may be displayed and graphed on the user device along with the original recommendation.

In some examples, the planting advisor module recommends or excludes planting dates based on predicted workability. For example, dates at which a predicted planting-specific workability value is "Stop" may either be excluded or not recommended. In some examples, the planting advisor recommends or excludes planting dates based upon predicted weather events (e.g., temperature or precipitation). For examples, planting dates may be recommended after which likelihood of freezing is lower than associated threshold values.

In some examples, the planting advisor recommends seed characteristics or graphs estimated yield against planting date for various seed characteristics. For example, a graph of estimated yield against planting date may be generated for both the seed characteristic and a recommended seed characteristic. The recommended seed characteristic may be recommended based on any of the maximum yield at any planting date, the maximum average yield across a set of planting dates, or the earliest possible harvesting date (e.g., where a later harvesting date is not desired due to predicted weather, a relative maturity may be selected in order to enable a desired harvesting date).

Nitrogen Application Advisor Module

The agricultural intelligence computer system is additionally configured to provide agricultural intelligence services related to soil. The nitrogen application advisor module determines potential needs for nitrogen in the soil and recommends nitrogen application practices to a user. More specifically, the nitrogen application advisor module is configured to identify conditions when crop needs cannot be met by nitrogen present in the soil. In one example embodiment, a nitrogen application advisor module provides recommendations for sidedressing or spraying, such as date and rate, specific to the location of the field and adapted to the current field condition data. In one embodiment, the nitrogen application advisor module is configured to receive one or more of the following data points for each field identified by the user (as determined from field definition data):
1. A first set of data points includes environmental information. Environmental information may include information related to weather, precipitation, meteorology, soil and crop phenology.
2. A second set of data points includes field-specific data related to field data. Such field-specific data may include field names and identifiers, soil types or classifications, tilling status, irrigation status.
3. A third set of data points includes field-specific data related to historical harvest data. Such field-specific data may include crop type or classification, harvest date, actual production history ("APH"), yield, grain moisture, and tillage practice.
4. A fourth set of data points is field-specific data related to soil composition. Such field-specific data may include measurements of the acidity or basicity of soil (e.g., pH levels), soil organic matter levels ("OM" levels), and cation exchange capacity levels ("CEC" levels).

5. A fifth set of data points is field-specific data related to planting data. Such field-specific data may include planting date, seed type or types, relative maturity (RM) levels of planted seed(s), and seed population. In some examples, the planting data is transmitted from a planter monitor to the agricultural intelligence computer system 150, e.g., via a cellular modem or other data communication device of the planter monitor.
6. A sixth set of data points is field-specific data related to nitrogen data. Such field-specific data may include nitrogen application dates, nitrogen application amounts, and nitrogen application sources.
7. A seventh set of data points is field-specific data related to irrigation data. Such field-specific data may include irrigation application dates, irrigation amounts, and irrigation sources.

Based on the sets of data points, the nitrogen application advisor module determines a nitrogen application recommendation. As described below, the recommendation includes a list of fields with adequate nitrogen, a list of fields with inadequate nitrogen, and a recommended nitrogen application for the fields with inadequate nitrogen.

In some examples, users may be prompted at the user device to answer questions regarding nitrogen application (e.g., side-dressing, spraying) practices and costs, such as type of nitrogen (e.g., Anhydrous Ammonia, Urea, UAN (Urea Ammonium Nitrate) 28%, 30% or 32%, Ammonium Nitrate, Ammonium Sulphate, Calcium Ammonium Sulphate), nitrogen costs, latest growth stage of crop at which nitrogen can be applied, application equipment, labor costs, expected crop price, tillage practice (e.g., type (conventional, no till, reduced, strip) and amount of surface of the field that has been tilled), residue (the amount of surface of the field covered by residue), related farming practices (e.g., manure application, nitrogen stabilizers, cover crops) as well as prior crop data (e.g., crop type, harvest date, Actual Production History (APH), yield, tillage practice), current crop data (e.g., planting date, seed(s) type, relative maturity (RM) of planted seed(s), seed population), soil characteristics (pH, OM, CEC) if such information has not already been provided to the agricultural intelligence computer system. For certain questions, such as latest growth stage of crop at which nitrogen can be applied, application equipment, labor costs, the user has the option to provide a plurality of alternative responses to that the agricultural intelligence computer system can optimize the nitrogen application advisor recommendation.

Using the environmental information, field-specific data, nitrogen application practices and costs, prior crop data, current crop data, and/or soil characteristics, the agricultural intelligence computer system identifies the available nitrogen in each field and simulates possible nitrogen application practices, dates, rates, and next date on which workability for a nitrogen application is "Green" taking into account predicted workability and nitrogen loss through leaching, denitrification and volatilization. The nitrogen application advisor module generates and displays on the user device a nitrogen application recommendation for the user. The recommendation includes:
1. The list of fields having enough nitrogen, including for each field the available nitrogen, last application data, and the last nitrogen rate applied.
2. The list of fields where nitrogen application is recommended, including for each field the available nitrogen, recommended application practice, recommended application dates, recommended application rate, and next data on which workability for the nitrogen application is "Green."

The user has the option of modeling (i.e., running a model) and displaying nitrogen lost (total and divided into losses resulting from volatilization, denitrification, and leaching) and crop use ("uptake") of nitrogen over a specified time period (predefined or as defined by the user) for the recommended nitrogen application versus one or more alternative scenarios based on a custom application practice, date and rate entered by the user. The user has the option of modeling and displaying estimated return on investment for the recommended nitrogen application versus one or more alternative scenarios based on a custom application practice, date and rate entered by the user. The alternative nitrogen application scenarios may be displayed and graphed on the user device along with the original recommendation. The user has the further option of modeling and displaying estimated yield benefit (minimum, average, and maximum) for the recommended nitrogen application versus one or more alternative scenarios based on a custom application practice, date and rate entered by the user. The user has the further option of modeling and displaying estimated available nitrogen over any time period specified by the user for the recommended nitrogen application versus one or more alternative scenarios based on a custom application practice, date and rate entered by the user. The user has the further option of running the nitrogen application advisor (using the nitrogen application advisor) for one or more sub-fields or management zones within a field.

Pest Advisor Module (or Pest and Disease Advisor Module)

The agricultural intelligence computer system is additionally configured to provide agricultural intelligence services related to pest and disease. The pest and disease advisor module is configured to identify risks posed to crops by pest damage and/or disease damage. In an example embodiment, the pest and disease advisor module identifies risks caused by the pests that cause that the most economic damage to crops in the U.S. Such pests include, for example, corn rootworm, corn earworm, soybean aphid, western bean cutworm, European corn borer, armyworm, bean leaf beetle, Japanese beetle, and twospotted spider mite. In some examples, the pest and disease advisor provides supplemental analysis for each pest segmented by growth stages (e.g., larval and adult stages). The pest and disease advisor module also identifies disease risks caused by the diseases that cause that the most economic damage to crops in the U.S. Such diseases include, for example, Gray Leaf Spot, Northern Leaf Blight, Anthracnose Stalk Rot, Goss's Wilt, Southern Corn Leaf Blight, Eyespot, Common Rust, Anthracnose Leaf Blight, Southern Rust, Southern Virus Complex, Stewart's Leaf Blight, Corn Lethal Necrosis, Headsmut, *Diplodia* Ear Rot, *Fusarium* Crown Rot. The pest advisor is also configured to recommend scouting practices and treatment methods to respond to such pest and disease risks. The pest advisor is also configured to provide alerts based on observations of pests in regions proximate to the user's fields.

In one embodiment, the pest and disease advisor may receive one or more of the following sets of data for each field identified by the user (as determined from field definition data):
1. A first set of data points is environmental information. Environmental information includes information related to weather, precipitation, meteorology, crop phenology and pest and disease reporting.

2. A second set of data points is seed characteristic data. Seed characteristic data may include any relevant information related to seeds that are planted or will be planted. Seed characteristic data may include, for example, seed company data, seed cost data, seed population data, seed hybrid data, seed maturity level data, seed disease resistance data, and any other suitable seed data. Seed company data may refer to the manufacturer or provider of seeds. Seed cost data may refer to the price of seeds for a given quantity, weight, or volume of seeds. Seed population data may include the amount of seeds planted (or intended to be planted) or the density of seeds planted (or intended to be planted). Seed hybrid data may include any information related to the biological makeup of the seeds (i.e., which plants have been hybridized to form a given seed.) Seed maturity level data may include, for example, a relative maturity level of a given seed (e.g., a comparative relative maturity ("CRM") value or a silk comparative relative maturity ("silk CRM")), growing degree units ("GDUs") until a given stage such as silking, mid-pollination, black layer, or flowering, and a relative maturity level of a given seed at physiological maturity ("Phy. CRM"). Disease resistance data may include any information related to the resistance of seeds to particular diseases. In the example embodiment, disease resistance data includes data related to the resistance to Gray Leaf Spot, Northern Leaf Blight, Anthracnose Stalk Rot, Goss's Wilt, Southern Corn Leaf Blight, Eyespot, Common Rust, Anthracnose Leaf Blight, Southern Rust, Southern Virus Complex, Stewart's Leaf Blight, Corn Lethal Necrosis, Headsmut, *Diplodia* Ear Rot, and *Fusarium* Crown Rot. Other suitable seed data may include, for example, data related to, grain drydown, stalk strength, root strength, stress emergence, staygreen, drought tolerance, ear flex, test eight, plant height, ear height, mid-season brittle stalk, plant vigor, fungicide response, growth regulators sensitivity, pigment inhibitors, sensitivity, sulfonylureas sensitivity, harvest timing, kernel texture, emergence, harvest appearance, harvest population, seedling growth, cob color, and husk cover.

3. A third set of data points is field-specific data related to planting data. Such field-specific data may include, for example, planting dates, seed type, relative maturity (RM) of planted seed, and seed population.

4. A fourth set of data points is field-specific data related to pesticide data. Such field-specific data may include, for example, pesticide application date, pesticide product type (specified by, e.g., EPA registration number), pesticide formulation, pesticide usage rate, pesticide acres tested, pesticide amount sprayed, and pesticide source.

In some examples, users may be prompted at the user device to answer questions regarding pesticide application practices and costs, such as type of product type, application date, formulation, rate, acres tested, amount, source, costs, latest growth stage of crop at which pesticide can be applied, application equipment, labor costs, expected crop price as well as current crop data (e.g., planting date, seed(s) type, relative maturity (RM) of planted seed(s), seed population) if such information has not already been provided to the agricultural intelligence computer system. Accordingly, the pest and disease advisor module receives such data from user devices. For certain questions, such as latest growth stage of crop at which pesticide can be applied, application equipment, labor costs, the user has the option to provide a plurality of alternative responses to that the agricultural intelligence computer system can optimize the pest and disease advisor recommendation.

The pest and disease advisor module is configured to receive and process all such sets of data points and received user data and simulate possible pesticide application practices. The simulation of possible pesticide practices includes, dates, rates, and next date on which workability for a pesticide application is "Green" taking into account predicted workability. The pest and disease advisor module generates and displays on the user device a scouting and treatment recommendation for the user. The scouting recommendation includes daily (or as specified by the user) times to scout for specific pests and diseases. The user has the option of displaying a specific subset of pests and diseases as well as additional information regarding a specific pest or disease. The treatment recommendation includes the list of fields where a pesticide application is recommended, including for each field the recommended application practice, recommended application dates, recommended application rate, and next data on which workability for the pesticide application is "Green." The user has the option of modeling and displaying estimated return on investment for the recommended pesticide application versus one or more alternative scenarios based on a custom application practice, date and rate entered by the user. The alternative pesticide application scenarios may be displayed and graphed on the user device along with the original recommendation. The user has the further option of modeling and displaying estimated yield benefit (minimum, average, and maximum) for the recommended pesticide application versus one or more alternative scenarios based on a custom application practice, date and rate entered by the user.

Field Health Advisor Module

The field health advisor module identifies crop health quality over the course of the season and uses such crop health determinations to recommend scouting or investigation in areas of poor field health. More specifically, the field health advisor module receives and processes field image data to determine, identify, and provide index values of biomass health. The index values of biomass health may range from zero (indicating no biomass) to 1 (indicating the maximum amount of biomass). In an example embodiment, the index value has a specific color scheme, so that every image has a color-coded biomass health scheme (e.g., brown areas show the areas in the field with the lowest relative biomass health). In one embodiment, the field health advisor module may receive one or more of the following data points for each field identified by the user (as determined from field definition data):

1. A first set of data points includes environmental information. Such environmental information includes information related to satellite imagery, aerial imagery, terrestrial imagery and crop phenology.

2. A second set of data points includes field-specific data related to field data. Such field-specific data may include field and soil identifiers such as field names, and soil types.

3. A third set of data points includes field-specific data related to soil composition data. Such field-specific data may include measurements of the acidity or basicity of soil (e.g., pH levels), soil organic matter levels ("OM" levels), and cation exchange capacity levels ("CEC" levels).

4. A fourth set of data points includes field-specific data related to planting data. Such field-specific data may include, for example, planting dates, seed type, relative maturity (RM) of planted seed, and seed population.

The field health advisor module receives and processes all such data points (along with field image data) to determine and identify a crop health index for each location in each field identified by the user each time a new field image is available. In an example embodiment, the field health advisor module determines a crop health index as a normalized difference vegetation index ("NDVI") based on at least one near-infrared ("NIR") reflectance value and at least one visible spectrum reflectance value at each raster location in the field. In another example embodiment, the crop health index is a NDVI based on multispectral reflectance.

The field health advisor module generates and displays on the user device the health index map as an overlay on an aerial map for each field identified by the user. In an example embodiment, for each field, the field health advisor module will display field image date, growth stage of crop at that time, soil moisture at that time, and health index map as an overlay on an aerial map for the field. In an example embodiment, the field image resolution is between 5 m and 0.25 cm. The user has the option of modeling and displaying a list of fields based on field image date and/or crop health index (e.g., field with lowest overall health index values to field with highest overall health index values, field with highest overall health index values to field with lowest overall health index values, lowest health index value variability within field, highest health index value variability within field, or as specified by the user). The user also has the option of modeling and displaying a comparison of crop health index for a field over time (e.g., side-by-side comparison, overlay comparison). In an example embodiment, the field health advisor module provides the user with the ability to select a location on a field to get more information about the health index, soil type or elevation at a particular location. In an example embodiment, the field health advisor module provides the user with the ability to save a selected location, the related information, and a short note so that the user can retrieve the same information on the user device while in the field.

Revenue Advisor Module

The agricultural intelligence computer system is additionally configured to provide agricultural intelligence services related to selling and marketing crops using a revenue advisor module.

The revenue advisor module is in data communication with the agricultural intelligence computer system. The revenue advisor module is configured to provide yield data, revenue data, and profit data estimates to the grower. In the example embodiment, the yield data, revenue data, and profit data relate to an individual field, and can further relate a plurality of additional fields associated with the grower. Yield data includes yield estimates for a high, low, and expected case for each field and at the national level. Revenue data includes revenue estimates based on national and local prices for each field. Profit data includes the expected profit for each field for the high, low, and expected cases. In some embodiments, the revenue advisor module is configured to also provide national yield projections and national and local crop prices. In one embodiment, the revenue advisor module is configured to receive one or more of the following data points for each field identified by the user (as determined from field definition data):

1. A first set of data points includes environmental information. Environmental information may include information related to weather, precipitation, meteorology, soil and crop phenology.
2. A second set of data points includes field-specific data related to field data. Such field-specific data may include field names and identifiers, soil types or classifications, tilling status, irrigation status.
3. A third set of data points includes field-specific data related to historical harvest data. Such field-specific data may include crop type or classification, harvest date, actual production history ("APH"), yield, grain moisture, and tillage practice.
4. A fourth set of data points is field-specific data related to soil composition. Such field-specific data may include measurements of the acidity or basicity of soil (e.g., pH levels), soil organic matter levels ("OM" levels), and cation exchange capacity levels ("CEC" levels).
5. A fifth set of data points is field-specific data related to planting data. Such field-specific data may include planting date, seed type or types, relative maturity (RM) levels of planted seed(s), and seed population.
6. A sixth set of data points is crop pricing data. Such crop pricing data may include current national and local crop prices including a plurality of delivery dates. Current national crop prices may be retrieved from a pricing data service. Current local crop prices may be retrieved from local grain elevators chosen by the grower.
7. A seventh set of data points is field-specific data related to cost data. Cost data may be provided by the grower or may be default values based on data retrieved from an environmental data source, such as a university data service, which provides regionally specific data or historical field-specific data.

The revenue advisor module is configured to calculate yield, revenue, and profit data for each field based on the sets of data points. For example and more specifically, for each field described by field definition data, the revenue advisor module retrieves specific weather data and soil conditions from the environmental data and the field-specific data provided by the agricultural intelligence computer system. The revenue advisor module calculates crop growth stage based on the crop identifiers and likelihood of future weather outcomes. The revenue advisor module combines the specific weather data, the soil conditions, the growth stage, and the likelihood of future weather outcomes to calculate a yield estimate for each field defined by field definition data. The revenue advisor module calculates the yield estimate for each field on a periodic basis, i.e., every day. The revenue advisor module displays the yield data to the user via the user device. The revenue advisor module may display the yield data for each individual field or may aggregate the yield data for the plurality of fields.

The revenue advisor module calculates the revenue data for each field described in the plurality of field definition data. The revenue advisor module calculates the revenue estimates for each field based on the yield estimate for that field and the received crop prices for the expected, high, and low cases. The revenue advisor module calculates the revenue estimates for each field on a periodic basis, i.e., every day. The revenue advisor module displays the revenue data to the user via the user device. The revenue advisor module may display the revenue data for each individual field or may aggregate the revenue data for the plurality of fields based on user input. The revenue advisor module also displays the national crop prices and the crop prices received from the local grain elevators.

The revenue advisor module calculates profit data for each field described in the plurality of field definition data. The described in the plurality of field definition data calculates the profit data based on the cost data and the revenue data for each field. Cost data can include, but is not limited to, cash rent, seed, fertilizer, irrigation, chemicals, pesticides, labor, machinery and equipment, operating interest, general costs, administrative costs, and other costs. The revenue advisor module also apportions the cost data for the plurality of fields into each field to calculate the profit data for each field. The revenue advisor module displays the profit data for the plurality of fields, for each individual field, and for each acre.

In the example embodiment, the revenue advisor module calculates national yield projections. In one embodiment, for each region of the country, the revenue advisor module retrieves specific weather data and soil conditions for that region from the agricultural intelligence computer system. The revenue advisor module calculates crop growth stage and likelihood of future weather outcomes. The revenue advisor module combines the specific weather data, the soil conditions, the growth stage, and the likelihood of future weather outcomes to calculate a yield estimate for each region of the nation to calculate nation yield projections. These projections are calculated on a periodic basis (e.g., daily). The revenue advisor module displays the national yield projections on the user device.

In other embodiments, the revenue advisor module compares historical values for the yield data, revenue data, and national yield projections with currently calculated values. The revenue advisor module displays the comparison for a period of time selected by the user.

A technical effect of the systems and methods described herein include at least one of (a) improved utilization of agricultural fields through improved field condition monitoring; (b) improved selection of time and method of fertilization; (c) improved selection of time and method of pest control; (d) improved selection of seeds planted for the given location of soil; (e) improved field condition data for at a micro-local level; and (f) improved selection of time of harvest.

More specifically, the technical effects can be achieved by performing at least one of the following steps: (a) receiving a plurality of field definition data, retrieving a plurality of input data from a plurality of data networks, determining a field region based on the field definition data, identifying a subset of the plurality of input data associated with the field region, determining a plurality of field condition data based on the subset of the plurality of input data, and providing the plurality of field condition data to the user device; (b) defining a precipitation analysis period, retrieving a set of recent precipitation data, a set of predicted precipitation data, and a set of temperature data associated with the precipitation analysis period from the subset of the plurality of input data, determining a workability index based on the set of recent precipitation data, the set of predicted precipitation data, and the set of temperature data, and providing a workability value to the user device based on the workability index; (c) receiving a prospective field activity, and determining the workability index based partially on the prospective field activity; (d) determining an initial crop moisture level, receiving a plurality of daily high and low temperatures, receiving a plurality of crop water usage, and determining a soil moisture level; (e) receiving a plurality of alert preferences from the user device, identifying a plurality of alert thresholds associated with the plurality of alert preferences, monitoring the subset of the plurality of input data, and alerting the user device when at least one of the alert thresholds is exceeded; (f) receiving a plurality of field definition data from at least one of a user device and an agricultural machine device; (g) identifying a grid associated with the field region, identifying, from a plurality of weather stations associated with the grid, wherein each of the plurality of weather stations is associated with a weather station location, identifying an associated weight for each of the plurality of weather stations based on each associated weather station location, receiving a temperature reading from each of the plurality of weather stations, and identifying a temperature value for the field region based on the plurality of temperature readings and each associated weight; (h) receiving a plurality of field definition data, retrieving a plurality of input data from a plurality of data networks, determining a field region based on the field definition data, identifying a subset of the plurality of input data associated with the field region, determining a plurality of field condition data based on the subset of the plurality of input data, identifying a plurality of field activity options, determining a recommendation score for each of the plurality of field activity options based at least in part on the plurality of field condition data, and providing a recommended field activity option from the plurality of field activity options based on the plurality of recommendation scores; (i) defining a precipitation analysis period, retrieving a set of recent precipitation data, a set of predicted precipitation data, and a set of temperature data associated with the precipitation analysis period from the subset of the plurality of input data, determining a workability index based on the set of recent precipitation data, the set of predicted precipitation data, and the set of temperature data, and identifying a recommended agricultural activity based, at least in part, on the workability index; (j) determining an initial crop moisture level, receiving a plurality of daily high and low temperatures, receiving a plurality of crop water usage, determining a soil moisture level for the field region, and identifying a plurality of crops to recommend based on the determined soil moisture level; (k) determining an expected heat unit value for the field region based on the input data, receiving a plurality of crop options considered for planting, wherein each of the plurality of crop options includes crop data, determining a relative maturity for each of the plurality of crop options based on the expected heat unit value and the crop data, and recommending a selected crop from the plurality of crop options based on the relative maturity for each of the plurality of crop options; (l) receiving a plurality of pest risk data wherein each of the plurality of pest risk data includes a pest identifier and a pest location, receiving a plurality of crop identifiers associated with a plurality of crops, receiving a plurality of pest spray information associated with the crop identifiers, determining a pest risk assessment associated with each of the plurality of crops, and recommending a spray strategy based on the plurality of pest risk assessments; (m) receiving a plurality of historical agricultural activities associated with each of the field region from a user device, and providing a recommended field activity option based at least in part on the plurality of historical agricultural activities; and (n) utilizing a grid-based model to obtain localized field condition data.

Alternatively or additionally, the systems and processes described herein achieve the technical effect by: (a) receiving a plurality of field definition data; (b) retrieving a plurality of input data from a plurality of data networks; (c) determining a field region based on the field definition data;

(d) identifying a subset of the plurality of input data associated with the field region; (e) calculating at least one yield projection for the field region based on the field definition data and the subset of the plurality of input data; (f) providing the at least one yield projection to a user device; (g) receiving at least one crop price based on the crop identifier associated with the field region; (h) calculating at least one revenue projection for the field region based on the at least crop price and the at least one yield projection; (i) providing the at least one revenue projection to the user device; (j) receiving cost data for the field region; (k) calculating at least one profit projection for the field region based on the cost data and the at least one revenue projection; (l) providing the at least one profit projection to the user device; (m) retrieving the plurality of input data from the plurality of data networks on a daily basis; (n) recalculating the at least one yield projection, the at least one revenue projection, and the at least one profit projection on a daily basis; (o) receiving, from the user device, a selection of at least one local crop price source; (p) determining at least one national crop price from the plurality of input data; (q) retrieving, from the at least one local crop price source, at least one local crop price based on the crop identifier associated with the field region; (r) calculating a first revenue projection based on the yield projection and at least one national crop price; (s) calculating a second revenue projection based on the yield projection and the at least one local crop price; (t) providing the first revenue projection and the second revenue projection for the field based on the yield projection and the at least one crop price; (u) determining a plurality of field regions based on the field definition data; (v) identifying a subset of the plurality of input data associated with each field region of the plurality of field regions; (w) calculating at least one yield projection for each field region based on the associated field definition data and the associated subset of input data; (x) selecting a crop identifier; (y) determining a plurality of field regions with the selected crop identifier; (z) aggregating the at least one yield projection for each field region in the plurality of field regions with the selected crop identifier; (aa) determining a national yield projection for the selected crop identifier based on the aggregation; and (ab) providing the national yield projection to the user device.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the management and recommendation of agricultural activities.

FIG. 1 is a diagram depicting an example agricultural environment 100 including a plurality of fields that are monitored and managed using an agricultural intelligence computer system. Example agricultural environment 100 includes grower 110 cultivating a plurality of fields 120 including a first field 122 and a second field 124. Grower 110 interacts with agricultural intelligence computer system 150 to effectively manage fields 120 and receive recommendations for agricultural activities to effectively utilize fields 120. Agricultural intelligence computer system 150 utilizes a plurality of computer systems 112, 114, 116, 118, 130A, 130B, and 140 to provide such services. Computer systems 112, 114, 116, 118, 130A, 130B, 140, and 150 and all associated sub-systems may be referred to as a "networked agricultural intelligence system." Although only one grower 110 and only two fields 120 are shown, it should be understood that multiple growers 110 having multiple fields 120 may utilize agricultural intelligence computer system 150.

In the example embodiment, grower 110 utilizes user devices 112, 114, 116, and/or 118 to interact with agricultural intelligence computer system 150. In one example, user device 112 is a smart watch, computer-enabled glasses, smart phone, PDA, or "phablet" computing device capable of transmitting and receiving information such as described herein. Alternately, grower 110 may utilize tablet computing device 114, or laptop 116 to interact with agricultural intelligence computer system 150. As user devices 112 and 114 are "mobile devices" with specific types and ranges of inputs and outputs, in at least some examples user devices 112 and 114 utilize specialty software (sometimes referred to as "apps") to interact with agricultural intelligence computer system 150.

In an example embodiment, agricultural machine 117 (e.g., combine, tractor, cultivator, plow, subsoiler, sprayer or other machinery used on a farm to help with farming) may be coupled to a computing device 118 ("agricultural machine computing device") that interacts with agricultural intelligence computer system 150 in a similar manner as user devices 112, 114, and 116. In some examples, agricultural machine computing device 118 could be a planter monitor, planter controller or a yield monitor. In some examples, the agricultural machine computing device 118 could be a planter monitor as disclosed in U.S. Pat. No. 8,738,243, incorporated herein by reference, or in International Patent Application No. PCT/US2013/054506, incorporated herein by reference. In some examples, the agricultural machine computing device 118 could be a yield monitor as disclosed in U.S. patent application Ser. No. 14/237,844, incorporated herein by reference. Agricultural machine 117 and agricultural machine computing device 118 may provide agricultural intelligence computer system 150 with field definition data 160 and field-specific data, as described below.

As described below and herein, grower (or user) 110 interacts with user devices 112, 114, 116, and/or 118 to obtain information regarding the management of fields 120. More specifically, grower 110 interacts with user devices 112, 114, 116, and/or 118 in order to obtain recommendations, services, and information related to the management of fields 120. Grower 110 provides field definition data 160 descriptive of the location, layout, geography, and topography of fields 120 via user devices 112, 114, 116, and/or 118. In an example embodiment, grower 110 may provide field definition data 160 to agricultural intelligence computer system 150 by accessing a map (served by agricultural intelligence computer system 150) on user device 112, 114, 116, and/or 118 and selecting specific CLUs that have been graphically shown on the map. In an alternative embodiment, grower 110 may identify field definition data 160 by accessing a map (served by agricultural intelligence computer system 150) on user device 112, 114, 116, and/or 118 and drawing boundaries of fields 120 (or, more specifically, field 122 and field 124) over the map. Such CLU selection or map drawings represent geographic identifiers. In alternative embodiments, the user may identify field definition data 160 by accessing field definition data 160 (provided as shape files or in a similar format) from the U.S. Department of Agriculture Farm Service Agency or other source via the user device and providing such field definition data 160 to the agricultural intelligence computer system. The land identified by "field definition data" may be referred to as a "field" or "land tract." As used herein, the land farmed, or "land tract", is contained in a region that may be referred to as a "field region." Such a "field region" may be coextensive with, for example, temperature grids or precipitation grids, as used and defined below.

Specifically, field definition data 160 defines the location of fields 122 and 124. As described herein, accurate locations of fields 122 and 124 are useful in order to identify field-specific & environmental data 170 and/or field condition data 180. Significant variations may exist in field conditions over small distances including variances in, for example, soil quality, soil composition, soil moisture levels, nitrogen levels, relative maturity of crops, precipitation, wind, temperature, solar exposure, other meteorological conditions, and workability of the field. As such, agricultural intelligence computer system 150 identifies a location for each of fields 122 and 124 based on field definition data 160 and identifies a field region for each of fields 122 and 124. As described above, in one embodiment agricultural intelligence computer system 150 utilizes a "grid" architectural model that subdivides land into grid sections that are 2.5 miles by 2.5 miles in dimension.

Accordingly, agricultural intelligence computer system 150 utilizes field definition data 160 to identify which field conditions and field data to process and determine for a particular field. In the example, data networks 130A and 130B represent data sources associated with fields 124 and 122, respectively, because the grid associated with field 122 is monitored by external data source 130B and the grid associated with field 124 is monitored by data network 130A. Each of data networks 130A and 130B may each have associated subsystems 131A, 132A, 133A, 134A (associated with data network 130A) and 131B, 132B, 133B, and 134B (associated with external data source 130B). Accordingly, field definition data 160 associates field 122 with data network 130A and field 124 with data network 130B. Such a distinction of regions covered by an data network 130A and 130B is provided for illustrative purposes. In operation, data networks 130A and 130B may be associated with a plurality of grids and be able to provide field-specific & environmental data 170 for a particular grid based on field definition data 160.

Data networks 130A and 130B, as described herein, receive a plurality of information to determine field-specific & environmental data 170. Data networks 130A and 130B may receive feeds of meteorological data from other external services or be associated with meteorological devices such as anemometer 135 and rain gauge 136. Accordingly, based on such devices 135 and 136 and other accessible data, data networks 130A and 130B provide field-specific & environmental data 170 to agricultural intelligence computer system 150.

Further, agricultural intelligence computer system may receive additional information from other data networks 140 to determine field-specific & environmental data 170 and field condition data 180. In the example, other data networks 140 receive inputs from aerial monitoring system 145 and satellite device 146. Such inputs 145 and 146 may provide field-specific & environmental data for a plurality of fields 120.

Using field-specific & environmental data 170 associated with each field 122 and 124 (as defined by field definition data 160), agricultural intelligence computer system determines field condition data 180 and/or at least one recommended agricultural activity 190, as described herein. Field condition data 180 substantially represents a response to a request from grower 110 for information related to field conditions of fields 120 including field weather conditions, field workability conditions, growth stage conditions, soil moisture, and precipitation conditions. Recommended agricultural activity 190 includes outputs from any of the plurality of services described herein including planting advisor, a nitrogen application advisor, a pest advisor, a field health advisor, a harvest advisor, and a revenue advisor. Accordingly, recommended agricultural activity 190 may include, for example, suggestions on planting, nitrogen application, pest response, field health remediation, harvesting, and sales and marketing of crops.

Agricultural intelligence computer system 150 may be implemented using a variety of distinct computing devices such as agricultural intelligence computing devices 151, 152, 153, and 154 using any suitable network. In an example embodiment, agricultural intelligence computer system 150 uses a client-server architecture configured for exchanging data over a network (e.g., the Internet) with other computer systems including systems 112, 114, 116, 118, 130A, 130B, and 140. One or more user devices 112, 114, 116, and/or 118 may communicate via a network using a suitable method of interaction including a user application (or application platform) stored on user devices 112, 114, 116, and/or 118 or using a separate application utilizing (or calling) an application platform interface. Other example embodiments may include other network architectures, such as peer-to-peer or distributed network environment.

The user application may provide server-side functionality, via the network to one or more user devices 112, 114, 116, and/or 118. In an example embodiment, user device 112, 114, 116, and/or 118 may access the user application via a web client or a programmatic client. User devices 112, 114, 116, and/or 118 may transmit data to, and receive data from, from one or more front-end servers. In an example embodiment, the data may take the form of requests and user information input, such as field-specific data, into the user device. One or more front-end servers may process the user device requests and user information and determine whether the requests are service requests or content requests, among other things. Content requests may be transmitted to one or more content management servers for processing. Application requests may be transmitted to one or more application servers. In an example embodiment, application requests may take the form of a request to provide field condition data and/or agricultural intelligence services for one or more fields 120.

In an example embodiment, agricultural intelligence computer system 150 may comprise one or more servers 151, 152, 153, and 154 in communication with each other. For example, agricultural intelligence computer system 150 may comprise front-end servers 151, application servers 152, content management servers 153, account servers 154, modeling servers 155, environmental data servers 156, and corresponding databases 157. As noted above, environmental data may be obtained from data networks 130A, 130B, and 140, accessible by agricultural intelligence computer system 150 or such environmental data may be obtained from internal data sources or databases integrated within agricultural intelligence computer system 150.

In an example embodiment, data networks 130A, 130B, and 140 may comprise third-party hosted servers that provide services to agricultural intelligence computer system 150 via Application Program Interface (API) requests and responses. The frequency at which agricultural intelligence computer system 150 may consume data published or made available by these third-party hosted servers 130A, 130B, and 140 may vary based on the type of data. In an example embodiment, a notification may be sent to the agricultural intelligence computer system when new data is available by a data source. Agricultural intelligence computer system 150 may transmit an API call via the network to servers 130A, 130B, and 140 hosting the data and receive the new data in response to the call. To the extent needed, agricultural intelligence computer system 150 may process the data to enable components of the agricultural intelligence computer system and user application to handle the data. For example, processing data may involve extracting data from a stream or a data feed and mapping the data to a data structure, such as an XML data structure. Data received and/or processed by agricultural intelligence computer system 150 may be transmitted to the application platform and stored in an appropriate database.

When an application request is made, one or more front end servers 151 communicate with applications servers 151, content management servers 153, account servers 154, modeling servers 155, environmental data servers 156, and corresponding databases 157. In one example, modeling servers 155 may generate a predetermined number of simulations (e.g., 10,000 simulations) using, in part, field-specific data and environmental data for one or more fields identified based on field definition data and user information. Depending on the type of application request, the field-specific data and environmental data for one or more fields may be located in content management servers 153, account servers 154, environmental data servers 156, corresponding databases 157, and, in some instances, archived in modeling servers 155 and/or application servers 152. Based on the simulations generated by modeling servers 155, field condition data and/or agricultural intelligence services for one or more fields is provided to application servers 152 for transmission to the requesting user device 112, 114, 116, and/or 118 via the network. More specifically, grower (or user) 110 may use user device 112, 114, 116, and/or 118 to access a plurality of windows or displays showing field condition data and/or agricultural intelligence services, as described below.

Figure 2:
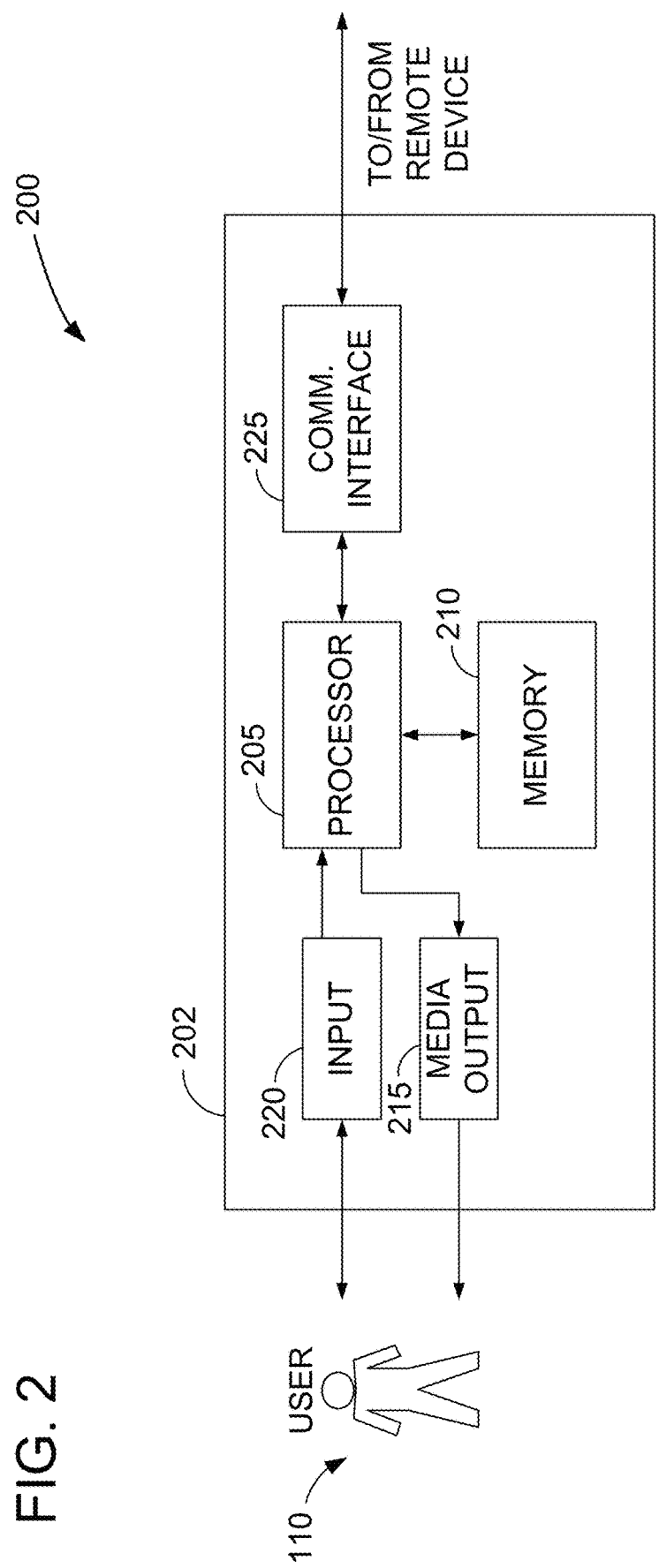
FIG. 2 is a block diagram of a user computing device, used for managing and recommending agricultural activities, as shown in the agricultural environment of FIG. 1.

FIG. 2 is a block diagram of a user computing device 202, used for managing and recommending agricultural activities, as shown in the agricultural environment of FIG. 1. User computing device 202 may include, but is not limited to, smartphone 112, tablet 114, laptop 116, and agricultural computing device 118 (all shown in FIG. 1). Alternately, user computing device 202 may be any suitable device used by user 110. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as agricultural intelligence computer system 150. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from agricultural intelligence computer system 150. A client application allows user 201 to interact with a server application from agricultural intelligence computer system 150.

As described herein, user system 202 may be associated with a variety of device characteristics. For example device characteristics may vary in terms of the operating system used by user device 202 in the initiating of the first transaction, the browser operating system used by user device 202 in the initiating of the first transaction, a plurality of hardware characteristics associated with user device 202 in the initiating of the first transaction, the internet protocol address associated with user device 202 in the initiating of the first transaction, the internet service provider associated with user device 202 in the initiating of the first transaction, display attributes and characteristics used by a browser used by user device 202 in the initiating of the first transaction, configuration attributes used by a browser used by user device 202 in the initiating of the first transaction, and software components used by user device 202 in the initiating of the first transaction. As further described herein, agricultural intelligence computer system 150 (shown in FIG. 1) is capable of receiving device characteristic data related to user system 202 and analyzing such data as described herein.

Figure 3:
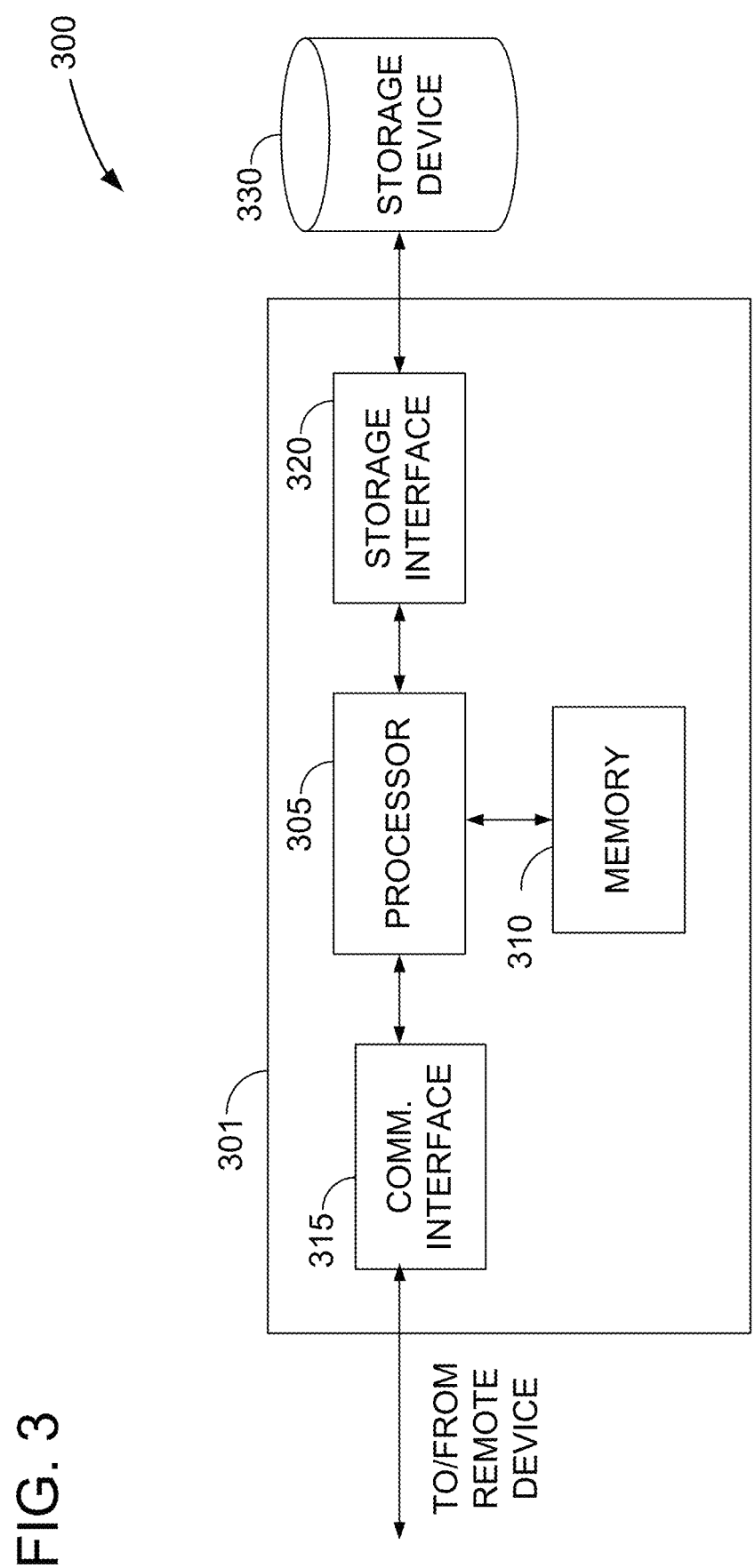
FIG. 3 is a block diagram of a computing device, used for managing and recommending agricultural activities, as shown in the agricultural environment of FIG. 1.

FIG. 3 is a block diagram of a computing device, used for managing and recommending agricultural activities, as shown in the agricultural environment of FIG. 1. Server system 301 may include, but is not limited to, data network systems 130A, 130B, and 140 and agricultural intelligence computer system 150. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, Python, or other suitable programming languages, etc.).

Processor 305 is operatively coupled to a communication interface 315 such that server system 301 is capable of communicating with a remote device such as a user system or another server system 301. For example, communication interface 315 may receive requests from user systems 112, 114, 116, and 118 via the Internet, as illustrated in FIGS. 2 and 3.

Processor 305 may also be operatively coupled to a storage device 330. Storage device 330 is any computer-operated hardware suitable for storing and/or retrieving data. In some embodiments, storage device 330 is integrated in server system 301. For example, server system 301 may include one or more hard disk drives as storage device 330. In other embodiments, storage device 330 is external to server system 301 and may be accessed by a plurality of server systems 301. For example, storage device 330 may include multiple storage units such as hard disks or solid state disks in a redundant array of inexpensive disks (RAID) configuration. Storage device 330 may include a storage area network (SAN) and/or a network attached storage (NAS) system.

In some embodiments, processor 305 is operatively coupled to storage device 330 via a storage interface 320. Storage interface 320 is any component capable of providing processor 305 with access to storage device 330. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 330.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
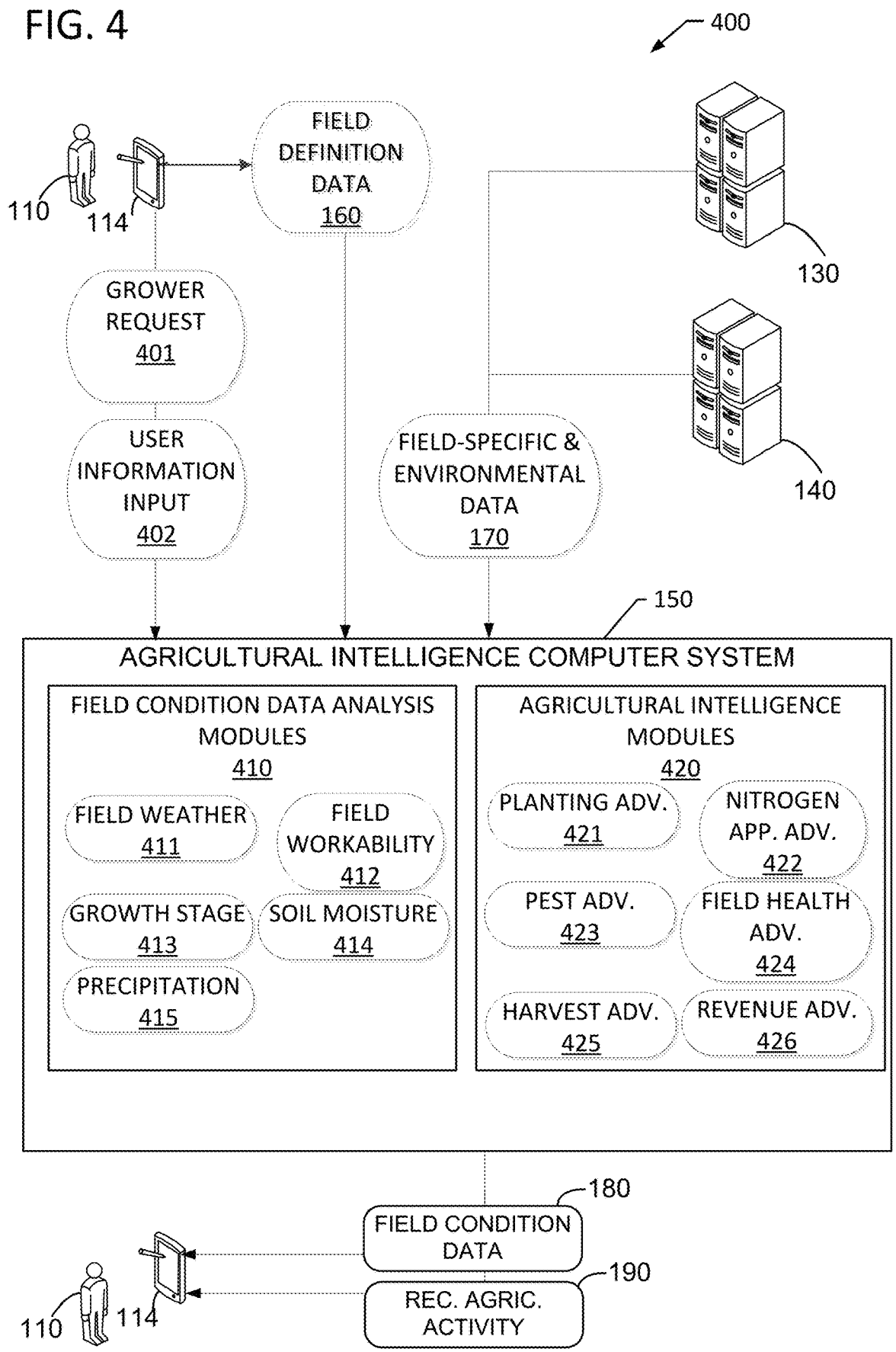
FIG. 4 is an example data flowchart of managing and recommending agricultural activities using the computing devices of FIGS. 1, 2, and 3 in the agricultural environment shown in FIG. 1.

FIG. 4 is an example data flowchart of managing and recommending agricultural activities using computing devices of FIGS. 1, 2, and 3 in the agricultural environment shown in FIG. 1. As described herein, grower 110 uses any suitable user device 112, 114, 116, and/or 118 (shown in FIG. 1) to specify grower request 401 which is transmitted to agricultural intelligence computer system 150. As described, grower 110 uses user application or application platform, served on user device 114, to interact with agricultural intelligence computer system 150 and make any suitable grower request 401. As described herein, grower request 401 may include a request for field condition data 180 and/or a request for a recommended agricultural activity 190.

The application platform (or user application) may provide server-side functionality, via the network to one or more user devices 114. In an example embodiment, user device 114 may access the application platform via a web client or a programmatic client. User device 114 may transmit data to, and receive data, from one or more front-end servers such as front end server 151 (shown in FIG. 1). In an example embodiment, the data may take the form of grower requests 401 and user information input 402, such as field-specific & environmental data 170 (provided by grower 110), into user device 114. One or more front-end servers 151 may process grower requests 401 and user information input 402 and determine whether grower requests 401 are service requests (i.e., requests for recommended agricultural activities 190) or content requests (i.e., requests for field condition data 180), among other things. Content requests may be transmitted to one or more content management servers 153 (shown in FIG. 1) for processing. Application requests may be transmitted to one or more application servers 152 (shown in FIG. 1). In an example embodiment, application requests may take the form of a grower request 401 to provide field condition data 180 and/or agricultural intelligence services for one or more fields 120 (shown in FIG. 1).

In an example embodiment, the application platform may comprise one or more servers 151, 152, 153, and 154 (shown in FIG. 1) in communication with each other. For example, agricultural intelligence computer system 150 may comprise front-end servers 151, application servers 152, content management servers 153, account servers 154, modeling servers 155, environmental data servers 156, and corresponding databases 157 (all shown in FIG. 1). Further, agricultural intelligence computer system includes a plurality of agricultural intelligence modules 158 and 159. In the example embodiment, agricultural intelligence modules 158 and 159 are harvest advisor module 158 and revenue advisor module 159. In further examples, planting advisor module, nitrogen application advisor module, pest and disease advisor module, and field health advisor module may be represented in agricultural intelligence computer system 150. As noted above, environmental data may be obtained from data networks 130 and 140 accessible by agricultural intelligence computer system 150 or it may be obtained from internal data sources integrated within agricultural intelligence computer system 150.

In an example embodiment, data networks 130 and 140 may comprise third-party hosted servers that provide services to agricultural intelligence computer system 150 via Application Program Interface (API) requests and responses. The frequency at which agricultural intelligence computer system 150 may consume data published or made available by these third-party hosted servers 130 and 140 may vary based on the type of data. In an example embodiment, a notification may be sent to agricultural intelligence computer system 150 when new data is made available. Agricultural intelligence computer system 150 may alternately transmit an API call via the network to external data sources 130 hosting the data and receive the new data in response to the call. To the extent needed, agricultural intelligence computer system 150 may process the data to enable components of the application platform to handle the data. For example, processing data may involve extracting data from a stream or a data feed and mapping the data to a data structure, such as an XML data structure. Data received and/or processed by agricultural intelligence computer system 150 may be transmitted to the application platform and stored in an appropriate database.

When an application request is made, one or more application servers 152 communicate with content management servers 153, account servers 154, modeling servers 155, environmental data servers 156, and corresponding databases 157. In one example, modeling servers 155 may generate a predetermined number of simulations (e.g., 10,000 simulations) using, in part, field-specific & environmental data 170 for one or more fields 120 identified based on field definition data 160 and user input information 402.

Depending on the type of grower request 401, field-specific & environmental data 170 for one or more fields 120 may be located in content management servers 153, account servers 154, modeling servers 155, environmental data servers 156, and corresponding databases 157, and, in some instances, archived in the application servers 152. Based on the simulations generated by modeling servers 155, field condition data 180 and/or agricultural intelligence services (i.e., recommended agricultural activities 190) for one or more fields 120 is provided to application servers 152 for transmission to requesting user device 114 via the network. More specifically, the user may use user device 114 to access a plurality of windows or displays showing field condition data 180 and/or recommended agricultural activities 190, as described below.

Although the aforementioned application platform has been configured with various exemplary embodiments above, one skilled in the art will appreciate that any configuration of servers may be possible and that example embodiments of the present disclosure need not be limited to the configurations disclosed herein.

In order to provide field condition data 180, agricultural intelligence computer system 150 runs a plurality of field condition data analysis modules 410. Field condition analysis modules include field weather data module 411 which is configured to determine weather conditions for each field 120 identified by grower 110. Agricultural intelligence computer system 150 uses field weather data module 411 to determine field temperature, wind, humidity, and dew point. Agricultural intelligence computer system 150 also uses field weather data module 411 to determine forecasted weather conditions including field temperature, wind, humidity, and dew point for hourly projected intervals, daily projected intervals, or any interval specified by grower 110. Field precipitation module 415, field workability module 412, and field growth stage module 413 also receive and process the forecasted weather conditions. Near-term forecasts are determined using a meteorological model (e.g., the Microcast model) while long-term projections are determined using historical analog simulations.

Agricultural intelligence computer system 150 uses grid temperatures to determine temperature values. Known research shows that using grid techniques provides more accurate temperature measurements than point-based temperature reporting. Temperature grids are typically square physical regions, typically 2.5 miles by 2.5 miles. Agricultural intelligence computer system 150 associates fields (e.g., fields 122 or 124) with a temperature grid that contains the field. Agricultural intelligence computer system 150 identifies a plurality of weather stations that are proximate to the temperature grid. Agricultural intelligence computer system 150 receives temperature data from the plurality of weather stations. The temperatures reported by the plurality of weather stations are weighted based on their relative proximity to the grid such that more proximate weather stations have higher weights than less proximate weather stations. Further, the relative elevation of the temperature grid is compared to the elevation of the plurality of weather stations. Temperature values reported by the plurality of weather stations are adjusted in response to the relative difference in elevation. In some examples, the temperature grid includes or is adjacent to a body of water. Bodies of water are known to cause a reduction in the temperature of an area. Accordingly, when a particular field is proximate to a body of water as compared to the weather station providing the temperature reading, the reported temperature for the field is adjusted downwards to account for the closer proximity to the body of water.

Precipitation values are similarly determined using precipitation grids that utilize meteorological radar data. Precipitation grids have similar purposes and characteristics as temperature grids. Specifically, agricultural intelligence computer system 150 uses available data sources such as the National Weather Service's NEXRAD Doppler radar data. Agricultural intelligence computer system 150 further validates and calibrates reported data with ground station and satellite data. In the example embodiment, the Doppler radar data is obtained for the precipitation grid. The Doppler radar data is used to determine an estimate of precipitation for the precipitation grid. The estimated precipitation is adjusted based on other data sources such as other weather radar sources, ground weather stations (e.g., rain gauges), satellite precipitation sources (e.g., the National Oceanic and Atmospheric Administration's Satellite Applications and Research), and meteorological sources. By utilizing multiple distinct data sources, more accurate precipitation tracking may be accomplished.

Current weather conditions and forecasted weather conditions (hourly, daily, or as specified by the user) are displayed on the user device graphically along with applicable information regarding the specific field, such as field name, crop, acreage, field precipitation, field workability, field growth stage, soil moisture, and any other field definition data or field-specific & environmental data 170 that the user may specify. Such information may be displayed on the user device in one or more combinations and level of detail as specified by the user.

In an example embodiment, temperature can be displayed as high temperatures, average temperatures and low temperatures over time. Temperature can be shown during a specific time and/or date range and/or harvest year and compared against prior times, years, including a 5 year average, a 15 year average, a 30 year average or as specified by the user.

In an example embodiment, field precipitation module 415 determines and provides the amount of precipitation and/or accumulated precipitation over time. Precipitation can be shown during a specific time period and/or date range and/or harvest year and compared against prior times, years, including a 5 year average, a 15 year average, a 30 year average or as specified by the user. Precipitation can also be displayed as past and future radar data. In an example embodiment, past radar may be displayed over the last 1.5 hours or as specified by the user. Future radar may be displayed over the next 6 hours or as specified by the user. Radar may be displayed as an overlay of an aerial image map showing the user's one or more fields where the user has the ability to zoom in and out of the map. Radar can be displayed as static at intervals selected by the user or continuously over intervals selected by the user. The underlying radar data received and/or processed by the agricultural intelligence computer system may be in the form of Gridded Binary (GRIB) files that includes forecast reflectivity files, precipitation type, and precipitation-typed reflectivity values.

As part of field condition data 180 provided, agricultural intelligence computer system 150 runs or executes field workability data module 412, which processes field-specific & environmental data 170 and user information output 402 to determine the degree to which a field or section of a field (associated with the field definition data) may be worked for a given time of year using machinery or other implements.

In an example embodiment, agricultural intelligence computer system 150 retrieves field historical precipitation data over a predetermined period of time, field predicted precipitation over a predetermined period of time, and field temperatures over a predetermined period of time. The retrieved data is used to determine one or more workability index as determined by field workability data module 412.

In an example embodiment, the workability index may be used to derive three values of workability for particular farm activities. The value of "Good" workability indicates high likelihood that field conditions are acceptable for use of machinery or a specified activity during an upcoming time interval. The value of "Check" workability indicates that field conditions may not be ideal for the use of machinery or a specified activity during an upcoming time interval. The value of "Stop" workability indicates that field conditions are not suitable for work or a specified activity during an upcoming time interval.

Determined values of workability may vary depending upon the farm activity. For example, planting and tilling typically require a low level of muddiness and may require a higher workability index to achieve a value of "Good" than activities that allow for a higher level of muddiness. In some embodiments, workability indices are distinctly calculated for each activity based on a distinct set of factors. For example, a workability index for planting may correlate to predicted temperature over the next 60 hours while a workability index for harvesting may be correlated to precipitation alone. In some examples, user may be prompted at the user device to answer questions regarding field activities if such information has not already been provided to agricultural intelligence computer system 150. For example, a user may be asked what field activities are currently in use. Depending upon the response, agricultural intelligence computer system 150 may adjust its calculations of the workability index because of the user's activities, thereby incorporating the feedback of the user into the calculation of the workability index. Alternately, agricultural intelligence computer system 150 may adjust the recommendations made to the user for activities. In a further example, agricultural intelligence computer system 150 may recommend that the user stop such activities based on the responses.

As part of field condition data 180 provided, agricultural intelligence computer system 150 runs or executes field growth stage data module 413 (e.g., for corn, vegetative (VE-VT) and reproductive (R1-R6) growth stages). Field growth stage data module 413 receives and processes field-specific & environmental data 170 and user information input 402 to determine timings of key farming decisions. Agricultural intelligence computer system 150 computes crop progression for each crop through stages of growth (agronomic stages) by tracking the impact of weather on the phenomenological development of the crop from planting through harvest.

In the example embodiment, agricultural intelligence computer system 150 uses the planting date entered by the user device. Alternately, agricultural intelligence computer system 150 may estimate the planting date using a system algorithm. Specifically, the planting date may be estimated based on agronomic stage data and planting practices in the region associated with the field definition data. The planting practices may be received from a data service such as a university data network that monitors typical planting techniques for a region. Agricultural intelligence computer system 150 further uses data regarding the user's farming practices within the current season and for historical seasons, thereby facilitating historical analysis. Agricultural intelligence computer system 150 determines a relative maturity value of the crops based on expected heat units over the growing season in light of the planting date, the user's farming practices, and field-specific & environmental data 170. As heat is a proxy for energy received by crops, agricultural intelligence computer system 150 calculates expected heat units for crops and determines a development of maturity of the crops.

As part of field condition data 180 provided, agricultural intelligence computer system 150 uses and executes soil moisture data module 414. Soil moisture data module 414 is configured to determine the percent of total water capacity available to the crop that is present in the soil of the field. Soil moisture data module 414 initializes output at the beginning of the growing season based on environmental data in agricultural intelligence computer system 150 at that time, such as data from the North American Land Data Assimilation System, and field-specific & environmental data 170.

Soil moisture values are then adjusted, at least daily, during the growing season by tracking moisture entering the soil via precipitation and moisture leaving the soil via evapotranspiration (ET). Precipitation excludes a calculated amount of water that never enters the soil because it is lost as runoff. A runoff value is determined based on the precipitation amount over time and a curve determined by the USDA classification of soil type. The agricultural intelligence computer systems accounts for a user's specific field-specific & environmental data 170 related to soil to determine runoff and the runoff curve for the specific field. Lighter, sandier soils allow greater precipitation water infiltration and experience less runoff during heavy precipitation events than heavier, more compact soils. Heavier or denser soil types have lower precipitation infiltration rates and lose more precipitation to runoff on days with large precipitation events.

Daily evapotranspiration associated with a user's specific field is calculated based on a version of the standard Penman-Monteith ET model. The total amount of water that is calculated as leaving the soil through evapotranspiration on a given day is based on the following:

1. Maximum and minimum temperatures for the day: Warmer temperatures result in greater evapotranspiration values than cooler temperatures.
2. Latitude: During much of the corn growing season, fields at more northern latitudes experience greater solar radiation than fields at more southern latitudes due to longer days. But fields at more northern latitudes also get reduced radiation due to earth tilting. Areas with greater net solar radiation values will have relatively higher evapotranspiration values than areas with lower net solar radiation values.
3. Estimated crop growth stage: Growth stages around pollination provide the highest potential daily evapotranspiration values while growth stages around planting and late in grain fill result in relatively lower daily evapotranspiration values, because the crop uses less water in these stages of growth.
4. Current soil moisture: The agricultural intelligence computer system's model accounts for the fact that crops conserve and use less water when less water is available in the soil. The reported soil moisture values reported that are above a certain percentage, determined by crop type, provide the highest potential evapotranspiration values and potential evapotranspiration values decrease as soil moisture values approach 0%. As soil moisture values fall below this percentage, corn will start conserving water and using soil moisture at less than optimal rates. This water conservation by the plant increases as soil moisture values decrease, leading to lower and lower daily evapotranspiration values.
5. Wind: Evapotranspiration takes into account wind; however, evapotranspiration is not as sensitive to wind as to the other conditions. In an example embodiment, a set wind speed of 2 meters per second is used for all evapotranspiration calculations.

Agricultural intelligence computer system 150 is additionally configured to provide alerts based on weather and field-related information. Specifically, the user may define a plurality of thresholds for each of a plurality of alert categories. When field condition data indicates that the thresholds have been exceeded, the user device will receive alerts. Alerts may be provided via the application (e.g., notification upon login, push notification), email, text messages, or any other suitable method. Alerts may be defined for crop cultivation monitoring, for example, hail size, rainfall, overall precipitation, soil moisture, crop scouting, wind conditions, field image, pest reports or disease reports. Alternately, alerts may be provided for crop growth strategy. For example, alerts may be provided based on commodity prices, grain prices, workability indexes, growth stages, and crop moisture content. In some examples, an alert may indicate a recommended course of action. For example, the alert may recommend that field activities (e.g., planting, nitrogen application, pest and disease treatment, irrigation application, scouting, or harvesting) occur within a particular period of time. Agricultural intelligence computer system 150 is also configured to receive information on farming activities from, for example, the user device, an agricultural machine, or any other source. Accordingly, alerts may also be provided based on logged farm activity such as planting, nitrogen application, spraying, irrigation, scouting, or harvesting. In some examples, alerts may be provided regardless of thresholds to indicate certain field conditions. In one example, a daily precipitation, growth stage, field image or temperature alert may be provided to the user device.

Agricultural intelligence computer system 150 is further configured to generate a plurality of reports based on field condition data 180. Such reports may be used by the user to improve strategy and decision-making in farming. The reports may include reports on crop growth stage, temperature, humidity, soil moisture, precipitation, workability, and pest risk. The reports may also include one or more field definition data 160, field-specific & environmental data 170, scouting and logging events, field condition data 180, summary of agricultural intelligence services (e.g., recommended agricultural activities 190) or FSA Form 578.

Agricultural intelligence computer system 150 is also configured to receive supplemental information from the user device. For example, a user may provide logging or scouting events regarding the fields associated with the field definition data. The user may access a logging application at the user device and update agricultural intelligence computer system 150. In one embodiment, the user accesses agricultural intelligence computer system 150 via a user device while being physically located in a field to enter field-specific data. The agricultural intelligence computer system might automatically display and transmit the date and time and field definition data associated with the field-specific data, such as geographic coordinates and boundaries. The user may provide general data for activities including field, location, date, time, crop, images, and notes. The user may also provide data specific to particular activities such as planting, nitrogen application, pesticide application, harvesting, scouting, and current weather observations. Such supplemental information may be associated with the other data networks and used by the user for analysis.

Agricultural intelligence computer system 150 is additionally configured to display scouting and logging events related to the receipt of field-specific data from the user via one or more agricultural machines or agricultural machine devices that interacts with agricultural intelligence computer system 150 or via the user device. Such information can be displayed as specified by the user. In one example, the information is displayed on a calendar on the user device, wherein the user can obtain further details regarding the information as necessary. In another example, the information is displayed in a table on the user device, wherein the user can select the specific categories of information that the user would like displayed.

Agricultural Intelligence Modules 420

Planting Advisor Module 421

Agricultural intelligence computer system 150 is additionally configured to provide agricultural intelligence services related to planting. More specifically, agricultural intelligence computer system 150 includes a plurality of agricultural intelligence modules 420 (or agricultural activity modules) that may be used to determine recommended agricultural activities 190 which are provided to grower 110. In at least some examples, agricultural intelligence modules 420 may be similar to agricultural intelligence modules 158 and 159 (shown in FIG. 1). In at least some examples, planting advisor module 421 may be similar to agricultural intelligence modules 158 and 159 (shown in FIG. 1). Such agricultural intelligence modules 420 may be referred to as agricultural intelligence services and may include planting advisor module 421, nitrogen application advisor module 422, pest advisor module 423, field health advisor module 424, and harvest advisor module 425. In one example embodiment, planting advisor module 421 processes field-specific & environmental data 170 and user information input 402 to determine and provide planting date recommendations. The recommendations are specific to the location of the field and adapt to the current field condition data.

In one embodiment, planting advisor module 421 receives one or more of the following data points for each field identified by the user (as determined from field definition data) in order to determine and provide such planting date recommendations:

1. A first set of data points is seed characteristic data. Seed characteristic data may include any relevant information related to seeds that are planted or will be planted. Seed characteristic data may include, for example, seed company data, seed cost data, seed population data, seed hybrid data, seed maturity level data, seed disease resistance data, and any other suitable seed data. Seed company data may refer to the manufacturer or provider of seeds. Seed cost data may refer to the price of seeds for a given quantity, weight, or volume of seeds. Seed population data may include the amount of seeds planted (or intended to be planted) or the density of seeds planted (or intended to be planted). Seed hybrid data may include any information related to the biological makeup of the seeds (i.e., which plants have been hybridized to form a given seed.) Seed maturity level data may include, for example, a relative maturity level of a given seed (e.g., a comparative relative maturity ("CRM") value or a silk comparative relative maturity ("silk CRM")), growing degree units ("GDUs") until a given stage such as silking, mid-pollination, black layer, or flowering, and a relative maturity level of a given seed at physiological maturity ("Phy. CRM"). Disease resistance data may include any information related to the resistance of seeds to particular diseases. In the example embodiment, disease resistance data includes data related to the resistance to Gray Leaf Spot, Northern Leaf Blight, Anthracnose Stalk Rot, Goss's Wilt, Southern Corn Leaf Blight, Eyespot, Common Rust, Anthracnose Leaf Blight, Southern Rust, Southern Virus Complex, Stewart's Leaf Blight, Corn Lethal Necrosis, Headsmut, *Diplodia* Ear Rot, and *Fusarium* Crown Rot. Other suitable seed data may include, for example, data related to, grain drydown, stalk strength, root strength, stress emergence, staygreen, drought tolerance, ear flex, test eight, plant height, ear height, mid-season brittle stalk, plant vigor, fungicide response, growth regulators sensitivity, pigment inhibitors, sensitivity, sulfonylureas sensitivity, harvest timing, kernel texture, emergence, harvest appearance, harvest population, seedling growth, cob color, and husk cover.
2. A second set of data points is field-specific data related to soil composition. Such field-specific data may include measurements of the acidity or basicity of soil (e.g., pH levels), soil organic matter levels ("OM" levels), and cation exchange capacity levels ("CEC" levels).
3. A third set of data points is field-specific data related to field data. Such field-specific data may include field names and identifiers, soil types or classifications, tilling status, irrigation status.
4. A fourth set of data points is field-specific data related to historical harvest data. Such field-specific data may include crop type or classification, harvest date, actual production history ("APH"), yield, grain moisture, and tillage practice.
5. In some examples, users may be prompted at the user device to provide a fifth set of data points by answering questions regarding desired planting population (e.g., total crop volume and total crop density for a particular field) and/or seed cost, expected yield, and indication of risk preference (e.g., general or specific: user is willing to risk a specific number of bushels per acre to increase the chance of producing a specific larger number of bushels per acre) if such information has not already been provided to the agricultural intelligence computer system.

Planting advisor module 421 receives and processes the sets of data points to simulate possible yield potentials. Possible yield potentials are calculated for various planting dates. Planting advisor module 421 additionally utilizes additional data to generate such simulations. The additional data may include simulated weather between the planting data and harvesting date, field workability, seasonal freeze risk, drought risk, heat risk, excess moisture risk, estimated soil temperature, and/or risk tolerance. Risk tolerance may be calculated based for a high profit/high risk scenario, a low risk scenario, a balanced risk/profit scenario, and a user defined scenario. Planting advisor module 421 generates such simulations for each planting date and displays a planting date recommendation for the user on the user device. The recommendation includes the recommended planting date, projected yield, relative maturity, and graphs the projected yield against planting date. In some examples, the planting advisor module also graphs the projected yield against the planting date for spring freeze risk, the planting date for fall freeze risk, the planting date for drought risk, the planting date for heat risk, the planting date for excess moisture risk, the planting date for estimated soil temperature, and the planting date for the various risk tolerance levels. Planting advisor module 421 provides the option of modeling and displaying alternative yield scenarios for planting data and projected yield by modifying one or more data points associated with seed characteristic data, field-specific data, desired planting population and/or seed cost, expected yield, and/or indication of risk preference. The alternative yield scenarios may be displayed and graphed on the user device along with the original recommendation.

Nitrogen Application Advisor Module 422

Agricultural intelligence computer system 150 is additionally configured to provide agricultural intelligence services related to soil by using nitrogen application advisor module 422. In at least some examples, nitrogen application advisor module 422 may be similar to agricultural intelligence modules 158 and 159 (shown in FIG. 1). Nitrogen application advisor module 422 determines potential needs for nitrogen in the soil and recommends nitrogen application practices to a user. More specifically, nitrogen application advisor module 422 is configured to identify conditions when crop needs cannot be met by nitrogen present in the soil. In one example embodiment, nitrogen application advisor module 422 provides recommendations for sidedressing or spraying, such as date and rate, specific to the location of the field and adapt to the current field condition data. In one embodiment, nitrogen application advisor module 422 is configured to receive one or more of the following data points for each field identified by the user (as determined from field definition data):

1. A first set of data points includes environmental information. Environmental information may include information related to weather, precipitation, meteorology, soil and crop phenology.
2. A second set of data points includes field-specific data related to field data. Such field-specific data may include field names and identifiers, soil types or classifications, tilling status, irrigation status.
3. A third set of data points includes field-specific data related to historical harvest data. Such field-specific data may include crop type or classification, harvest date, actual production history ("APH"), yield, grain moisture, and tillage practice.
4. A fourth set of data points is field-specific data related to soil composition. Such field-specific data may include measurements of the acidity or basicity of soil (e.g., pH levels), soil organic matter levels ("OM" levels), and cation exchange capacity levels ("CEC" levels).
5. A fifth set of data points is field-specific data related to planting data. Such field-specific data may include planting date, seed type or types, relative maturity (RM) levels of planted seed(s), and seed population.
6. A sixth set of data points is field-specific data related to nitrogen data. Such field-specific data may include nitrogen application dates, nitrogen application amounts, and nitrogen application sources.
7. A seventh set of data points is field-specific data related to irrigation data. Such field-specific data may include irrigation application dates, irrigation amounts, and irrigation sources.

Based on the sets of data points, nitrogen application advisor module 422 determines a nitrogen application recommendation. As described below, the recommendation includes a list of fields with adequate nitrogen, a list of fields with inadequate nitrogen, and a recommended nitrogen application for the fields with inadequate nitrogen.

In some examples, users may be prompted at the user device to answer questions regarding nitrogen application (e.g., side-dressing, spraying) practices and costs, such as type of nitrogen (e.g., Anhydrous Ammonia, Urea, UAN (Urea Ammonium Nitrate) 28%, 30% or 32%, Ammonium Nitrate, Ammonium Sulphate, Calcium Ammonium Sulphate), nitrogen costs, latest growth stage of crop at which nitrogen can be applied, application equipment, labor costs, expected crop price, tillage practice (e.g., type (conventional, no till, reduced, strip) and amount of surface of the field that has been tilled), residue (the amount of surface of the field covered by residue), related farming practices (e.g., manure application, nitrogen stabilizers, cover crops) as well as prior crop data (e.g., crop type, harvest date, Actual Production History (APH), yield, tillage practice), current crop data (e.g., planting date, seed(s) type, relative maturity (RM) of planted seed(s), seed population), soil characteristics (pH, OM, CEC) if such information has not already been provided to the agricultural intelligence computer system. For certain questions, such as latest growth stage of crop at which nitrogen can be applied, application equipment, labor costs, the user has the option to provide a plurality of alternative responses to that the agricultural intelligence computer system can optimize the nitrogen application advisor recommendation.

Using the environmental information, field-specific data, nitrogen application practices and costs, prior crop data, current crop data, and/or soil characteristics, nitrogen application advisor module 422 identifies the available nitrogen in each field and simulates possible nitrogen application practices, dates, rates, and next date on which workability for a nitrogen application is "Green" taking into account predicted workability and nitrogen loss through leaching, denitrification and volatilization. Nitrogen application advisor module 422 generates and displays on the user device a nitrogen application recommendation for the user. The recommendation includes:

1. The list of fields having enough nitrogen, including for each field the available nitrogen, last application data, and the last nitrogen rate applied.
2. The list of fields where nitrogen application is recommended, including for each field the available nitrogen, recommended application practice, recommended application dates, recommended application rate, and next data on which workability for the nitrogen application is "Green."
3. The recommended date of nitrogen application for each field. In some examples the recommended date may be optimized for either yield or return on investment. In some examples the recommended date may be the date at which minimum predicted nitrogen levels in the field will reach a threshold minimum value without intervening nitrogen application. In some examples recommended dates may be excluded or selected based upon available equipment as indicated by the user; for example, where no equipment for applying nitrogen is available past a given growth stage, dates are preferably recommended before the predicted date at which that growth stage will be reached.
4. The recommended rate of nitrogen application for each field for each possible or recommended application date. The recommended rate of nitrogen application may be optimized for either yield or return on investment.

The user has the option of modeling and displaying nitrogen lost (total and divided into losses resulting from volatilization, denitrification, and leaching) and crop use ("uptake") of nitrogen over a specified time period (pre-defined or as defined by the user) for the recommended nitrogen application versus one or more alternative scenarios based on a custom application practice, date and rate entered by the user. The user has the option of modeling and displaying estimated return on investment for the recommended nitrogen application versus one or more alternative scenarios based on a custom application practice, date and rate entered by the user. The alternative nitrogen application scenarios may be displayed and graphed on the user device along with the original recommendation. The user has the further option of modeling and displaying estimated yield benefit (minimum, average, and maximum) for the recommended nitrogen application versus one or more alternative scenarios based on a custom application practice, date and rate entered by the user. The user has the further option of modeling and displaying estimated available nitrogen over any time period specified by the user for the recommended nitrogen application versus one or more alternative scenarios based on a custom application practice, date and rate entered by the user. The user has the further option of running the nitrogen application advisor (using the nitrogen application advisor) for one or more sub-fields or management zones within a field.

Pest Advisor Module (or Pest and Disease Advisor Module) 423

Agricultural intelligence computer system 150 is additionally configured to provide agricultural intelligence services related to pest and disease by using pest advisor module 423. In at least some examples, pest advisor module 423 may be similar to agricultural intelligence modules 158 and 159 (shown in FIG. 1). Pest advisor module 423 is configured to identify risks posed to crops by pest damage and/or disease damage. In an example embodiment, pest advisor module 423 identifies risks caused by the pests that cause that the most economic damage to crops in the U.S. Such pests include, for example, corn rootworm, corn earworm, soybean aphid, western bean cutworm, European corn borer, armyworm, bean leaf beetle, Japanese beetle, and twospotted spider mite. In some examples, the pest and disease advisor provides supplemental analysis for each pest segmented by growth stages (e.g., larval and adult stages). Pest advisor module 423 also identifies disease risks caused by the diseases that cause that the most economic damage to crops in the U.S. Such diseases include, for example, Gray Leaf Spot, Northern Leaf Blight, Anthracnose Stalk Rot, Goss's Wilt, Southern Corn Leaf Blight, Eyespot, Common Rust, Anthracnose Leaf Blight, Southern Rust, Southern Virus Complex, Stewart's Leaf Blight, Corn Lethal Necrosis, Headsmut, *Diplodia* Ear Rot, *Fusarium* Crown Rot. The pest advisor is also configured to recommend scouting practices and treatment methods to respond to such pest and disease risks. Pest advisor module 423 is also configured to provide alerts based on observations of pests in regions proximate to the user's fields.

In one embodiment, pest advisor module 423 may receive one or more of the following sets of data for each field identified by the user (as determined from field definition data):

1. A first set of data points is environmental information. Environmental information includes information related to weather, precipitation, meteorology, crop phenology and pest and disease reporting. In some examples, pest and disease reports may be received from a third-party server or data source such as a university or governmental reporting service.

2. A second set of data points is seed characteristic data. Seed characteristic data may include any relevant information related to seeds that are planted or will be planted. Seed characteristic data may include, for example, seed company data, seed cost data, seed population data, seed hybrid data, seed maturity level data, seed disease resistance data, and any other suitable seed data. Seed company data may refer to the manufacturer or provider of seeds. Seed cost data may refer to the price of seeds for a given quantity, weight, or volume of seeds. Seed population data may include the amount of seeds planted (or intended to be planted) or the density of seeds planted (or intended to be planted). Seed hybrid data may include any information related to the biological makeup of the seeds (i.e., which plants have been hybridized to form a given seed.) Seed maturity level data may include, for example, a relative maturity level of a given seed (e.g., a comparative relative maturity ("CRM") value or a silk comparative relative maturity ("silk CRM")), growing degree units ("GDUs") until a given stage such as silking, mid-pollination, black layer, or flowering, and a relative maturity level of a given seed at physiological maturity ("Phy. CRM"). Disease resistance data may include any information related to the resistance of seeds to particular diseases. In the example embodiment, disease resistance data includes data related to the resistance to Gray Leaf Spot, Northern Leaf Blight, Anthracnose Stalk Rot, Goss's Wilt, Southern Corn Leaf Blight, Eyespot, Common Rust, Anthracnose Leaf Blight, Southern Rust, Southern Virus Complex, Stewart's Leaf Blight, Corn Lethal Necrosis, Headsmut, *Diplodia* Ear Rot, and *Fusarium* Crown Rot. Other suitable seed data may include, for example, data related to, grain drydown, stalk strength, root strength, stress emergence, staygreen, drought tolerance, ear flex, test eight, plant height, ear height, mid-season brittle stalk, plant vigor, fungicide response, growth regulators sensitivity, pigment inhibitors, sensitivity, sulfonylureas sensitivity, harvest timing, kernel texture, emergence, harvest appearance, harvest population, seedling growth, cob color, and husk cover.

3. A third set of data points is field-specific data related to planting data. Such field-specific data may include, for example, planting dates, seed type, relative maturity (RM) of planted seed, and seed population.

4. A fourth set of data points is field-specific data related to pesticide data. Such field-specific data may include, for example, pesticide application date, pesticide product type (specified by, e.g., EPA registration number), pesticide formulation, pesticide usage rate, pesticide acres tested, pesticide amount sprayed, and pesticide source.

In some examples, users may be prompted at the user device to answer questions regarding pesticide application practices and costs, such as type of product type, application date, formulation, rate, acres tested, amount, source, costs, latest growth stage of crop at which pesticide can be applied, application equipment, labor costs, expected crop price as well as current crop data (e.g., planting date, seed(s) type, relative maturity (RM) of planted seed(s), seed population) if such information has not already been provided to the agricultural intelligence computer system. Accordingly, pest advisor module 423 receives such data from user devices.

For certain questions, such as latest growth stage of crop at which pesticide can be applied, application equipment, labor costs, the user has the option to provide a plurality of alternative responses to that agricultural intelligence computer system 150 can optimize the pest and disease advisor recommendation.

Pest advisor module 423 is configured to receive and process all such sets of data points and received user data and simulate possible pesticide application practices. The simulation of possible pesticide practices includes, dates, rates, and next date on which workability for a pesticide application is "Green" taking into account predicted workability. Pest advisor module 423 generates and displays on the user device a scouting and treatment recommendation for the user. The scouting recommendation includes daily (or as specified by the user) times to scout for specific pests and diseases. The user has the option of displaying a specific subset of pests and diseases as well as additional information regarding a specific pest or disease. The treatment recommendation includes the list of fields where a pesticide application is recommended, including for each field the recommended application practice, recommended application dates, recommended application rate, and next data on which workability for the pesticide application is "Green." The user has the option of modeling and displaying estimated return on investment for the recommended pesticide application versus one or more alternative scenarios based on a custom application practice, date and rate entered by the user. The alternative pesticide application scenarios may be displayed and graphed on the user device along with the original recommendation. The user has the further option of modeling and displaying estimated yield benefit (minimum, average, and maximum) for the recommended pesticide application versus one or more alternative scenarios based on a custom application practice, date and rate entered by the user.

Field Health Advisor Module 424

Agricultural intelligence computer system 150 is also configured to provide information regarding the health and quality of areas of fields 120. In at least some examples, field health advisor module 424 may be similar to agricultural intelligence modules 158 and 159 (shown in FIG. 1). Field health advisor module 424 identifies crop health quality over the course of the season and uses such crop health determinations to recommend scouting or investigation in areas of poor field health. More specifically, field health advisor module 424 receives and processes field image data to determine, identify, and provide index values of biomass health. The index values of biomass health may range from zero (indicating no biomass) to 1 (indicating the maximum amount of biomass). In an example embodiment, the index value has a specific color scheme, so that every image has a color-coded biomass health scheme (e.g., brown areas show the areas in the field with the lowest relative biomass health). In one embodiment, field health advisor module 424 may receive one or more of the following data points for each field identified by the user (as determined from field definition data):

1. A first set of data points includes environmental information. Such environmental information includes information related to satellite imagery, aerial imagery, terrestrial imagery and crop phenology.
2. A second set of data points includes field-specific data related to field data. Such field-specific data may include field and soil identifiers such as field names, and soil types.
3. A third set of data points includes field-specific data related to soil composition data. Such field-specific data may include measurements of the acidity or basicity of soil (e.g., pH levels), soil organic matter levels ("OM" levels), and cation exchange capacity levels ("CEC" levels).
4. A fourth set of data points includes field-specific data related to planting data. Such field-specific data may include, for example, planting dates, seed type, relative maturity (RM) of planted seed, and seed population.

Field health advisor module 424 receives and processes all such data points (along with field image data) to determine and identify a crop health index for each location in each field identified by the user each time a new field image is available. In an example embodiment, field health advisor module 424 determines a crop health index as a normalized difference vegetation index ("NDVI") based on at least one near-infrared ("NIR") reflectance value and at least one visible spectrum reflectance value at each raster location in the field. In another example embodiment, the crop health index is a NDVI based on multispectral reflectance.

Field health advisor module 424 generates and displays on the user device the health index map as an overlay on an aerial map for each field identified by the user. In an example embodiment, for each field, the field health advisor module will display field image date, growth stage of crop at that time, soil moisture at that time, and health index map as an overlay on an aerial map for the field. In an example embodiment, the field image resolution is between 5 m and 0.25 cm. The user has the option of modeling and displaying a list of fields based on field image date and/or crop health index (e.g., field with lowest overall health index values to field with highest overall health index values, field with highest overall health index values to field with lowest overall health index values, lowest health index value variability within field, highest health index value variability within field, or as specified by the user). The user also has the option of modeling and displaying a comparison of crop health index for a field over time (e.g., side-by-side comparison, overlay comparison). In an example embodiment, the field health advisor module provides the user with the ability to select a location on a field to get more information about the health index, soil type or elevation at a particular location. In an example embodiment, the field health advisor module provides the user with the ability to save a selected location, the related information, and a short note so that the user can retrieve the same information on the user device while in the field.

Harvest Advisor Module 425

Agricultural intelligence computer system 150 is additionally configured to provide agricultural intelligence services related to timing and mechanisms of harvest using harvest advisor module 425. In at least some examples, harvest advisor module 425 may be similar to agricultural intelligence modules 158 and 159 (shown in FIG. 1) and more specifically to harvest advisor module 158.

Harvest advisor computing module 425 is in data communication with agricultural intelligence computing system 150. Agricultural intelligence computing system 150 captures and stores field definition data 160, field-specific & environmental data 170, and field condition data 180 within its memory device. Harvest advisor computing module 425 receives and processes field definition data 160, field-specific & environmental data 170, and field condition data 180 from agricultural intelligence computing system 150 to provide (i) grain moisture value predictions during drydown of a particular field prior to harvest, (ii) a projected date when the particular field will reach a target moisture value, and (iii) harvest recommendations and planning for one or more fields. More specifically, harvest advisor computing module 425 is configured to: (i) identify an initial date of a crop within a field (e.g., a black layer date); (ii) identifying an initial moisture value associated with the crop and the initial date; (iii) identify a target harvest moisture value associated with the crop; (iv) receive field condition data associated with the field; (v) compute a target harvest date for the crop based at least in part on the initial date, the initial moisture value, the field condition data, and the target harvest moisture value, wherein the target harvest date indicates a date at which the crop will have a present moisture value approximately equal to the target harvest moisture value; and (vi) display the target harvest date for the crop to the grower for harvest planning. The target harvest moisture value represents the value at which grower 110 desires the crop to be when harvested (e.g., at harvest date). Thus, the harvest advisor computing module 425 assists the grower in projecting approximately when a given field will be ready for harvest by projecting moisture values over time, and considering both past weather data and future weather predictions at the given field.

Revenue Advisor Module 426

Agricultural intelligence computer system 150 is additionally configured to provide agricultural intelligence services related to selling and marketing crops using revenue advisor module 426. In at least some examples, revenue advisor module 426 may be similar to agricultural intelligence modules 158 and 159 (shown in FIG. 1) and more specifically to revenue advisor module 159.

Revenue advisor module 426 is in data communication with agricultural intelligence computer system 150. Revenue advisor module 426 is configured to provide yield data, revenue data, and profit data estimates to grower 110. In the example embodiment, the yield data, revenue data, and profit data relate to an individual field, and can further relate a plurality of additional fields associated with the grower. Yield data includes yield estimates for a high, low, and expected case for each field and at the national level. Revenue data includes revenue estimates based on national and local prices for each field. Profit data includes the expected profit for each field for the high, low, and expected cases. In some embodiments, revenue advisor module 426 is configured to also provide national yield projections and national and local crop prices. In one embodiment, revenue advisor module 426 is configured to receive one or more of the following data points for each field identified by the user (as determined from field definition data):

1. A first set of data points includes environmental information. Environmental information may include information related to weather, precipitation, meteorology, soil and crop phenology.
2. A second set of data points includes field-specific data related to field data. Such field-specific data may include field names and identifiers, soil types or classifications, tilling status, irrigation status.
3. A third set of data points includes field-specific data related to historical harvest data. Such field-specific data may include crop type or classification, harvest date, actual production history ("APH"), yield, grain moisture, and tillage practice.
4. A fourth set of data points is field-specific data related to soil composition. Such field-specific data may include measurements of the acidity or basicity of soil (e.g., pH levels), soil organic matter levels ("OM" levels), and cation exchange capacity levels ("CEC" levels).
5. A fifth set of data points is field-specific data related to planting data. Such field-specific data may include planting date, seed type or types, relative maturity (RM) levels of planted seed(s), and seed population.
6. A sixth set of data points is crop pricing data. Such crop pricing data may include current national and local crop prices including a plurality of delivery dates. Current national crop prices may be retrieved from a pricing data service. Current local crop prices may be retrieved from local grain elevators chosen by grower 110.
7. A seventh set of data points is field-specific data related to cost data. Cost data may be provided by grower 110 or may be default values based on data retrieved from an environmental data source, such as a university data service, which provides regionally specific data or historical field-specific data.

Revenue advisor module 426 is configured to calculate yield data, revenue data, and profit data for each field based on the sets of data points. For example and more specifically, for each field described by field definition data, revenue advisor module 426 retrieves specific weather data and soil conditions from the environmental data and the field-specific data provided by agricultural intelligence computer system 150. Revenue advisor module 426 calculates crop growth stage based on the crop identifiers and likelihood of future weather outcomes. Revenue advisor module 426 combines the specific weather data, the soil conditions, the growth stage, and the likelihood of future weather outcomes to calculate a yield estimate for each field defined by field definition data. Revenue advisor module 426 calculates the yield estimate for each field on a periodic basis, i.e., every day. Revenue advisor module 426 displays the yield data to grower 110 via the user device. Revenue advisor module 426 may display the yield data for each individual field or may aggregate the yield data for the plurality of fields.

Revenue advisor module 426 calculates the revenue data for each field described in the plurality of field definition data. Revenue advisor module 426 calculates the revenue estimates for each field based on the yield estimate for that field and the received crop prices for the expected, high, and low cases. Revenue advisor module 426 calculates the revenue estimates for each field on a periodic basis, i.e., every day. Revenue advisor module 426 displays the revenue data to the user via the user device. Revenue advisor module 426 may display the revenue data for each individual field or may aggregate the revenue data for the plurality of fields based on user input. Revenue advisor module 426 also displays the national crop prices and the crop prices received from the local grain elevators.

Revenue advisor module 426 calculates profit data for each field described in the plurality of field definition data. The described in the plurality of field definition data calculates the profit data based on the cost data and the revenue data for each field. Cost data can include, but is not limited to, cash rent, seed, fertilizer, irrigation, chemicals, pesticides, labor, machinery and equipment, operating interest, general costs, administrative costs, and other costs. Revenue advisor module 426 also apportions the cost data for the plurality of fields into each field to calculate the profit data for each field. Revenue advisor module 426 displays the profit data for the plurality of fields, for each individual field, and for each acre.

In the example embodiment, revenue advisor module 426 calculates national yield projections. In one embodiment, for each region of the country, revenue advisor module 426 retrieves specific weather data and soil conditions for that region from agricultural intelligence computer system 150. Revenue advisor module 426 calculates crop growth stage and likelihood of future weather outcomes. Revenue advisor module 426 combines the specific weather data, the soil conditions, the growth stage, and the likelihood of future weather outcomes to calculate a yield estimate for each region of the nation to calculate nation yield projections. These projections are calculated on a daily basis. Revenue advisor module 426 displays the national yield projections on the user device. In another embodiment, revenue advisor module 426 aggregates the yield data for every field defined by field definition data in database 157, shown in FIG. 1.

In other embodiments, revenue advisor module 426 compares historical values for the yield data, revenue data, and national yield projections with currently calculated values. Revenue advisor module 426 displays the comparison for a period of time selected by user grower.

Figure 5:
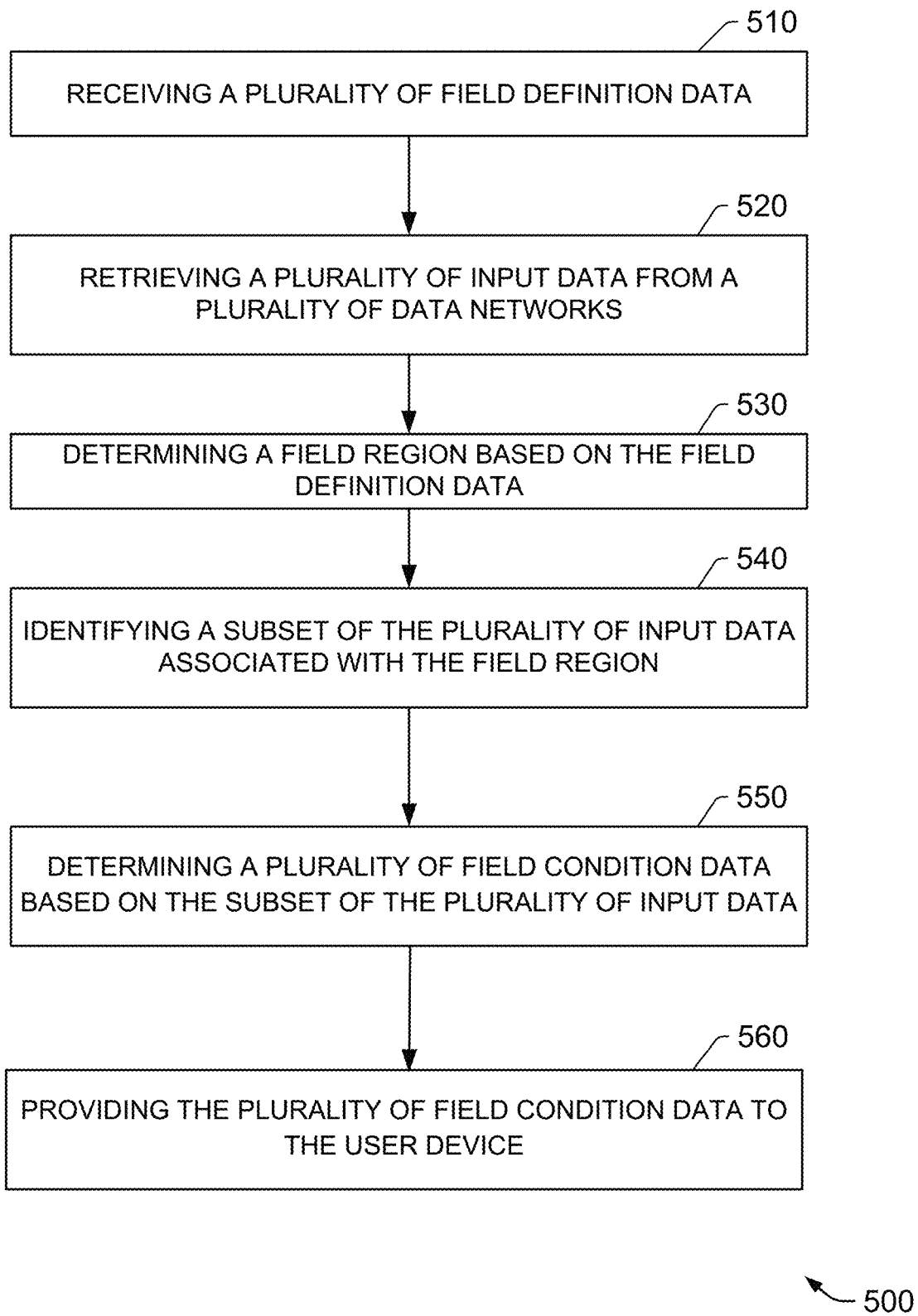
FIG. 5 is an example method for managing agricultural activities in the agricultural environment of FIG. 1.

FIG. 5 is an example method for managing agricultural activities in agricultural environment 100 (shown in FIG. 1). Method 500 is implemented by agricultural intelligence computer system 150 (shown in FIG. 1). Agricultural intelligence computer system 150 receives 510 a plurality of field definition data. Agricultural intelligence computer system 150 retrieves 520 a plurality of input data from a plurality of data networks 130A, 130B, and 140. Agricultural intelligence computer system 150 determines 530 a field region based on the field definition data. Agricultural intelligence computer system 150 identifies 540 a subset of the plurality of input data associated with the field region. Agricultural intelligence computer system 150 determines 550 a plurality of field condition data based on the subset of the plurality of input data. Agricultural intelligence computer system 150 provides 560 the plurality of field condition data to the user device.

Figure 6:
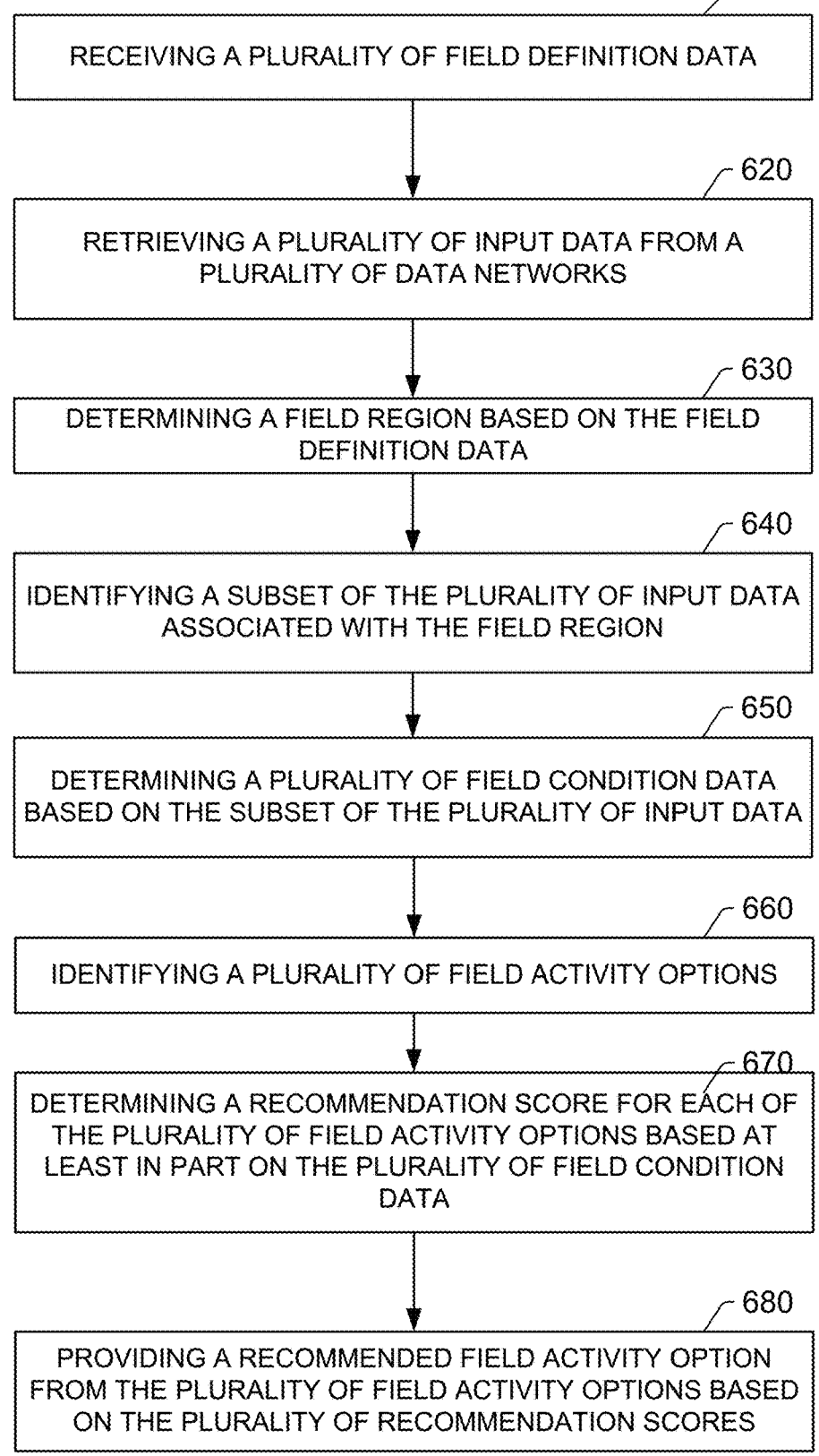
FIG. 6 is an example method for recommending agricultural activities in the agricultural environment of FIG. 1.

FIG. 6 is an example method for recommending agricultural activities in the agricultural environment of FIG. 1. Method 500 is implemented by agricultural intelligence computer system 150 (shown in FIG. 1). Agricultural intelligence computer system 150 receives 610 a plurality of field definition data. Agricultural intelligence computer system 150 retrieves 620 a plurality of input data from a plurality of data networks 130A, 130B, and 140. Agricultural intelligence computer system 150 determines 630 a field region based on the field definition data. Agricultural intelligence computer system 150 identifies 640 a subset of the plurality of input data associated with the field region. Agricultural intelligence computer system 150 determines 650 a plurality of field condition data based on the subset of the plurality of input data. Agricultural intelligence computer system 150 provides 660 the plurality of field condition data to the user device. Agricultural intelligence computer system 150 determines 670 a recommendation score for each of the plurality of field activity options based at least in part on the plurality of field condition data. Agricultural intelligence computer system 150 provides 680 a recommended field activity option from the plurality of field activity options based on the plurality of recommendation scores.

Figure 7:
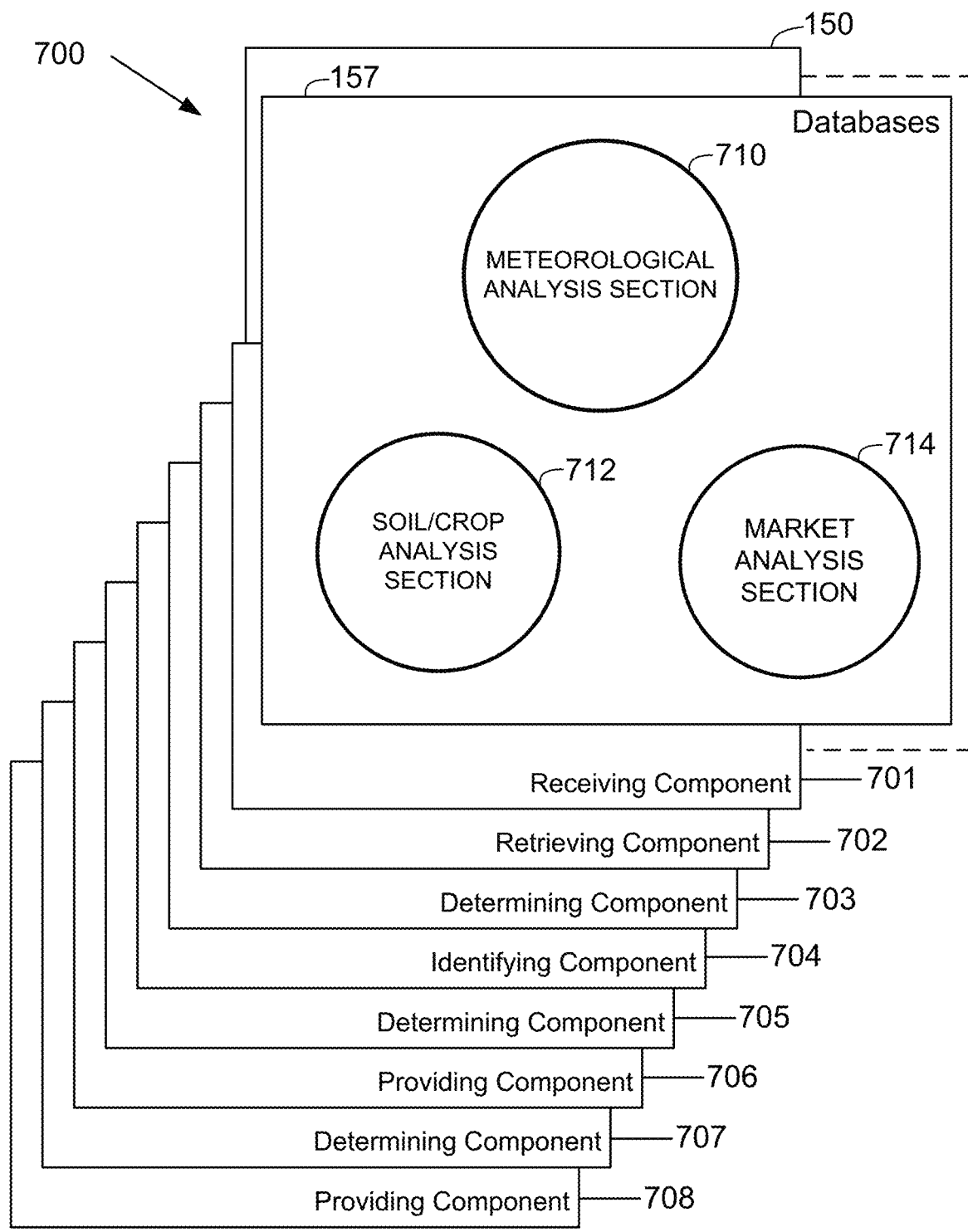
FIG. 7 is a diagram of an example computing device used in the agricultural environment of FIG. 1 to recommend and manage agricultural activities.

FIG. 7 is a diagram of components of one or more example computing devices that may be used in the environment shown in FIG. 5. FIG. 7 further shows a configuration of databases including at least database 157 (shown in FIG. 1). Database 157 is coupled to several separate components within fraud detection computer system 150, which perform specific tasks.

Agricultural intelligence computer system 150 includes a first receiving component 701 for receiving a plurality of field definition data, a first retrieving component 702 for retrieving a plurality of input data from a plurality of data networks, a first determining component 703 for determining a field region based on the field definition data, a first identifying component 704 for identifying a subset of the plurality of input data associated with the field region, a second determining component 705 for determining a plurality of field condition data based on the subset of the plurality of input data, a first providing component 706 for providing the plurality of field condition data to the user device, a third determining component 707 for determining a recommendation score for each of the plurality of field activity options based at least in part on the plurality of field condition data, and a second providing component 708 for providing a recommended field activity option from the plurality of field activity options based on the plurality of recommendation scores.

In an example embodiment, database 157 is divided into a plurality of sections, including but not limited to, a meteorological analysis section 710, a soil and crop analysis section 712, and a market analysis section 714. These sections within database 157 are interconnected to update and retrieve the information as required.

FIGS. 8-30 are example illustrations of information provided by the agricultural intelligence computer system of FIG. 3 to the user device of FIG. 2 to facilitate the management and recommendation of agricultural activities.

Figure 8:
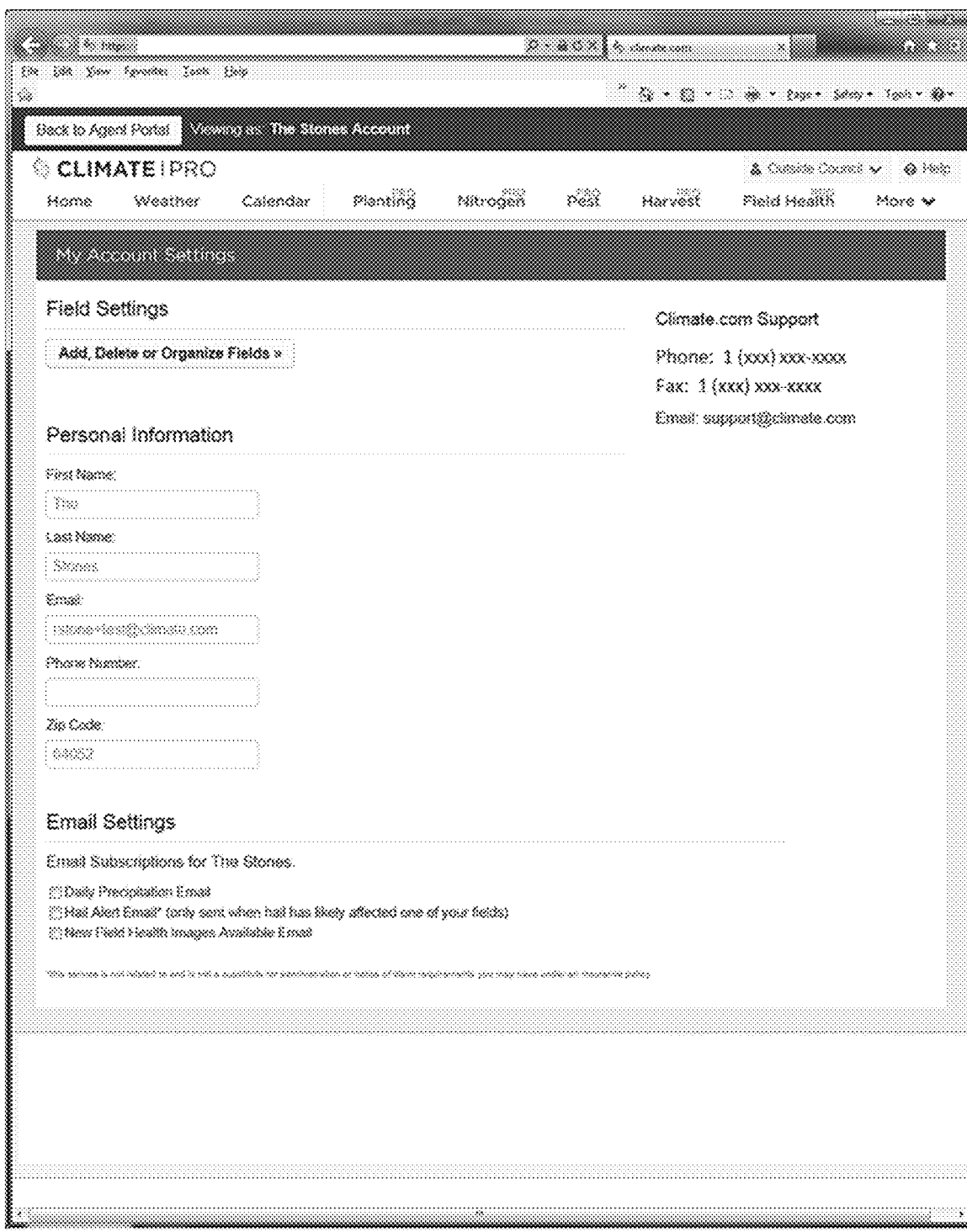
FIGS. 8-30 are example illustrations of information provided by the agricultural intelligence computer system of FIG. 3 to the user device of FIG. 2 to facilitate the management and recommendation of agricultural activities.

Referring to FIG. 8, screenshot 800 illustrates a setup screen wherein grower 110 (shown in FIG. 1) may provide user information input 402 (shown in FIG. 4) to define basic attributes associated with their account.

Figure 9:
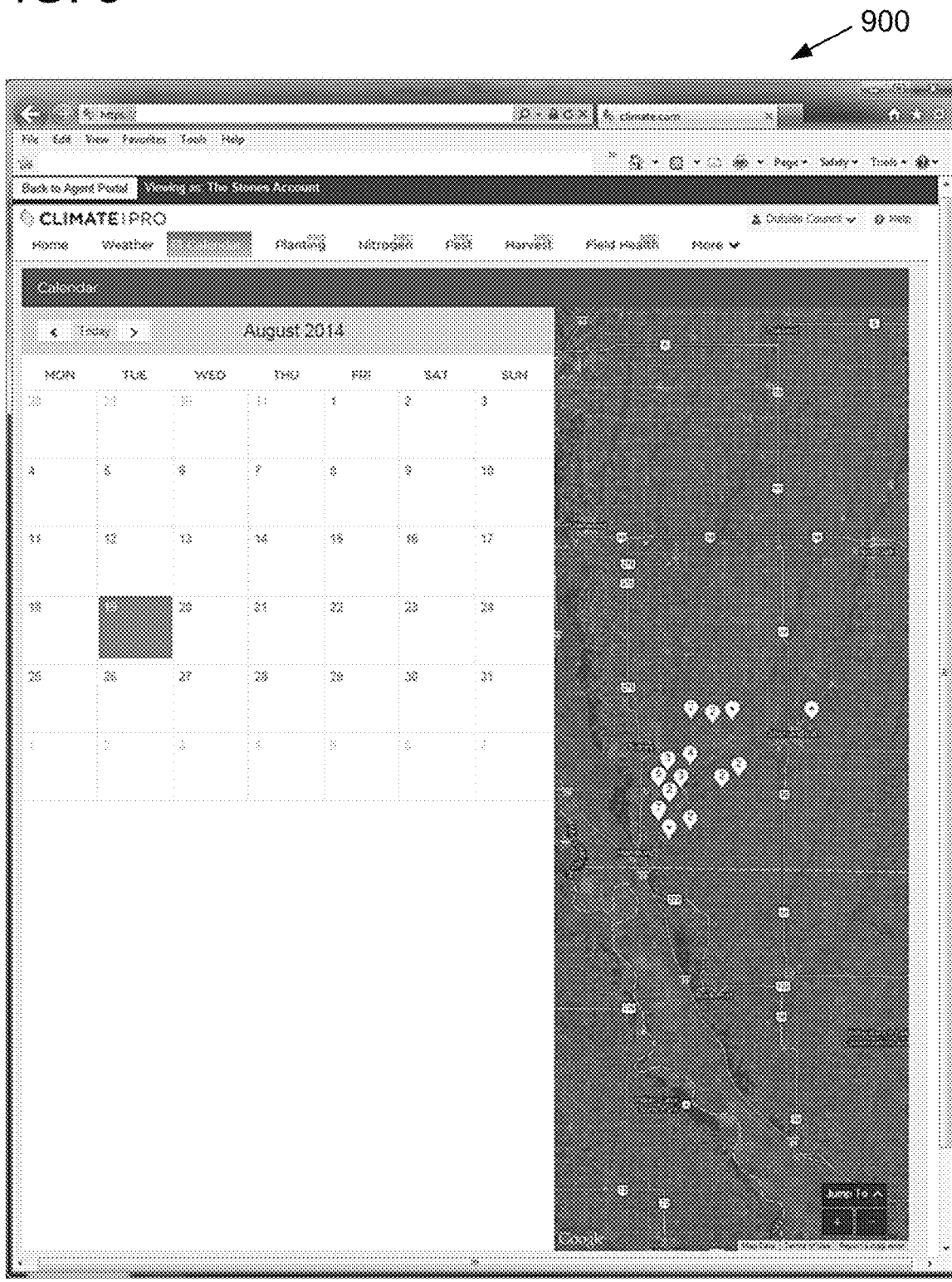
Figure 10:
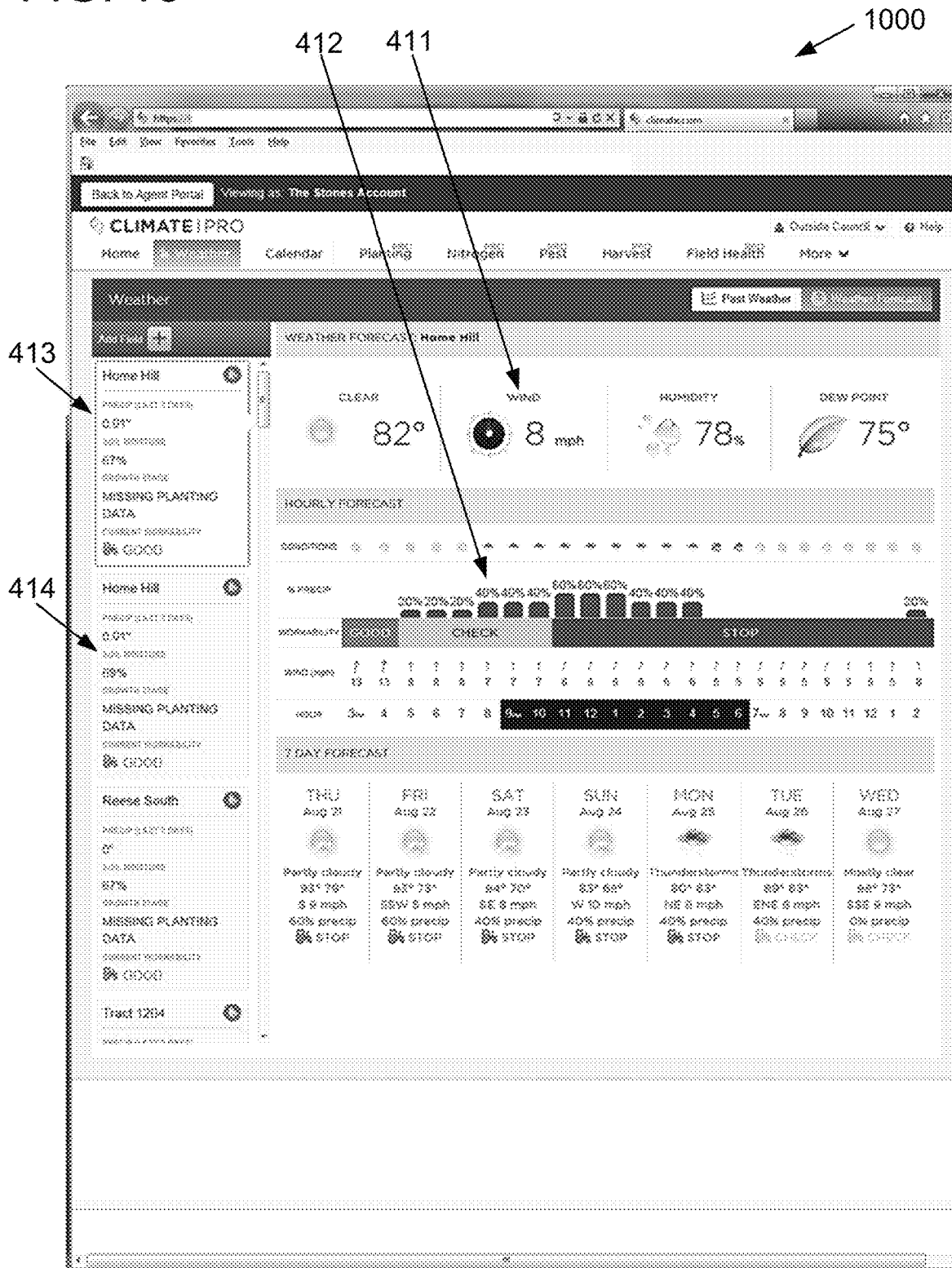
Figure 11:
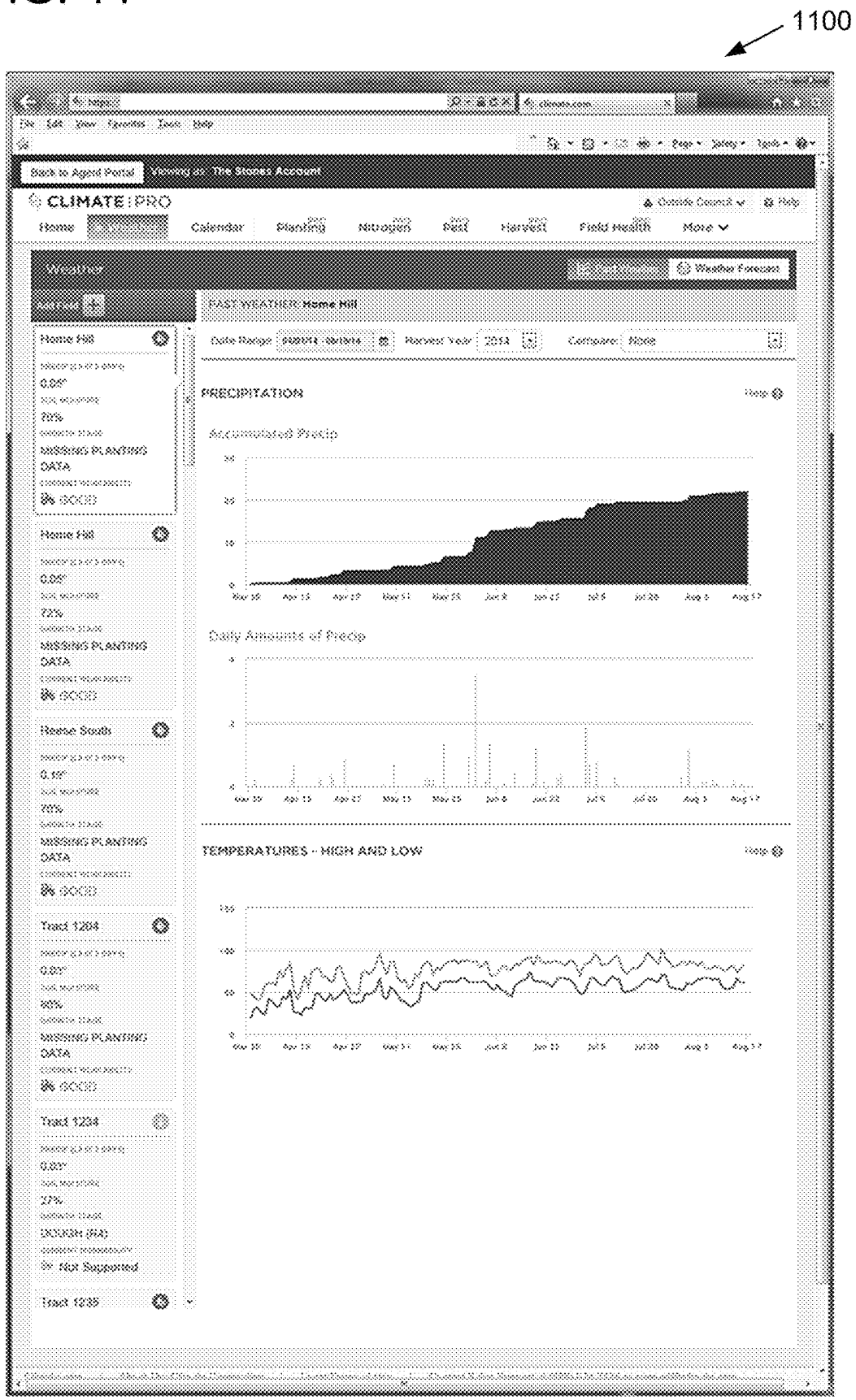

Referring to FIGS. 9-11, screenshots 900, 1000, and 1100 illustrate options allowing for grower 110 (shown in FIG. 1) to view field condition data 180 (shown in FIG. 1). As is indicated in screenshot 900, grower 110 may select particular dates for field condition data 180 viewing that may be in the past, present, or future and may accordingly provide historic, current, or forecasted field condition data 180. Grower 110 may accordingly select a particular date and time to view field condition data 180 for particular fields 120 (shown in FIG. 1). Screenshot 1000 illustrates a consolidated view of field condition data 180 for a particular field 120 at a particular date. More specifically, field condition data 180 shown includes output of field weather data module 411, field workability data module 412, growth stage data module 413, and soil moisture data module 414. Screenshot 1100 similarly shows output of field precipitation module 415 of a particular field 120 over a particular time period. As described above and herein, such field condition data 180 is determined using a localized method that determines such field conditions uniquely for each field 120.

Figure 12:
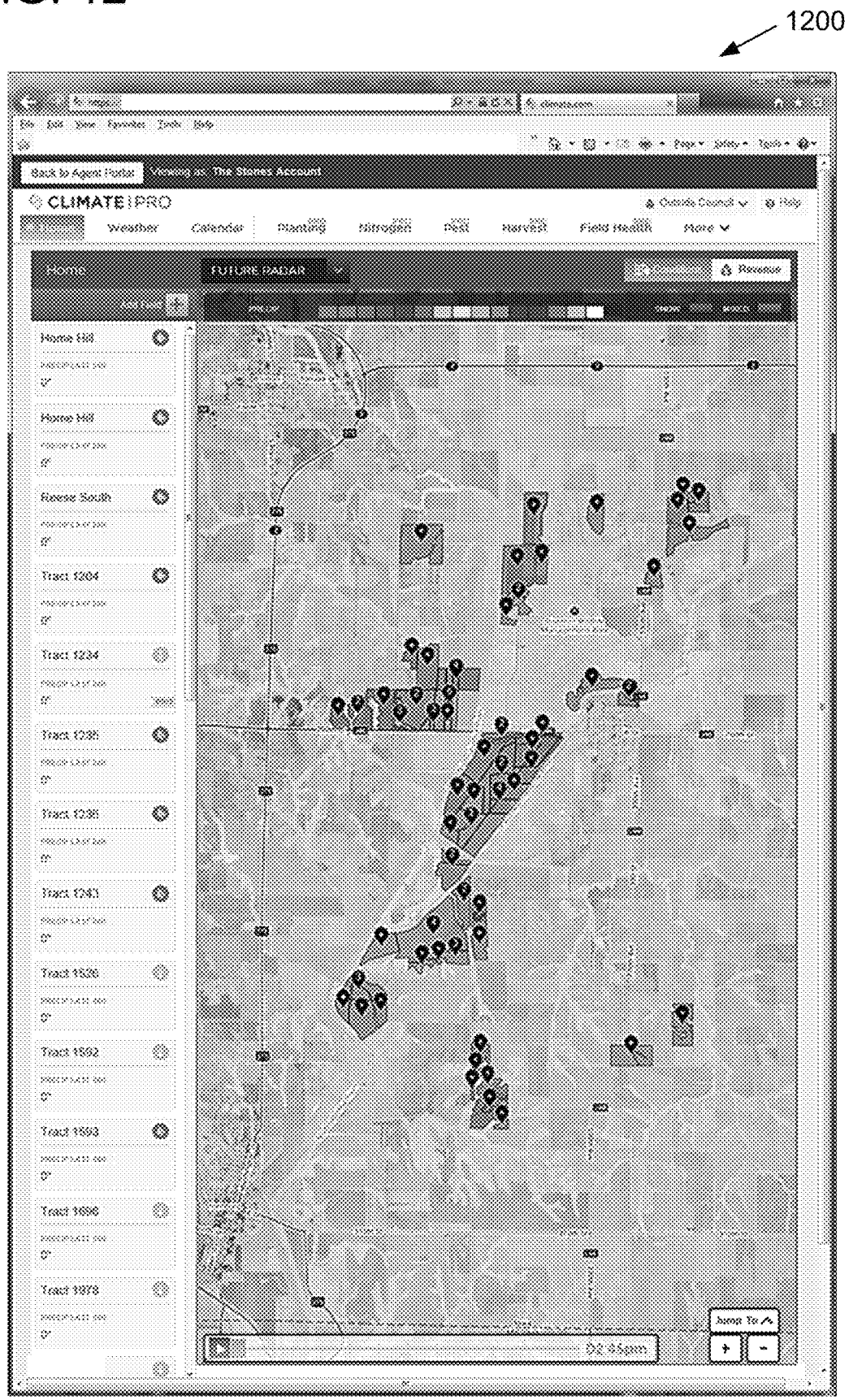
Figure 13:
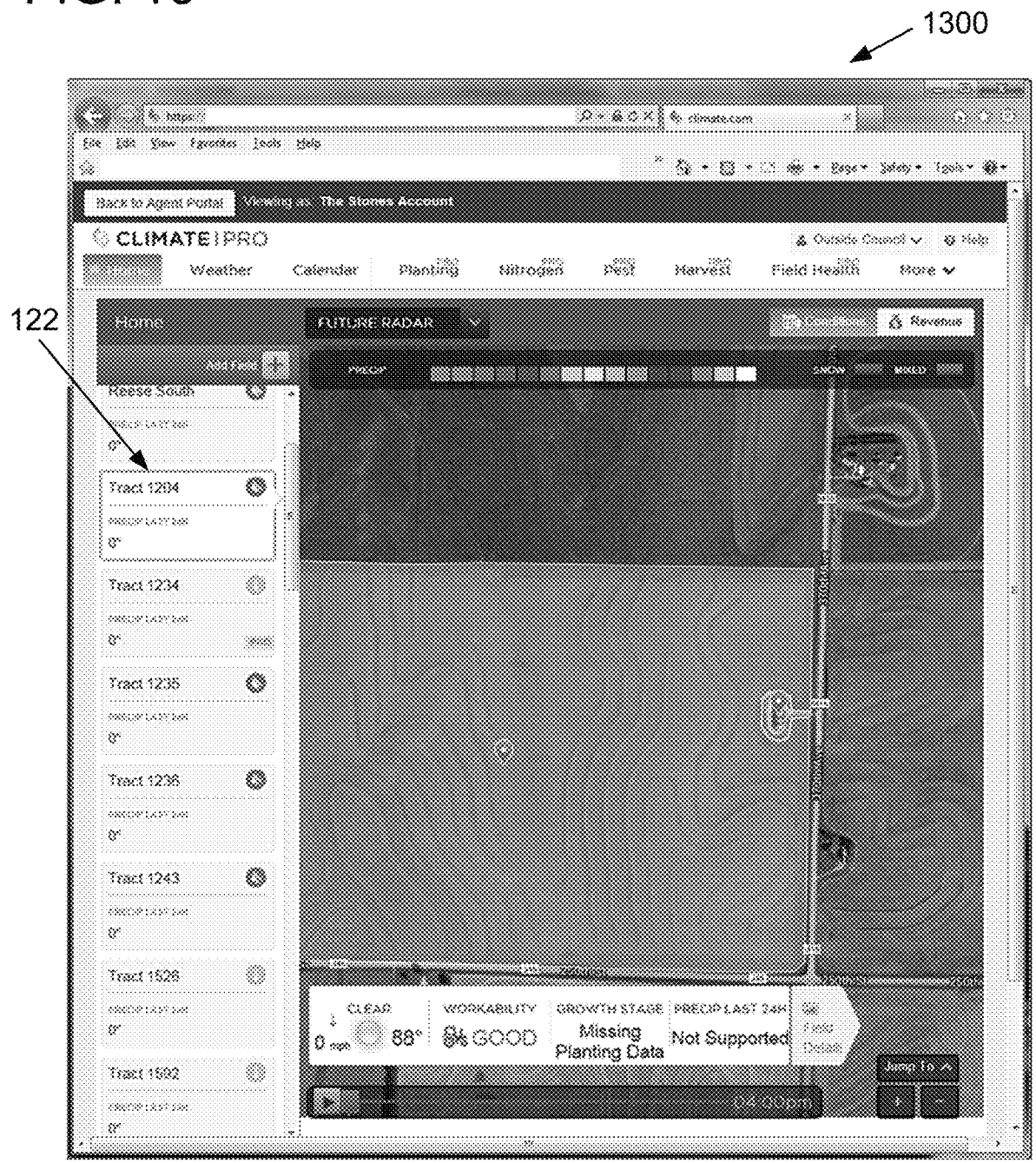
Figure 14:
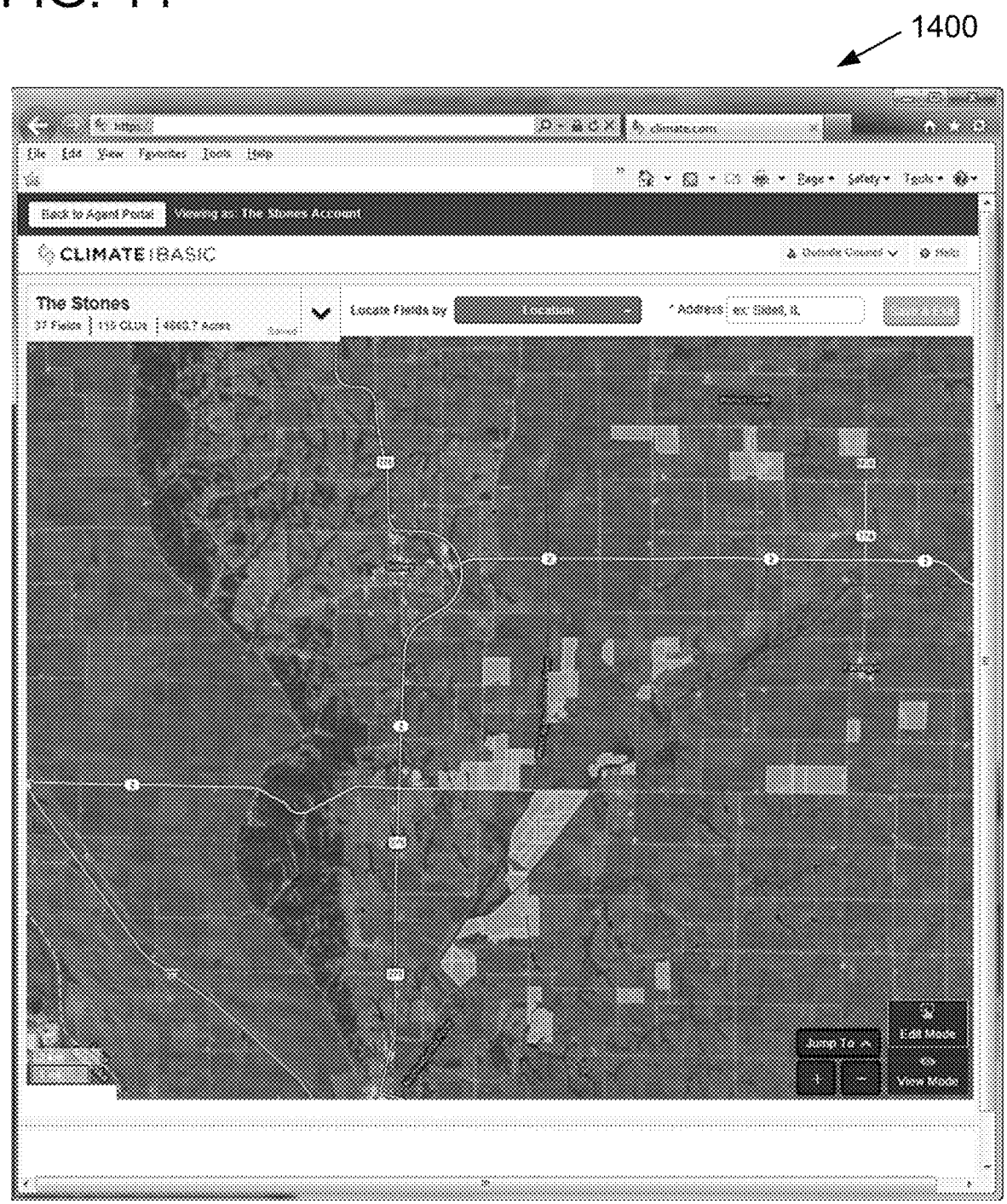
Figure 15:
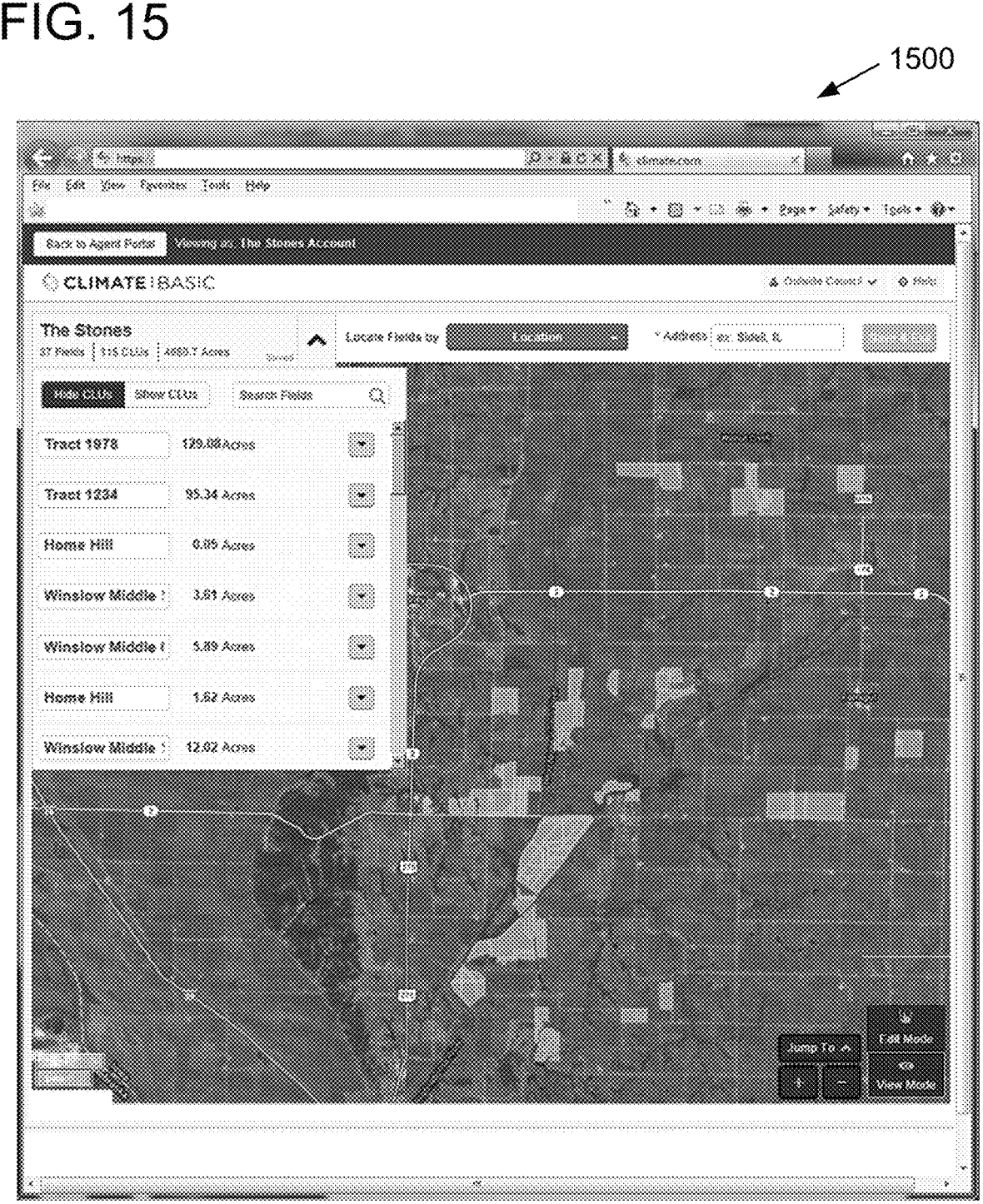
Figure 16:
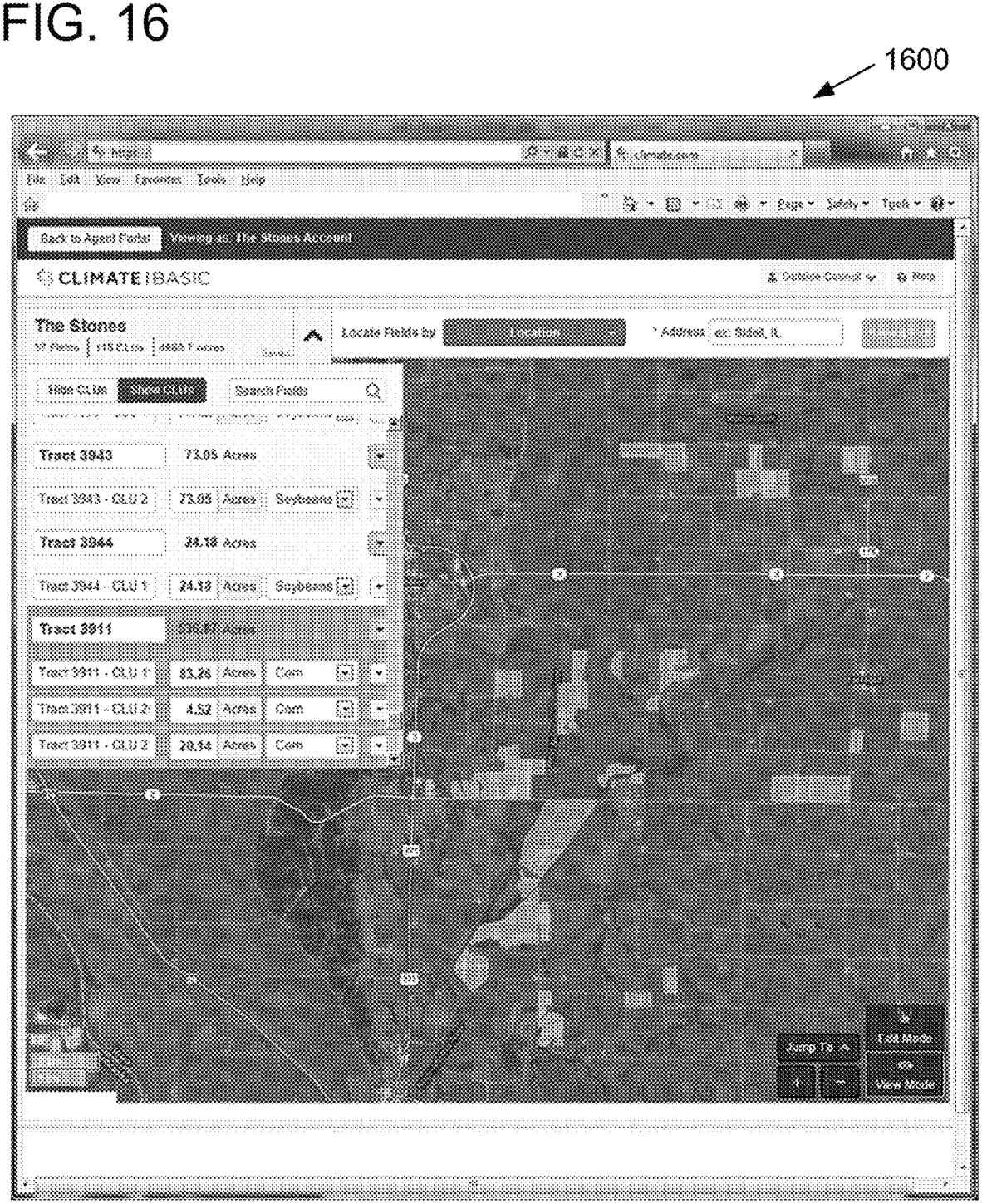
Figure 17:
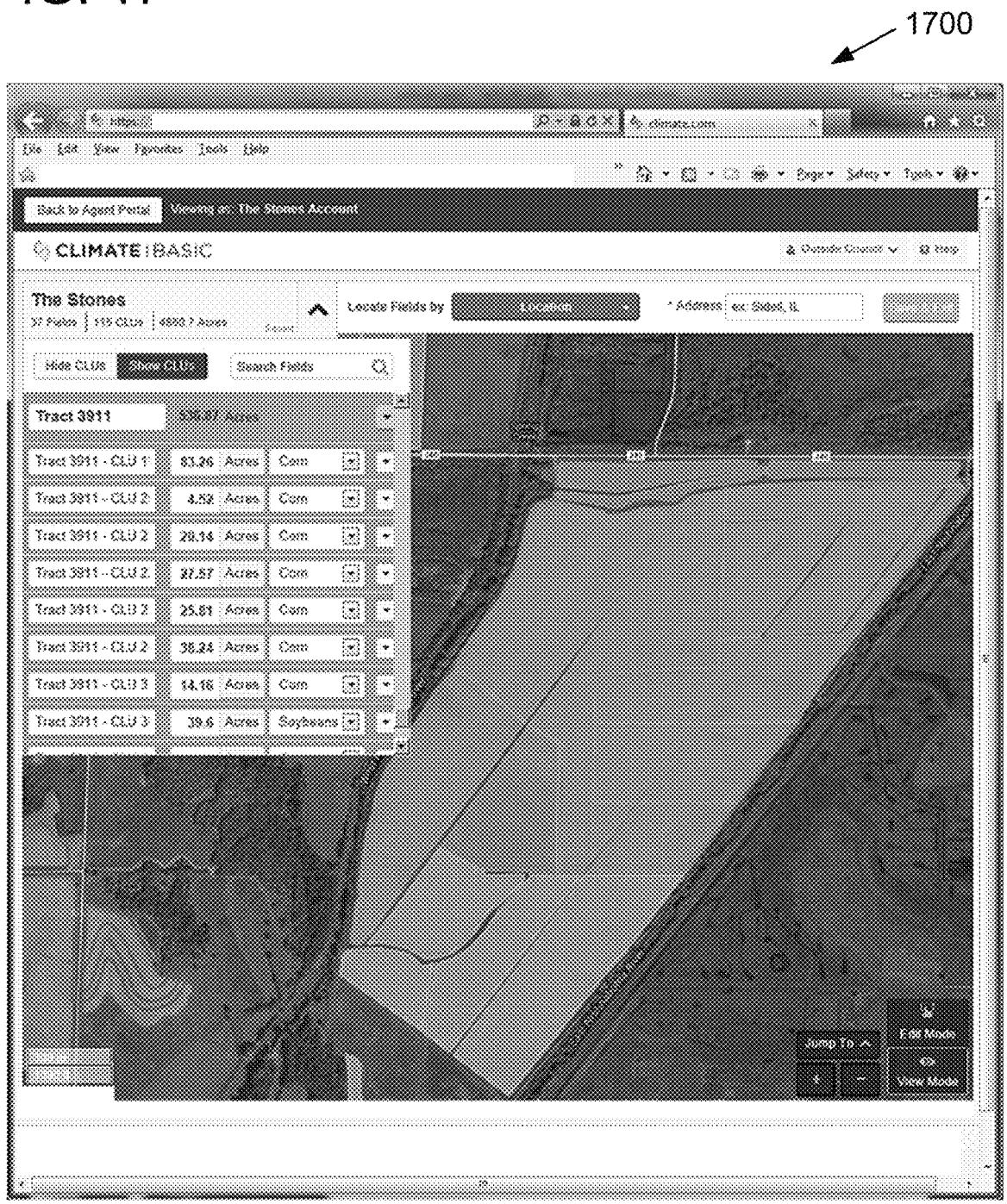
Figure 18:
Figure 19:
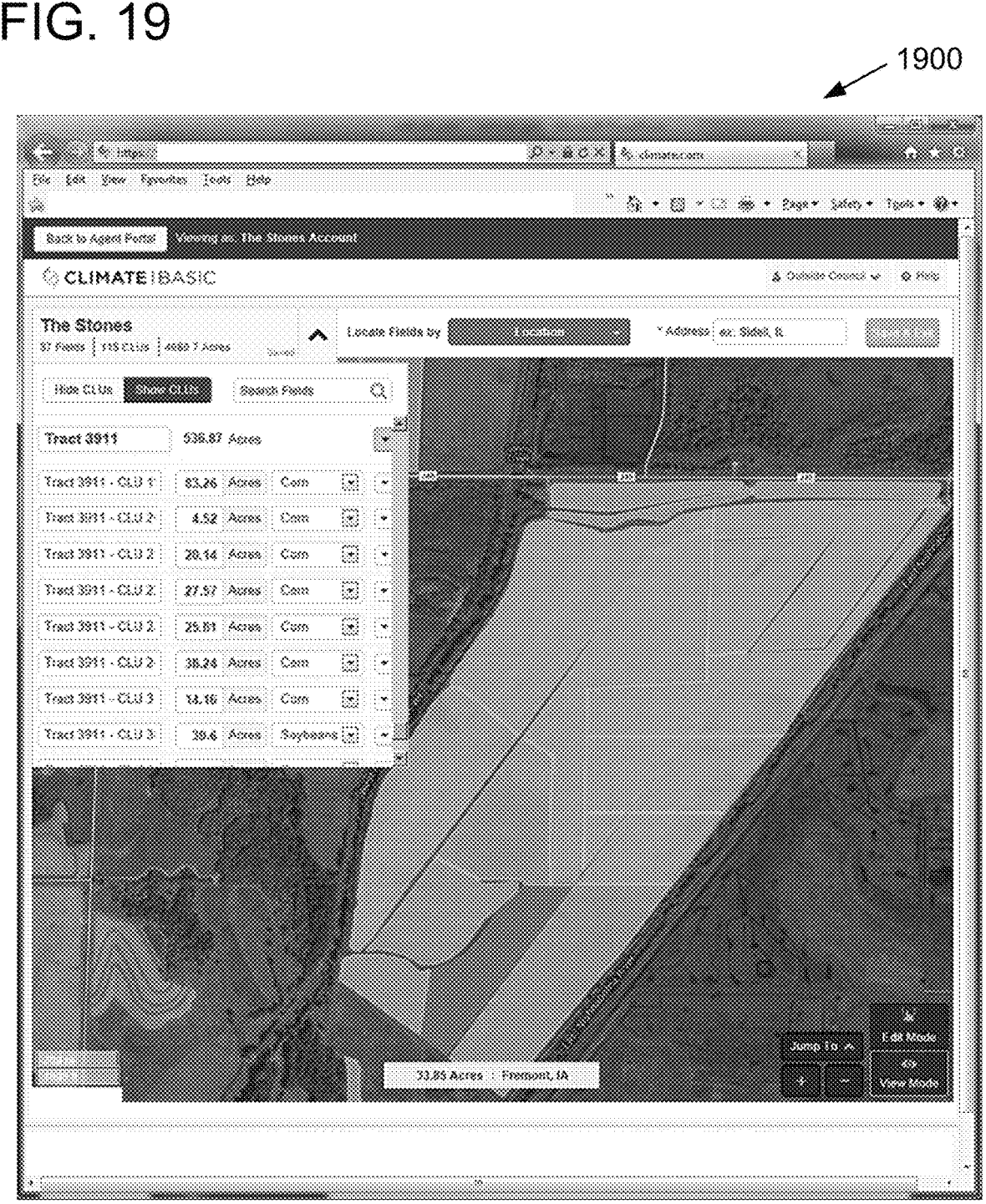
Figure 20:
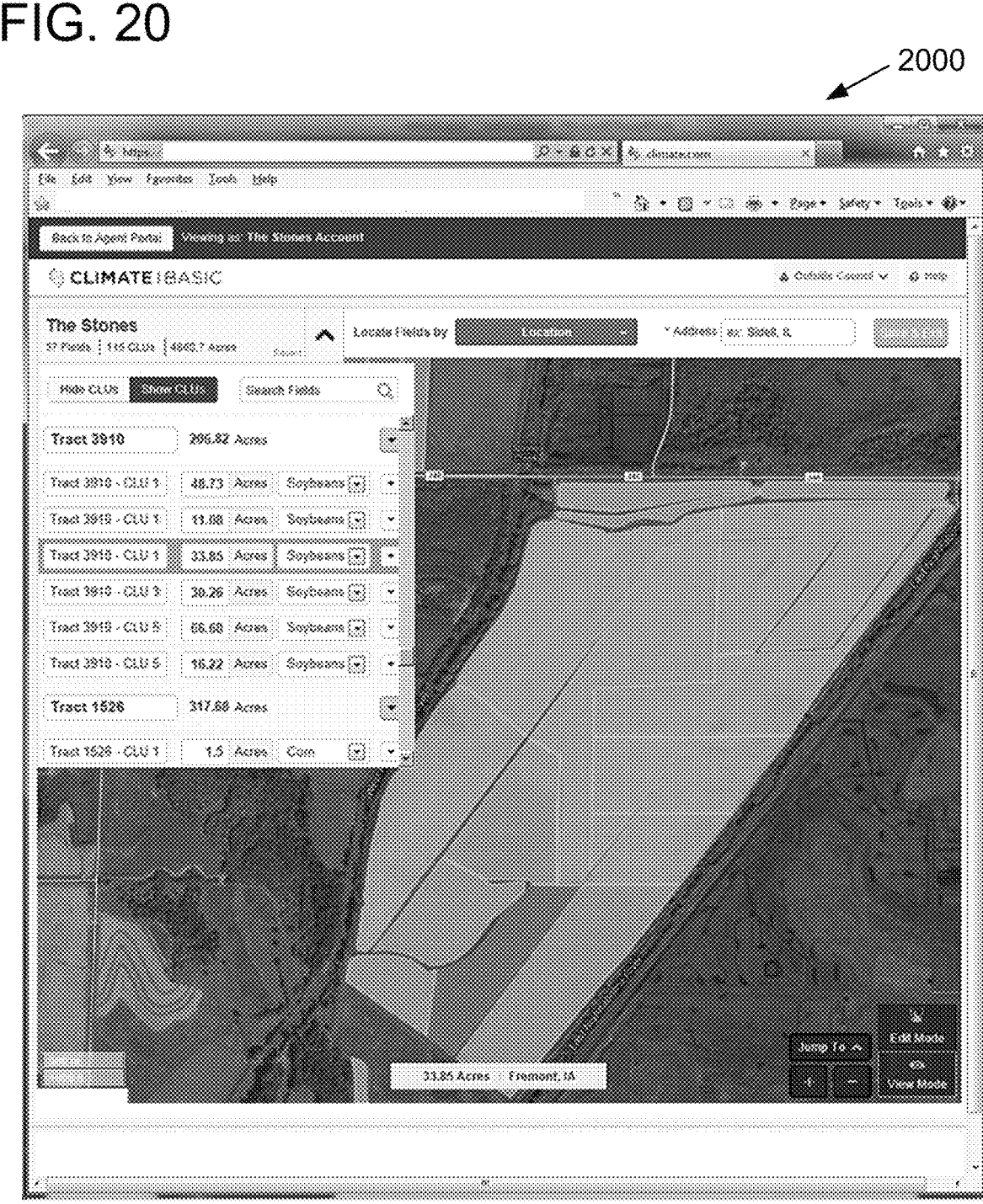

FIGS. 12 and 13 illustrate such field condition data 180 displayed graphically using maps. More specifically, from the view of screenshots 1200, grower 110 may select a particular portion of a map to identify field condition data 180 for each of fields 120. Screenshot 1300 accordingly illustrates such a display of field condition data 180 for a particular field 122.

Referring to FIGS. 14-20, screenshots 1400, 1500, 1600, 1700, 1800, 1900, and 2000 illustrate the display of fields 120 (shown in FIG. 1) associated with grower 110 (shown in FIG. 1). More specifically, in screenshot 1400 grower 110 provides field definition data 160 (shown in FIG. 1) to define fields 120, indicated graphically. Accordingly, a plurality of fields 120 are illustrated and may be reviewed individually or in any combination to obtain field condition data 180 (shown in FIG. 1) and/or recommended agricultural activities 190 (shown in FIG. 1). Note that screenshot 1400 illustrates that grower 110 may own, use, or otherwise manage a plurality of fields 120 that are substantially far from one another and associated with unique geographic and meteorological conditions. It will be appreciated that the systems and methods described herein, providing hyper localized field condition data 180 and recommended agricultural activities 190, substantially helps grower 110 to identify meaningful distinctions between each of fields 120 in order to effectively manage each field 120.

In screenshot 1500, grower 110 (shown in FIG. 1) may see a tabular view indicating identifiers for each field 120 (shown in FIG. 1) in conjunction with a map view of such fields. Grower 110 may navigate using the tabular view (or the graphical view) to individual actions associated with each field 120. Accordingly, screenshot 1600 illustrates enhanced information shown to grower 110 upon selecting a particular field for review from either the tabular view or the graphical view (e.g., by clicking on one of the fields). As is illustrated in screenshots 1700, 1800, 1900, and 2000, grower 110 may additionally enhance display (or "zoom in") to view a smaller subset of fields 120.

Figure 21:
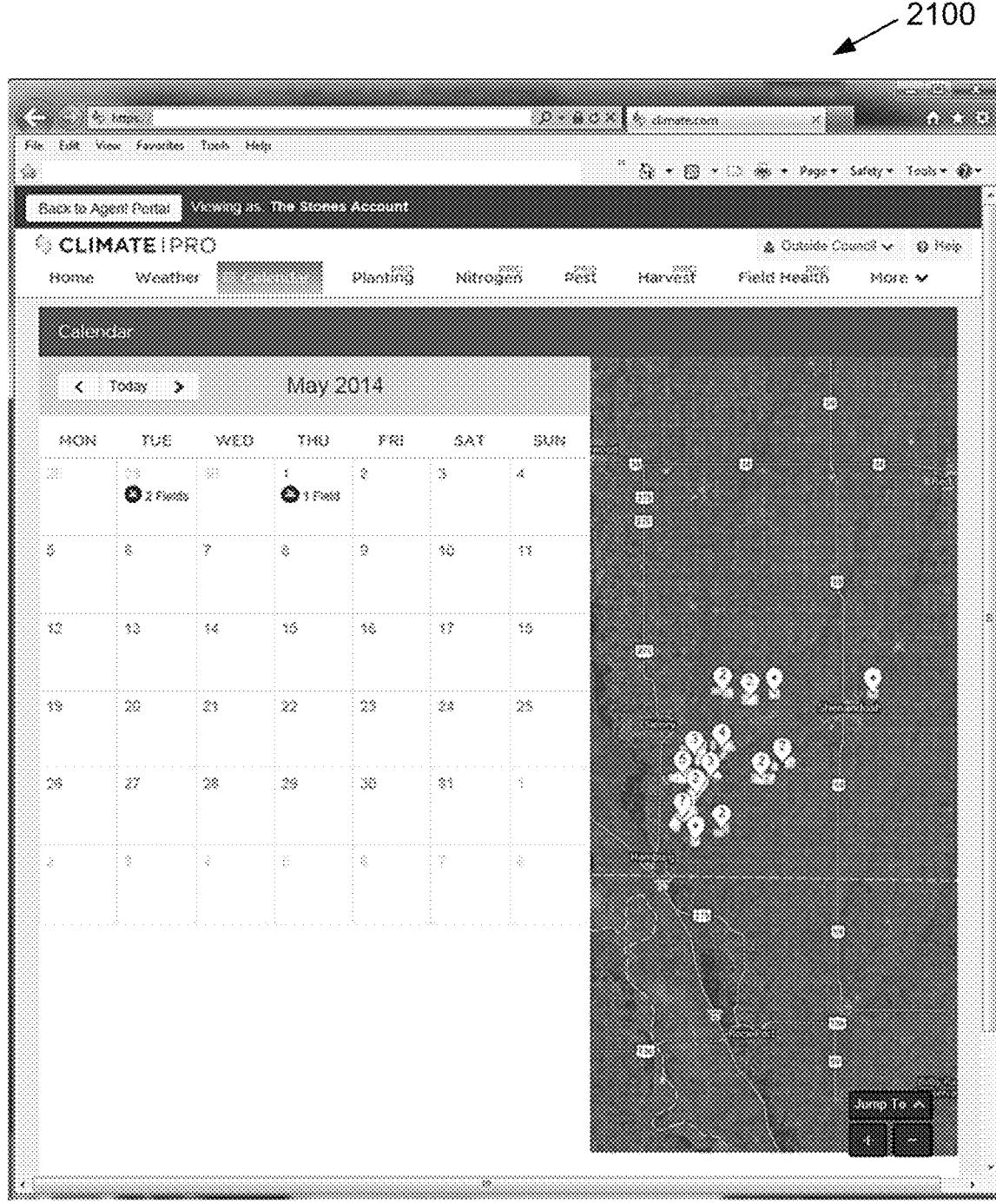
Figure 22:
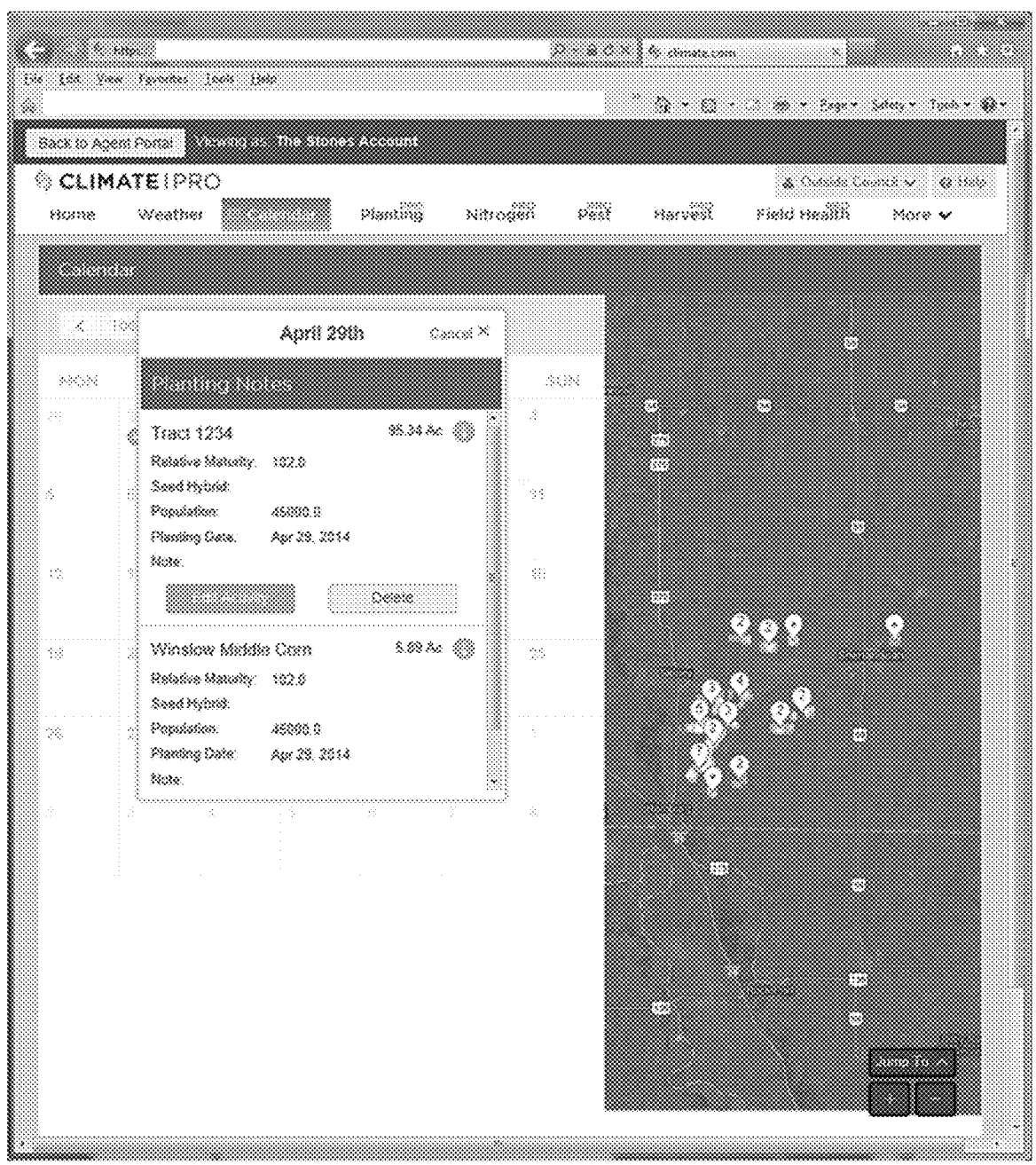

Referring to FIGS. 21 and 22, screenshots 2100 and 2200 illustrate historical data that may be provided by grower 110 (shown in FIG. 1) or any other source to identify notes or details associated with planting. More specifically, grower 110 may navigate to a particular date in screenshot 2400 and view planting notes as displayed in screenshot 2200.

Figure 23:
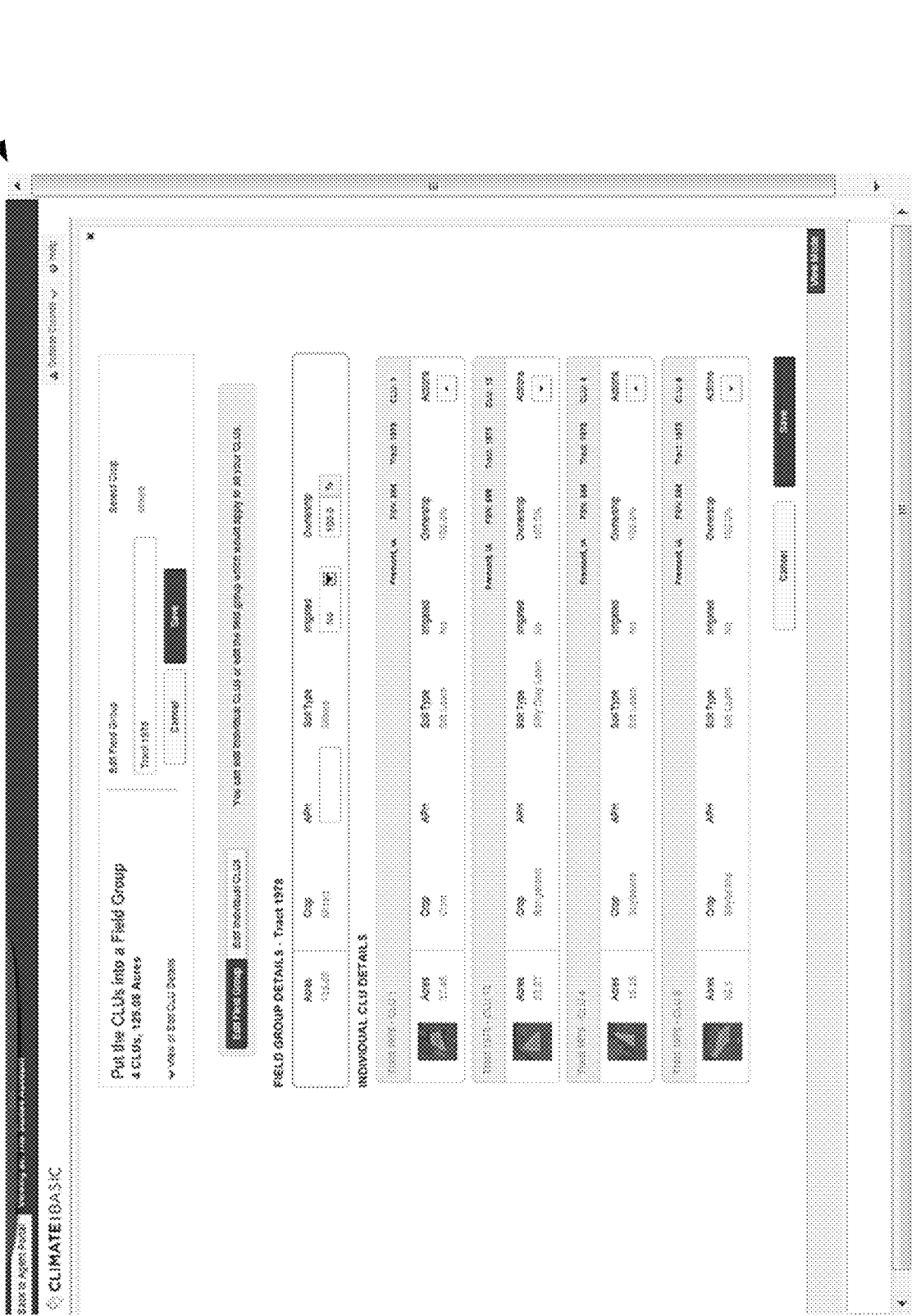
Figure 24:
Figure 25:
Figure 26:
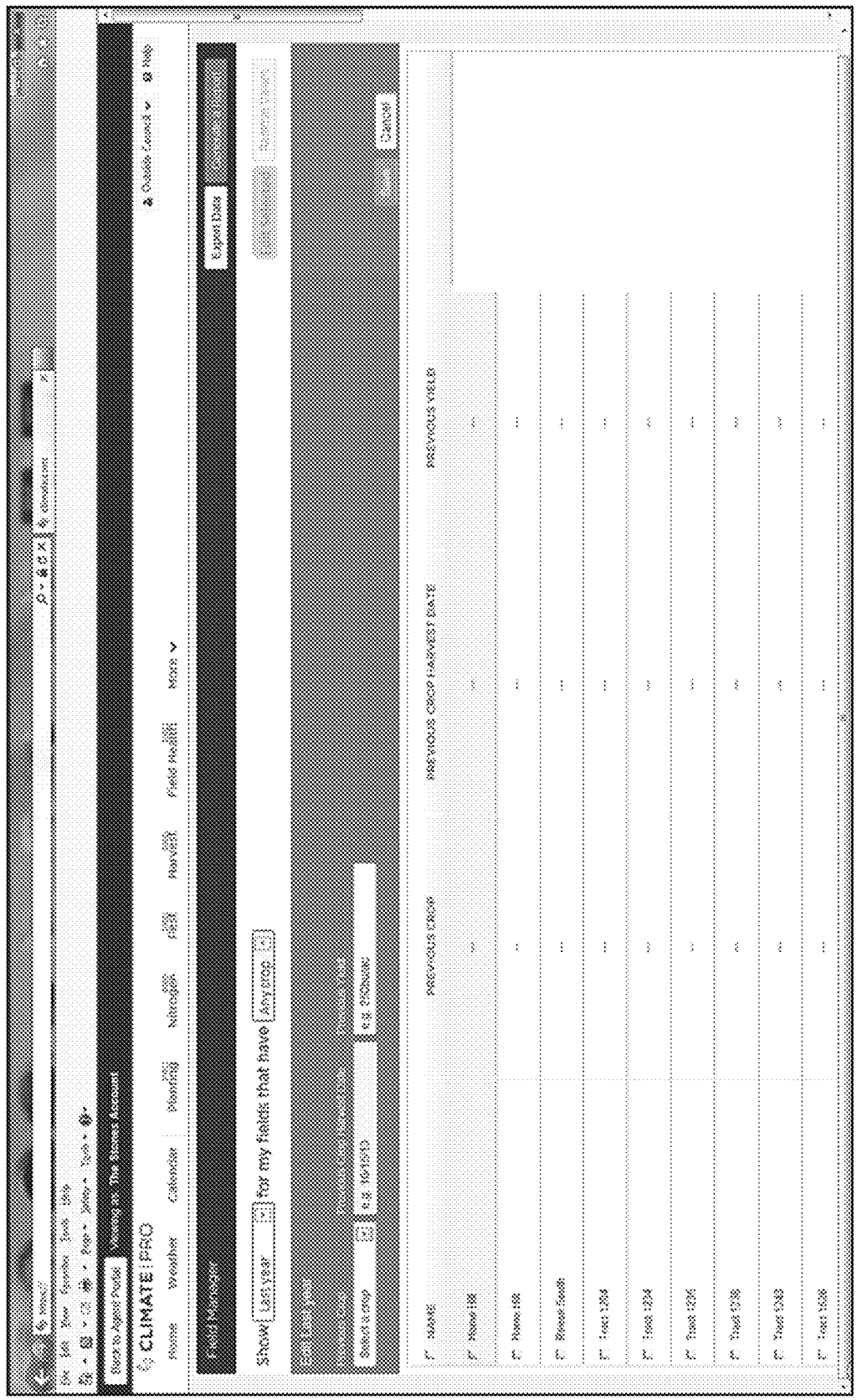
Figure 27:
Figure 28:
Figure 29:
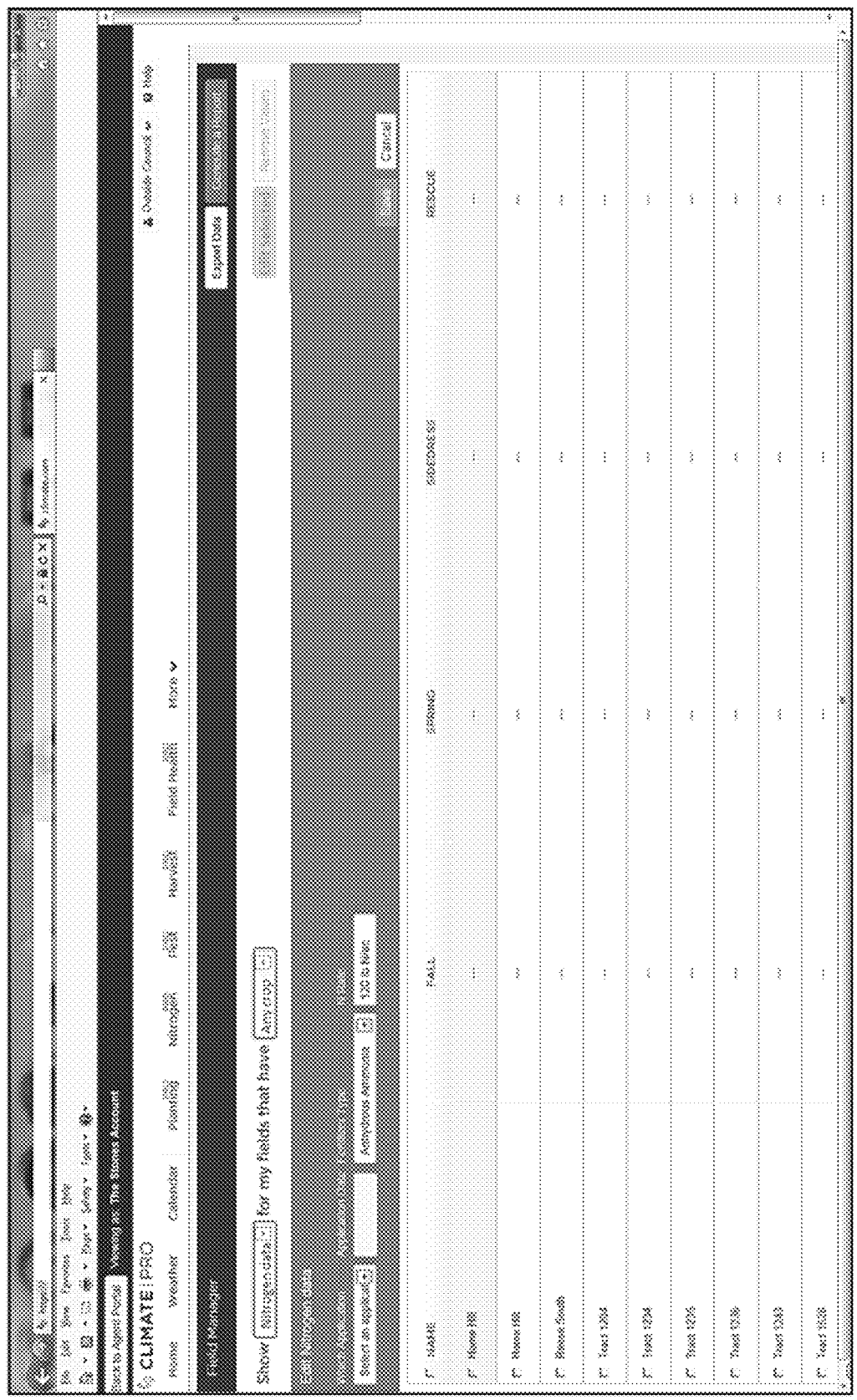
Figure 30:
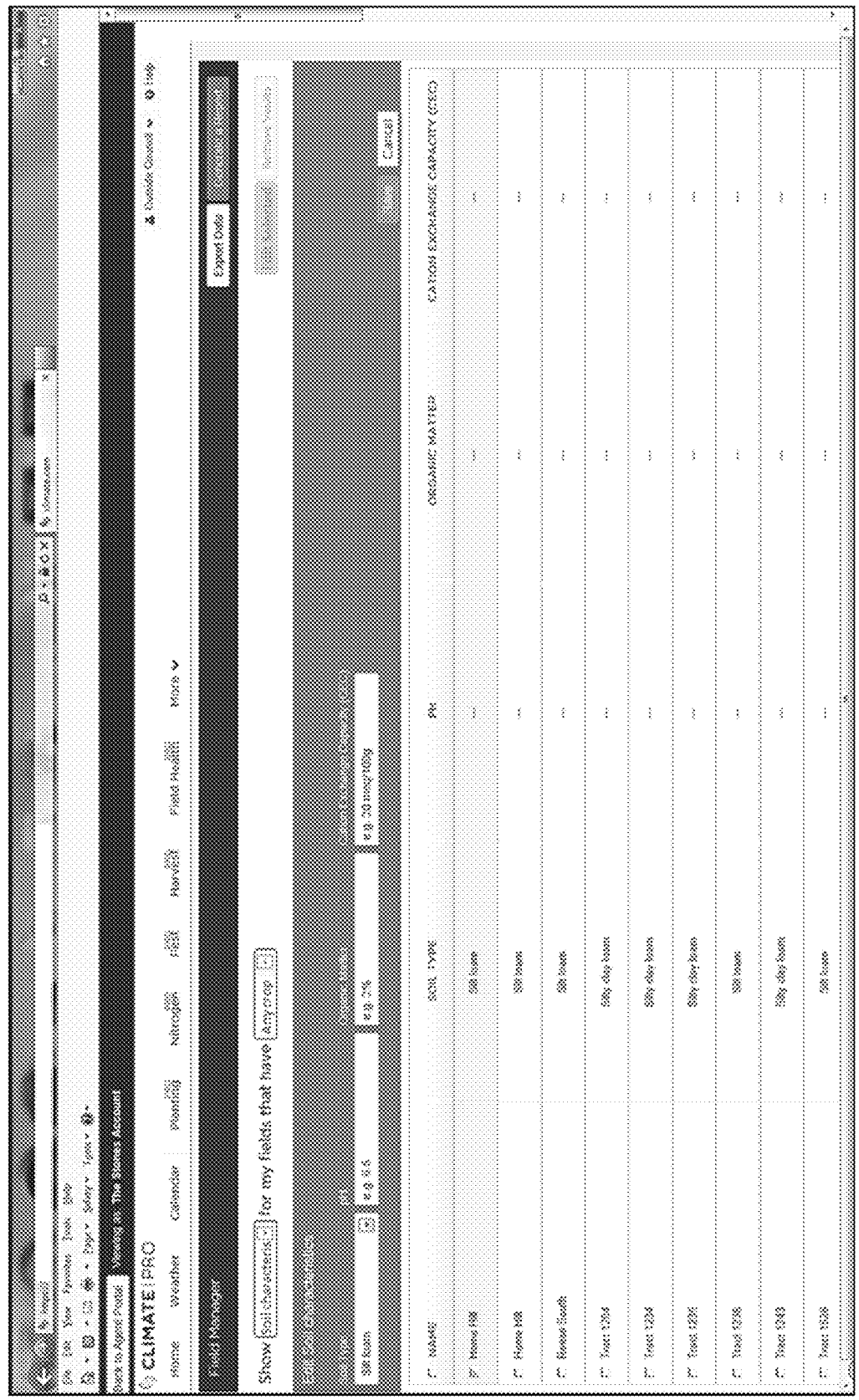

Referring to FIG. 23, screenshot 2300 presents a tabular view that allows grower 110 (shown in FIG. 1) to group or consolidate common land units ("CLUs") into "field groups". As a result, data associated with a particular field group may be viewed commonly. In some examples, grower 110 may be interested in viewing and managing particular fields 120 (shown in FIG. 1) in particular combinations based on, for example, common crops or geographies. Accordingly, the application and systems described facilitate such effective management.

Referring to FIGS. 24-30, screenshots 2400, 2500, 2600, 2700, 2800, 2900, and 3000 illustrate the use of a "field manager" tool that enables grower 110 (shown in FIG. 1) to view information for a plurality of fields in a tabular format. Screenshots 2400, 2500, 2600, 2700, 2800, 2900, and 3000 further indicate that grower 110 may view field condition data 180 in common with field-specific & environmental data 170 (shown in FIG. 1). For example screenshot 2400 illustrates, on a per field basis, current cultivated crop, acreage, average yield, tilling practices or methods, and residue levels. By contrast, screenshot 2500 illustrates that grower 110 may apply a filter 2510 to identify particular subgroups of fields 120 for review based on characteristics including current cultivated crop, acreage, average yield, tilling practices or methods, and residue levels. The field manager tool also enables grower 110 to update or edit information. Screenshots 2600, 2700, 2800, 2900, and 3000 show views wherein grower 110 may update or edit information for previous periods of cultivation. More specifically, in screenshot 2600, general data may be updated while in screenshot 2700, planting data may be updated. Similarly, in screenshot 2800, harvest data may be updated and in screenshot 2900, nitrogen data may be updated. In screenshot 3000, soil characteristics data may be updated.

Figure 31:
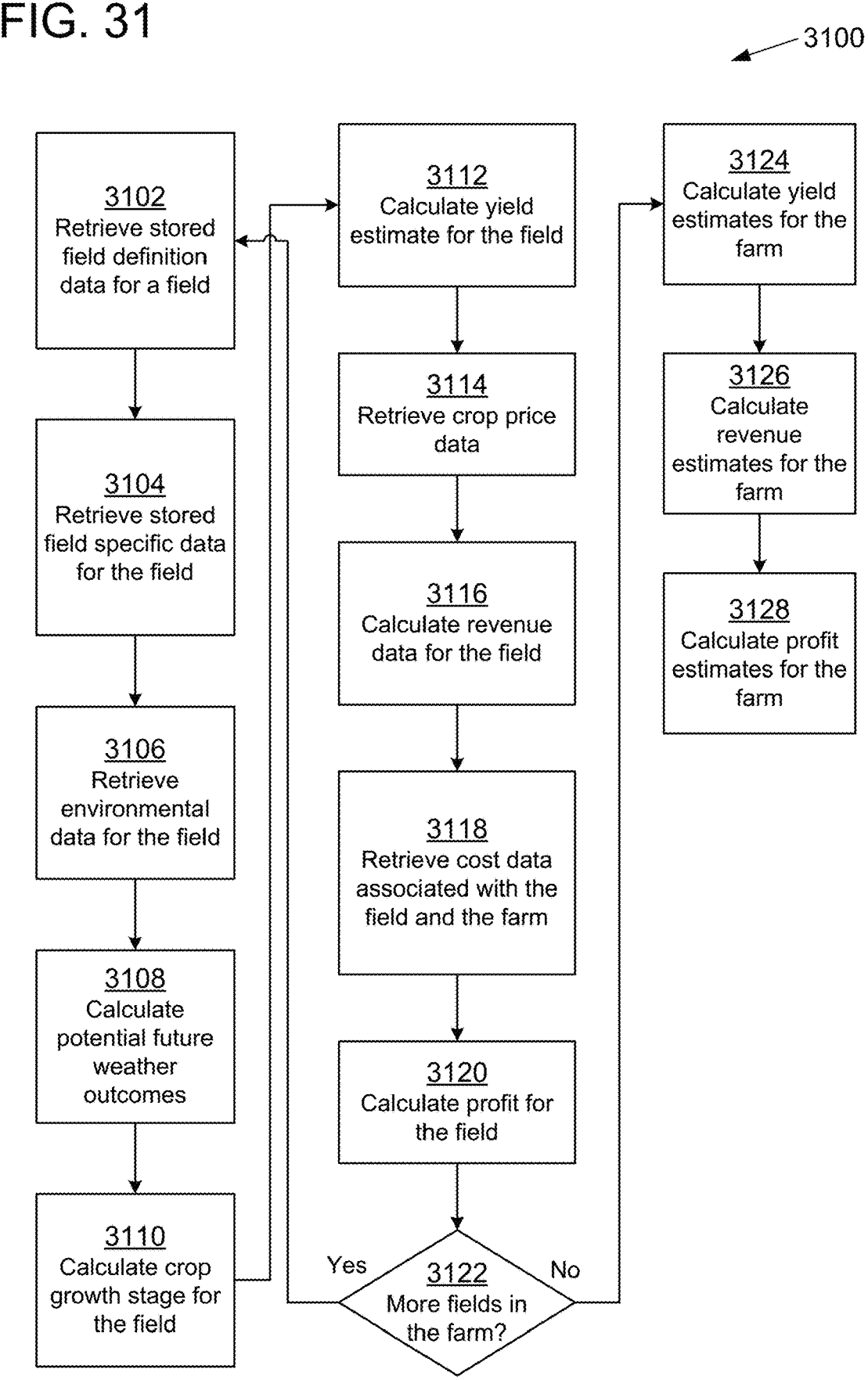
FIG. 31 is a flowchart illustrating an example of a process of calculating yield, revenue and profit estimates for a field in the plurality of fields as shown in the agricultural environment of FIG. 1.

FIG. 31 is a flowchart illustrating an example of a process 3100 of calculating yield, revenue and profit estimates for field 122 in plurality of fields 120 as shown in agricultural environment 100 of FIG. 1. Process 3100 may be implemented by a computing device, for example agricultural intelligence computer system 150, shown in FIG. 1. Process 3100 may be implemented by a computing module, for example revenue advisor module 426, shown in FIG. 4.

In the example embodiment, agricultural intelligence computer system 150 selects field 122 from plurality of fields 120 and retrieves 3102 stored field definition data including crop identifiers for field 122. Agricultural intelligence computer system 150 retrieves 3104 stored field specific data and retrieves 3106 environmental data which include specific weather data and soil conditions associated with field 122. Agricultural intelligence computer system 150 uses the retrieved environmental data to calculate 3108 potential future weather outcomes for field 122. Agricultural intelligence computer system 150 calculates 3110 the crop growth stage based on the crop identifiers and the likelihood of future weather outcomes.

Agricultural intelligence computer system 150 calculates 3112 yield estimates by combining the specific weather data, the soil conditions, the growth stage, and the likelihood of future weather outcomes. In the example embodiment, agricultural intelligence computer system 150 calculates 3112 an expected yield, a high yield and a low yield to provide to grower 110. In the example embodiment, the expected, high, and low yield estimates are provided to the grower 110 (shown in FIG. 1) via a user device (e.g., 114 shown in FIG. 1). In some embodiments, agricultural intelligence computer system 150 compares the calculated expected yield with the expected yield entered by grower 110, then agricultural intelligence computer system 150 adjusts the calculated expected yield based on the grower-provided expected yield. In these embodiments, the comparison and readjustment is a system calculation check to incorporate other issues that may affect yield such as the grower's level of technology. In some embodiments, agricultural intelligence computer system 150 adjusts the calculated expected yield by changing the calculated yield by a percentage or by moving the range to include the grower-provided expected yield.

To calculate the revenue data for field 122, agricultural intelligence computer system 150 retrieves 3114 crop price data for field 122. In the example embodiment, agricultural intelligence computer system 150 retrieves 3114 the current national crop prices from a pricing data service. Agricultural intelligence computer system 150 also allows grower 110 to select one or more additional crop price sources, such as from local grain elevators. Agricultural intelligence computer system 150 calculates 3116 the revenue estimates for each field based on the expected, high, and low yield estimates from step 3112. Agricultural intelligence computer system 150 provides the expected, high, low cases, and the revenue per acre to grower 110 (cite) via the user device (cite) as described below.

To calculate the profit data for field 122, agricultural intelligence computer system 150 retrieves 3118 the cost data associated with field 122 and with plurality of fields 120. Cost data can include, but is not limited to, cash rent, seed, fertilizer, irrigation, chemicals, pesticides, labor, machinery and equipment, operating interest, general costs, administrative costs, and other costs. Some of these costs are related to an individual field and some are related to the farm as a whole. For the costs related to plurality of fields 120 as a group, agricultural intelligence computer system 150 associates a portion of those cost to the costs of the individual field. In some embodiments, the portion of the costs that agricultural intelligence computer system 150 associates with the individual field is a percentage based on acreage. In other embodiments, grower 110 enters the percentage that overall costs should be applied to each individual field. Agricultural intelligence computer system 150 calculates 3120 the profit estimates for field 122 based on the expected, high, and low revenue estimates from step 3116. Agricultural intelligence computer system 150 provides the expected, high, low cases, and the profit per acre to grower 110 via the user device as described below.

Agricultural intelligence computer system 150 determines 3122 if there are any more fields in plurality of fields 120 that have not been analyzed. If there are more fields to analyze, then agricultural intelligence computer system 150 selects one of those unanalyzed fields and proceeds to Step 3102. If there are no more fields to analyze, then agricultural intelligence computer system 150 combines the yield estimates from each field to calculate 3124 yield estimates for plurality of fields 120 as a group. Agricultural intelligence computer system 150 combines the revenue estimates from each field to calculate 3126 revenue estimates for plurality of fields 120. Agricultural intelligence computer system 150 combines the profit estimates from each field to calculate 3128 profit estimates for plurality of fields 120. The combined yield, revenue, and profit estimates are provided to grower 110 via the user device as described below.

Figure 32:
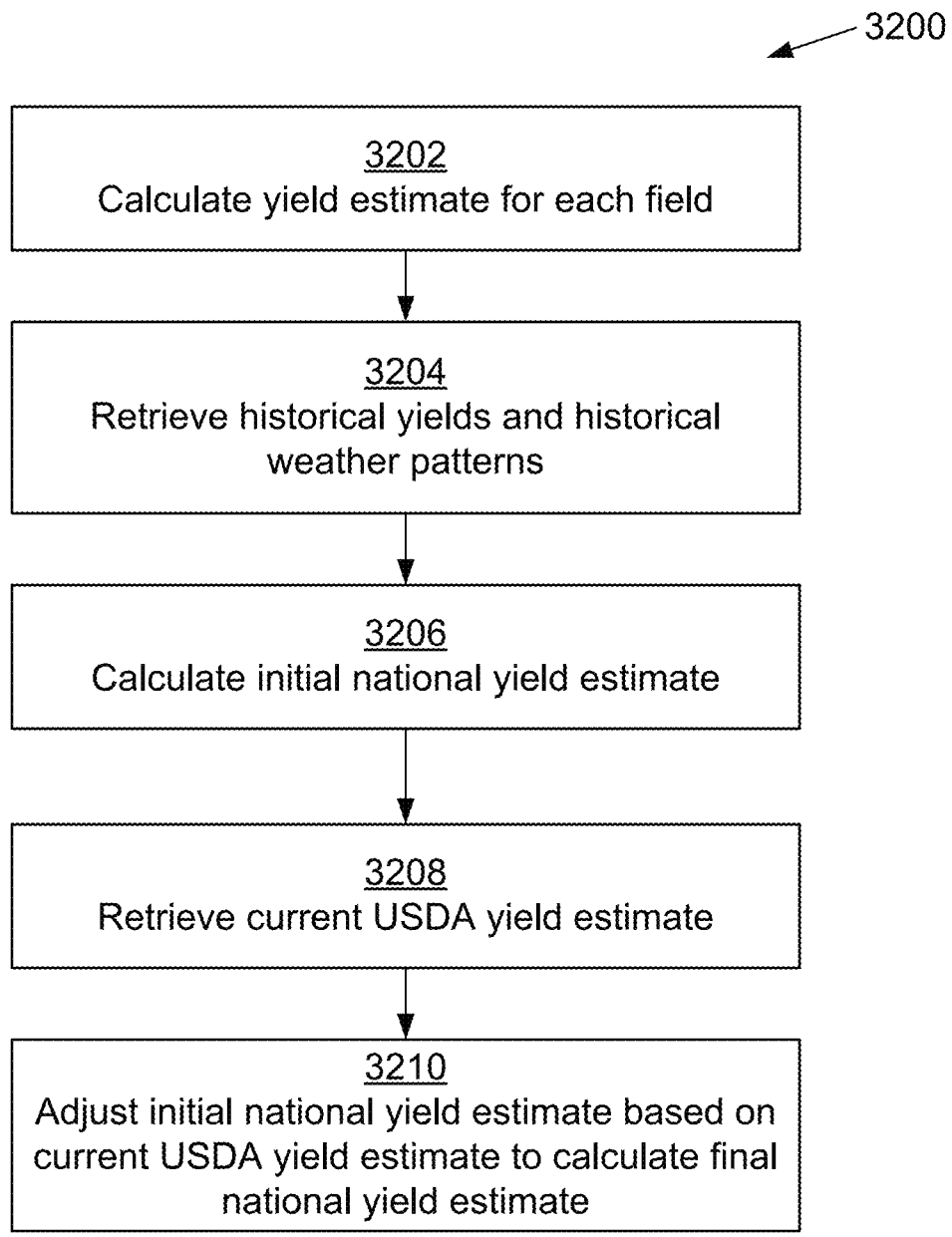
FIG. 32 is a flowchart illustrating an example of a process of calculating the national yield for a crop using the agricultural environment of FIG. 1.

FIG. 32 is a flowchart illustrating an example of a process 3200 of calculating the national yield for a crop using agricultural environment 100 of FIG. 1. Process 3500 may be implemented by a computing device, for example agricultural intelligence computer system 150. Process 3200 may be implemented by a computing module, for example revenue advisor module 426, shown in FIG. 4.

In the example embodiment, agricultural intelligence computer system 150 chooses a crop and calculates 3202 yield estimates for every field that is growing the chosen crop that agricultural intelligence computer system 150 has in database 157, shown in FIG. 1. Agricultural intelligence computer system 150 retrieves 3204 the historical yields for that crop and historical weather patterns from database 157. Agricultural intelligence computer system 150 calculates 3206 a national yield projection based on the historical yields, the historical weather patterns, and the plurality of yield estimates from the fields. Agricultural intelligence computer system 150 retrieves 3208 the current USDA yield estimate for that crop. Agricultural intelligence computer system 150 compares 3210 the retrieved USDA yield estimate with the calculated national yield projection. Agricultural intelligence computer system 150 provides the national yield projection and the USDA yield estimate for that crop to grower 110 via a user computer device as described below.

Figure 33:
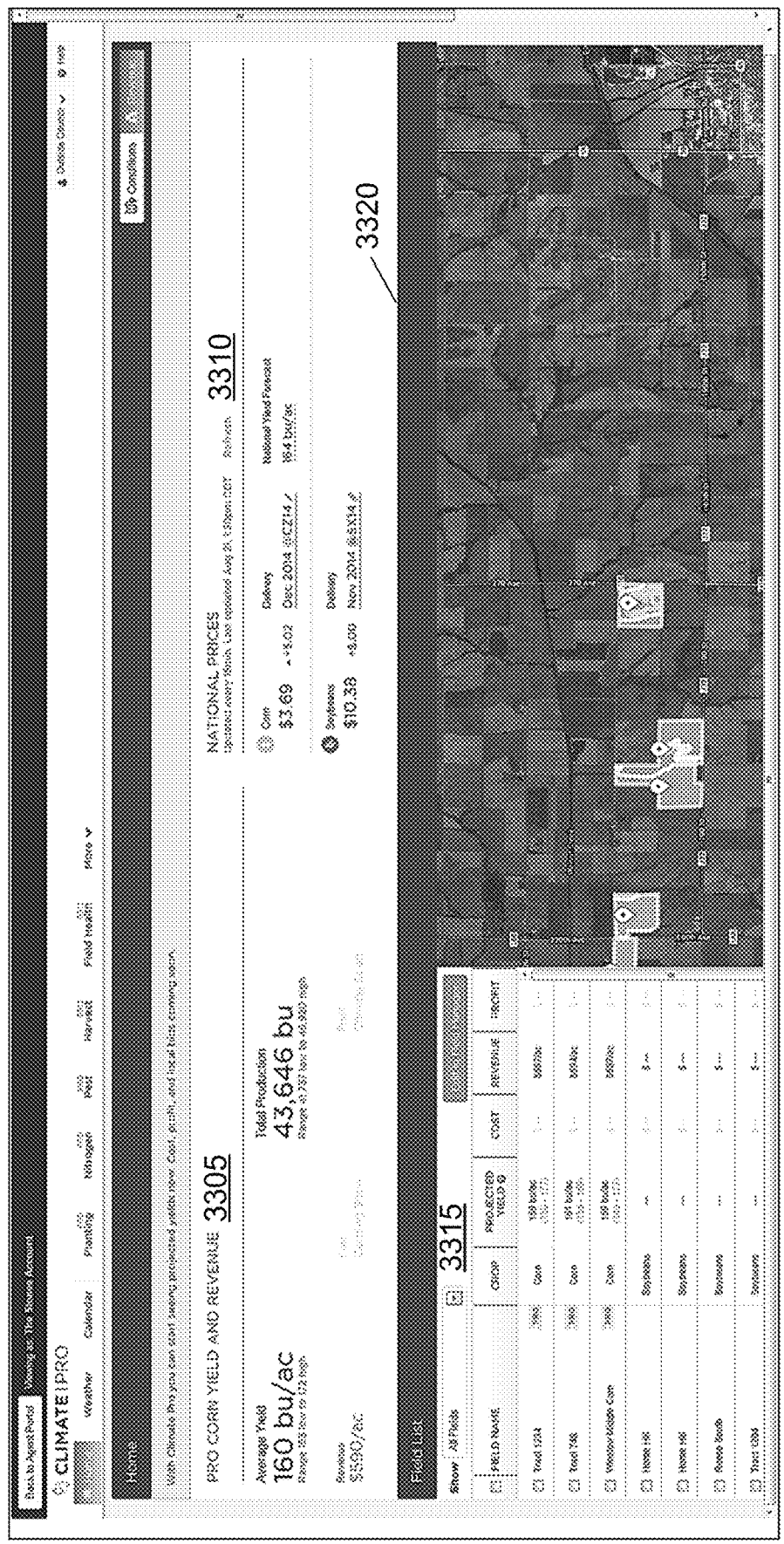
FIGS. 33-38 are illustrations of example user interfaces providing information from the agricultural intelligence computer system of FIG. 3 to the user device of FIG. 2 to determine agricultural revenue.

FIG. 33 is an illustration of an example user interface 3300 that may be used for determining agricultural revenue for one or more fields. In the example embodiment, revenue advisor module 426 (shown in FIG. 4) is in data communication with agricultural intelligence computer system 150 (shown in FIG. 1), and presents user interface 3300 to user for revenue management. User interface 3300 is a revenue management overview and includes a yield and revenue section 3305, a crop prices section 3310, a field list 3315, and a farm field layout 3320. As explained in further detail below, yield and revenue section 3305 includes farm level yield, revenue, and profit numbers at a glance. Crop prices section 3310 includes current crop prices based on a selected delivery data. Field list 3315 includes a listing of all of the fields in the farm. Farm field layout 3320 includes a geographic view of the fields in the farm.

Figure 34:
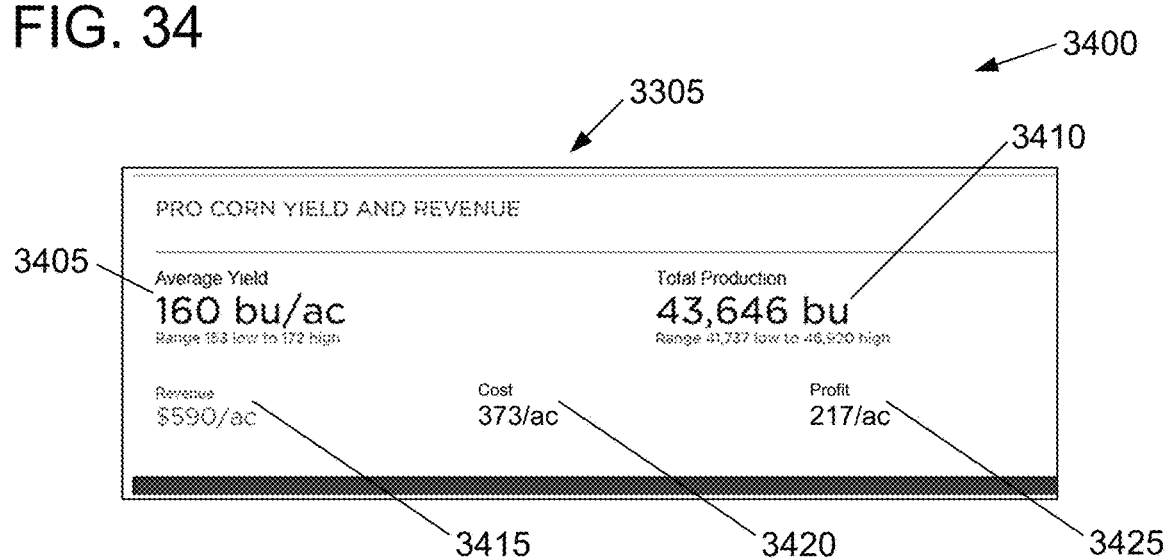

FIG. 34 is an illustration of example user interface 3400 of a detailed close-up of yield and revenue section 3305, shown in FIG. 33. In the example embodiment, yield and revenue section 3305 displays average yield 3405, total production 3410, revenue 3415, cost 3420, and profit 3425 for the plurality of fields 120 defined by grower 110 (both shown in FIG. 1). Average yield 3405 displays the calculated expected average yield per bushel calculated in Step 3124 in FIG. 31. Average yield 3405 also displays the high and low yield estimates. Total production 3410 displays the estimated total bushels that will be produced and the high and the low cases based on the yield estimates calculated in Step 3124. Revenue 3415 displays the calculated revenue for the farm per acre based on the revenue estimates calculated in Step 3126 shown in FIG. 31. Cost 4320 displays the cost per acre of operating the plurality of fields based on the cost data. Profit 3425 displays the profit per acre of the plurality of fields based on the profit data calculated in Step 3128 shown in FIG. 31.

Figure 35:
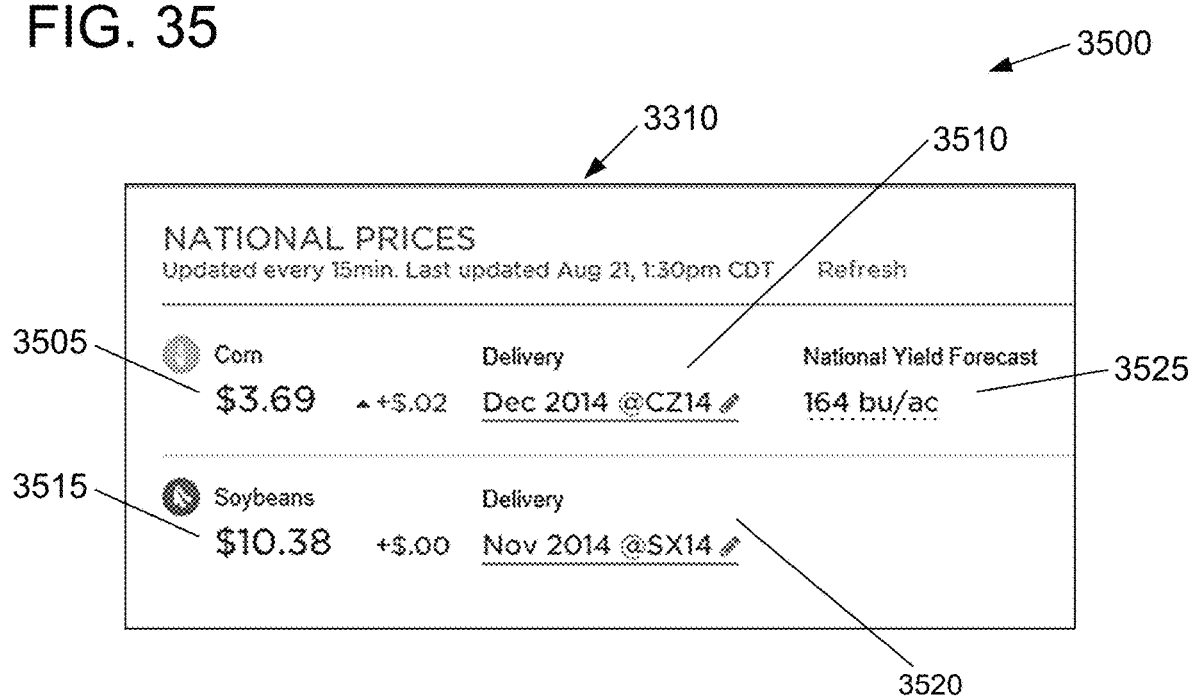

FIG. 35 is an illustration of example user interface 3500 of a detailed close-up of crop prices section 3310, shown in FIG. 33. In the example embodiment, crop prices section 3310 displays a current corn price 3505 based on a chosen corn delivery date 3510. Crop prices section 3310 also displays a current soybeans price 3515 based on a chosen soybeans delivery date 3520. A National yield forecast 3525, which was calculated in Step 3210 shown in FIG. 32, is also displayed.

Figure 36:
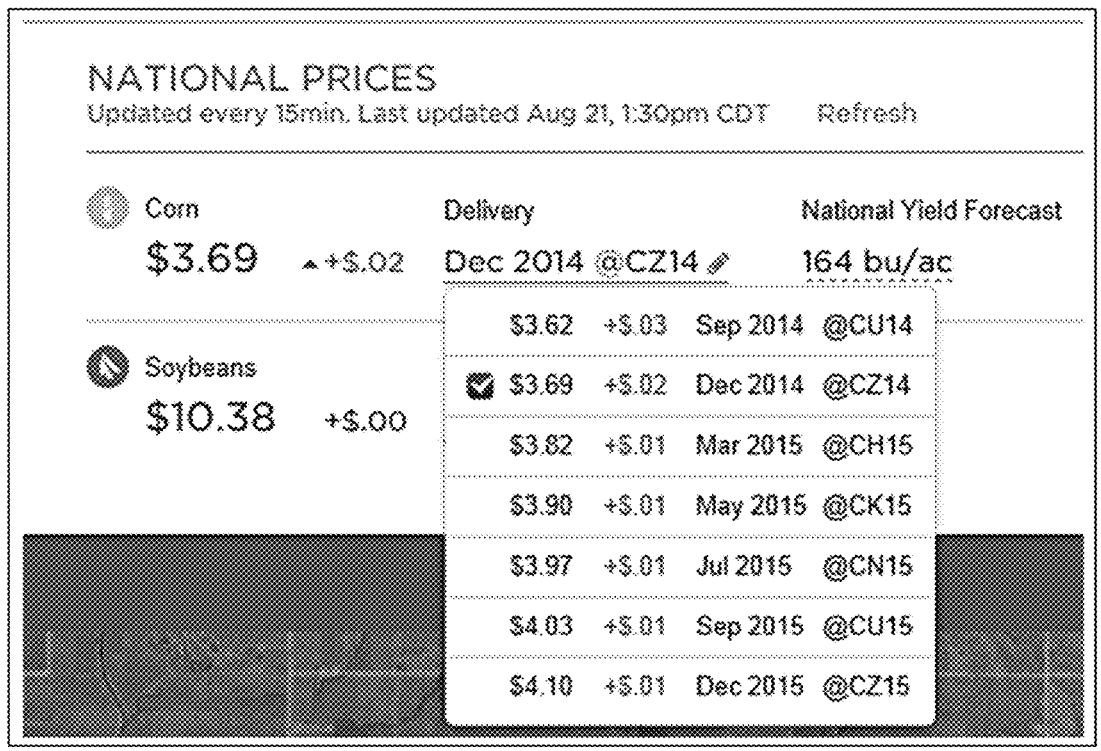

FIG. 36 is an illustration of an example user interface 3600 for allowing a user to choose the delivery date for a crop. When the chosen price for a crop changes, agricultural intelligence computer system 150 (shown in FIG. 1) updates the revenue and profit for each field with the same crop.

Figure 37:
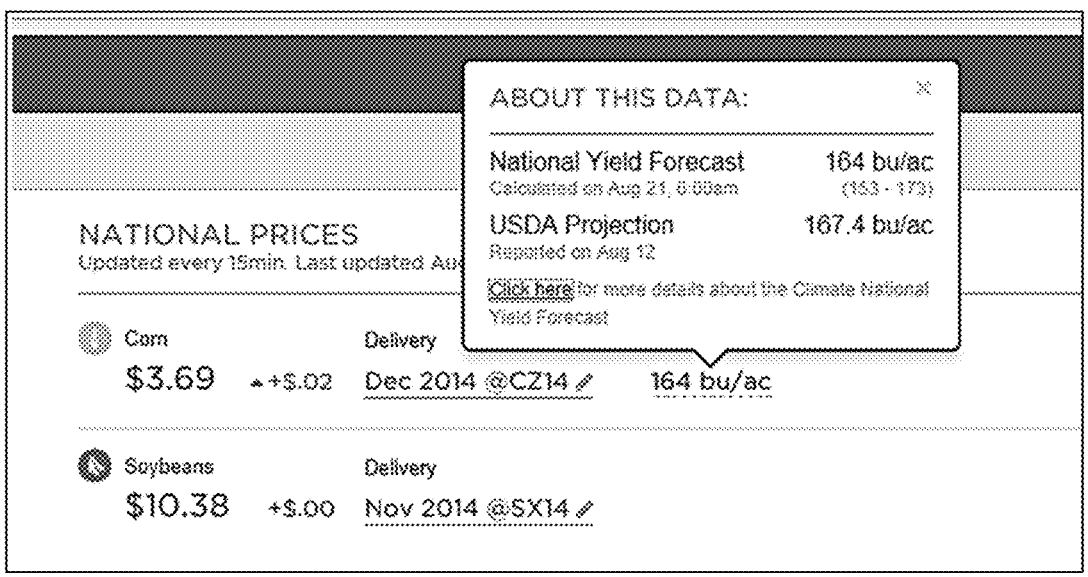

FIG. 37 is an illustration of an example user interface 3700 for displaying a comparison between the calculated national yield forecast (calculated in Step 3210 shown in FIG. 32) and the USDA projection as retrieved in Step 3208 (shown in FIG. 32).

Figure 38:
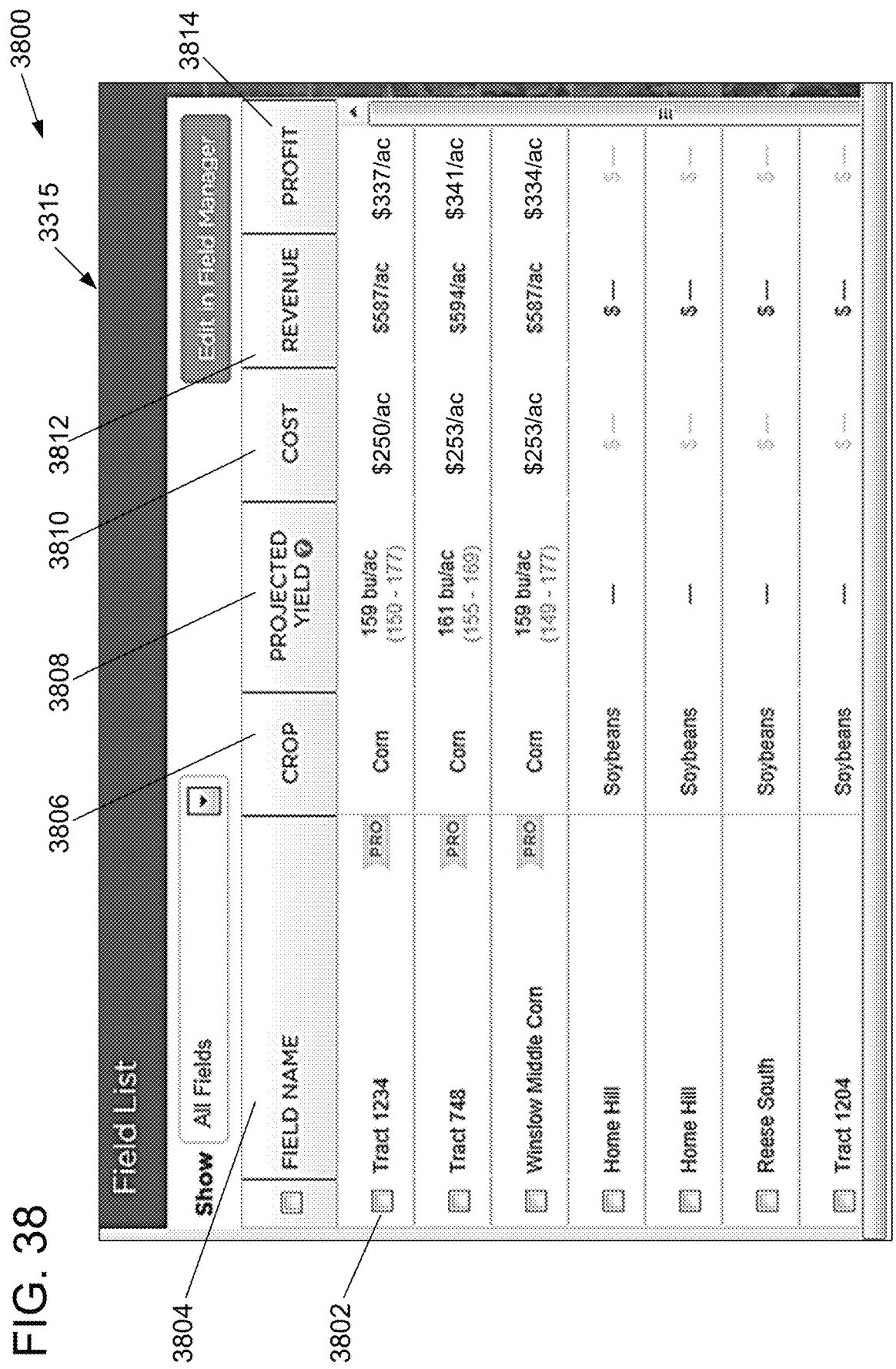

FIG. 38 is an illustration of an example user interface 3800 of a detailed close-up of field list 3315, shown in FIG. 33. For each field 3802, field list 3315 displays field name 3804, crop 3806, projected yield 3808, cost 3810, revenue 3812, and profit 3814, based on the field definition data, yield data, revenue data, and profit data described above.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for determining agricultural yield estimates implemented using an agricultural intelligence computer system in communication with a processor, a memory and a database, the method comprising:
receiving, from a database over a communications interface, a plurality of field definition data;
retrieving, from the database, a plurality of input data from a plurality of data networks;
determining, by the processor, a field region, of a plurality of field regions, based on the field definition data;
identifying a subset of the plurality of input data associated with the field region;
generating, by the processor, a calculated expected yield for the field region by performing calculations based on the field definition data and the subset of the plurality of input data; wherein the calculated expected yield comprises a high yield for the field region, calculated based on the field definition data and the subset of the plurality of input data, and a calculated low yield for the field region calculated based on the field definition data and the subset of the plurality of input data;
collecting, by the agricultural intelligence computer system, user-entered expected yield;
comparing, by the agricultural intelligence computer system, the calculated expected yield with the user-entered expected yield;
in response to determining that the calculated expected yield does not include the user-entered expected yield within a particular range:
collecting additional input data from the plurality of data networks;
automatically generating, by the processor, an update based on the calculated expected yield, the field definition data and the additional input data, and by automatically adjusting the calculated expected yield by changing the calculated expected yield by a particular percentage value or by moving the particular range until the calculated expected yield includes the user-entered expected yield; and
transmitting the update to one or more user devices, so that each user device, of the one or more user devices, displays the update for the field region of the plurality of field regions.

2. The method of claim 1, wherein the field definition data includes a crop identifier and the method further comprises:
calculating a crop growth stage based on the crop identifier and the calculated expected yield; and providing the crop growth stage to a user device.

3. The method of claim 2, further comprising:
receiving cost data for the field region;
calculating at least one profit projection for the field region based on the cost data and the crop growth stage; and providing the at least one profit projection to the user device.

4. The method of claim 3, further comprising:
retrieving the plurality of input data from the plurality of data networks on a daily basis; and
recalculating the calculated expected yield, the crop growth stage, and the at least one profit projection on a daily basis.

5. The method of claim 2, wherein receiving crop prices further comprises:
receiving, from the user device, a selection of at least one local crop price source;
determining at least one national crop price from the plurality of input data;
retrieving, from at least one local crop price source, at least one local crop price based on the crop identifier associated with the field region;
calculating a first crop growth stage based on the calculated expected yield and at least one national crop price;
calculating a second crop growth stage based on the calculated expected yield and the at least one local crop price; and
providing the first crop growth stage and the second crop growth stage for the field based on the calculated expected yield and at least one crop price.

6. The method of claim 1, further comprising:
determining a plurality of field regions based on the field definition data;
identifying a subset of the plurality of input data associated with each field region of the plurality of field regions; and
calculating at calculated expected yield for each field region based on the field definition data.

7. The method of claim 1, further comprising:
selecting a crop identifier;
determining a plurality of field regions with the selected crop identifier;
aggregating the calculated expected yield for each field region in the plurality of field regions with the selected crop identifier;
determining a national predicted yield estimate for the selected crop identifier based on the aggregation; and
providing the national predicted yield estimate to a user device.

8. A networked agricultural intelligence system for determining agricultural yield estimates comprising:
a plurality of data network computer systems; and
an agricultural intelligence computer system comprising a processor and a memory in communication with said processor, said processor configured to:
receive, from a database over a communications interface, a plurality of field definition data;
retrieve, from the database, a plurality of input data from a plurality of data networks;
determine, by the processor, a field region, of a plurality of field regions, based on the field definition data;
identify a subset of the plurality of input data associated with the field region;
generate, by the processor, a calculated expected yield for the field region by performing calculations based on the field definition data and the subset of the plurality of input data; wherein the calculated expected yield comprises a high yield for the field region, calculated based on the field definition data and the subset of the plurality of input data, and a calculated low yield for the field region calculated based on the field definition data and the subset of the plurality of input data;

collect, by the agricultural intelligence computer system, user-entered expected yield;

compare, by the agricultural intelligence computer system, the calculated expected yield with the user-entered expected yield;

in response to determining that the calculated expected yield does not include the user-entered expected yield within a particular range:

collect additional input data from the plurality of data networks;

automatically generate, by the processor, an update based on the calculated expected yield, the field definition data and the additional input data, and by automatically adjusting the calculated expected yield by changing the calculated expected yield by a particular percentage value or by moving the particular range until the calculated expected yield includes the user-entered expected yield; and transmit the update to one or more user devices, so that each user device, of the one or more user devices, displays the update for the field region of the plurality of field regions.

9. The networked agricultural intelligence system in accordance with claim 8 wherein the field definition data includes a crop identifier, and the processor is further configured to:

calculate a crop growth stage based on the crop identifier and the calculated expected yield; and provide the crop growth stage to a user device.

10. The networked agricultural intelligence system in accordance with claim 9 wherein the processor is further configured to:

receive cost data for the field region;

calculate at least one profit projection for the field region based on the cost data and the crop growth stage; and provide the at least one profit projection to the user device.

11. The networked agricultural intelligence system in accordance with claim 10 wherein the processor is further configured to:

retrieve the plurality of input data from the plurality of data networks on a daily basis; and recalculate the calculated expected yield, the crop growth stage, and the at least one profit projection on a daily basis.

12. The networked agricultural intelligence system in accordance with claim 9 wherein the processor is further configured to:

receive a selection of at least one local crop price source from the user device;

determine at least one national crop price from the plurality of input data;

retrieve at least one local crop price based on the crop identifier associated with the field region from at least one local crop price source;

calculate a first crop growth stage based on the calculated expected yield and at least one national crop price;

calculate a second crop growth stage based on the calculated expected yield and the at least one local crop price; and provide the first crop growth stage and the second crop growth stage for the field based on the calculated expected yield and at least one crop price.

13. The networked agricultural intelligence system in accordance with claim 8 wherein the processor is further configured to:

determine a plurality of field regions based on the field definition data;

identify a subset of the plurality of input data associated with each field region of the plurality of field regions; and calculate at calculated expected yield for each field region based on the field definition data.

14. The networked agricultural intelligence system in accordance with claim 8 wherein the processor is further configured to:

select a crop identifier;

determine a plurality of field regions with the selected crop identifier;

aggregate the calculated expected yield for each field region in the plurality of field regions with the selected crop identifier;

determine a national yield projection for the selected crop identifier based on the aggregation; and provide the national yield projection to a user device.

15. A non-transitory computer-readable storage media for managing agricultural activities, storing computer-executable instructions, which, when executed by at least one processor, cause the at least one processor to:

receive, from a database over a communications interface, a plurality of field definition data;

retrieve, from the database, a plurality of input data from a plurality of data networks;

determine, by the processor, a field region, of a plurality of field regions, based on the field definition data;

identify a subset of the plurality of input data associated with the field region;

generate, by the processor, a calculated expected yield for the field region by performing calculations based on the field definition data and the subset of the plurality of input data; wherein the calculated expected yield comprises a high yield for the field region, calculated based on the field definition data and the subset of the plurality of input data, and a calculated low yield for the field region calculated based on the field definition data and the subset of the plurality of input data;

collect, by an agricultural intelligence computer system, user-entered expected yield;

compare, by the agricultural intelligence computer system, the calculated expected yield with the user-entered expected yield;

in response to determining that the calculated expected yield does not include the user-entered expected yield within a particular range:

collect additional input data from the plurality of data networks;

automatically generate, by the processor, an update based on the calculated expected yield based on the field definition data and the additional input data, and by automatically adjusting the calculated expected yield by changing the calculated expected yield by a particular percentage value or by moving the particular range until the calculated expected yield includes the user-entered expected yield; and transmit the update to one or more user devices, so that each user device, of the one or more user devices, displays the update for the field region of the plurality of field regions.

16. The computer-readable storage media of claim 15, wherein the field definition data includes a crop identifier; and storing additional instructions which, when executed by the at least one processor, cause the at least one processor to:
calculate a crop growth stage based on the crop identifier and the calculated expected yield; and
provide the crop growth stage to a user device.

17. The computer-readable storage media of claim 16, storing additional instructions which, when executed by the at least one processor, cause the at least one processor to:
receive cost data for the field region;
calculate at least one profit projection for the field region based on the cost data and the crop growth stage; and
provide the at least one profit projection to the user device.

18. The computer-readable storage media of claim 17, storing additional instructions which, when executed by the at least one processor, cause the at least one processor to:
retrieve the plurality of input data from the plurality of data networks on a daily basis; and
recalculate the calculated expected yield and the at least one profit projection on a daily basis.

19. The computer-readable storage media of claim 16, storing additional instructions which, when executed by the at least one processor, cause the at least one processor to:
receive a selection of at least one local crop price source from the user device;
determine at least one national crop price from the plurality of input data;
retrieve at least one local crop price based on the crop identifier associated with the field region from at least one local crop price source;
calculate a first crop growth stage based on the calculated expected yield and at least one national crop price;
calculate a second crop growth stage based on the calculated expected yield and the at least one local crop price; and
provide the first crop growth stage and the second crop growth stage for the field based on the calculated expected yield and at least one crop price.

20. The computer-readable storage media of claim 15, storing additional instructions which, when executed by the at least one processor, cause the at least one processor to:
determine a plurality of field regions based on the field definition data;
identify a subset of the plurality of input data associated with each field region of the plurality of field regions; and
calculate at calculated expected yield for each field region based on the field definition data.

21. The computer-readable storage media of claim 15, storing additional instructions which, when executed by the at least one processor, cause the at least one processor to:
select a crop identifier;
determine a plurality of field regions with the selected crop identifier;
aggregate the calculated expected yield for each field region in the plurality of field regions with the selected crop identifier;
determine a national yield projection for the selected crop identifier based on the aggregation; and
provide the national yield projection to a user device.

* * * * *